(12) United States Patent
Dwyer et al.

(10) Patent No.: US 11,277,516 B2
(45) Date of Patent: *Mar. 15, 2022

(54) SYSTEM AND METHOD FOR AB TESTING BASED ON COMMUNICATION CONTENT

(71) Applicant: CallMiner, Inc., Waltham, MA (US)

(72) Inventors: Michael C. Dwyer, Fort Myers, FL (US); Erik A. Strand, Fort Myers, FL (US); Scott R. Wolf, Fort Myers, FL (US); Frank Salinas, Fort Myers, FL (US); Jeffrey A. Gallino, Lexington, MA (US); Scott A. Kendrick, Fort Myers, FL (US); Shaoyu Xue, Valrico, FL (US)

(73) Assignee: CallMiner, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,354

(22) Filed: Dec. 28, 2020

(65) Prior Publication Data

US 2021/0120126 A1    Apr. 22, 2021

Related U.S. Application Data

(63) Continuation of application No. 16/386,499, filed on Apr. 17, 2019, now Pat. No. 10,992,807, which is a
(Continued)

(51) Int. Cl.
*H04M 3/51* (2006.01)
*G10L 25/72* (2013.01)
(Continued)

(52) U.S. Cl.
CPC ...... *H04M 3/5175* (2013.01); *G06F 21/6254* (2013.01); *G06F 40/279* (2020.01);
(Continued)

(58) Field of Classification Search
CPC combination set(s) only.
See application file for complete search history.

(56) References Cited

U.S. PATENT DOCUMENTS 5,142,675 A    8/1992   Oi et al.
5,170,432 A    12/1992  Hackbarth et al.
(Continued)

FOREIGN PATENT DOCUMENTS

EP    1394771 A1    3/2004
EP    1556854 B1    5/2011
(Continued)

OTHER PUBLICATIONS 03770545.6, "Supplementary European Search Report for European Application No. 03770545.6, dated Jul. 17, 2007", 4 pages.
(Continued)

*Primary Examiner* — Phung-Hoang J Nguyen
(74) *Attorney, Agent, or Firm* — GTC Law Group PC & Affiliates

(57) ABSTRACT

Systems and methods include identifying sets of communications using AB testing based on a difference in metadata values between the sets for a first type of metadata, determining at least one similarity between communications in a first set based on metadata values of a second type of metadata, determining at least one similarity between the communications in the second set based on metadata values of the second type of metadata or a third type of metadata, comparing the at least one similarity from the first set to the at least one similarity of the second set to identify differences in metadata values or types of metadata, and determining, based on the differences, a suggested action for an agent for a future communication with respect to at least one of a desired script, a target phrase, or a desired acoustic characteristic.

12 Claims, 34 Drawing Sheets

Related U.S. Application Data continuation of application No. 15/194,742, filed on Jun. 28, 2016, now Pat. No. 10,313,520, which is a continuation of application No. 14/592,510, filed on Jan. 8, 2015, now Pat. No. 9,413,891.

(60) Provisional application No. 62/005,857, filed on May 30, 2014, provisional application No. 61/924,909, filed on Jan. 8, 2014.

(51) Int. Cl.

| | | |
|---|---|---|
| G06F 40/30 | (2020.01) | |
| G06F 40/279 | (2020.01) | |
| G06F 21/62 | (2013.01) | |
| G10L 15/26 | (2006.01) | |
| G10L 15/30 | (2013.01) | |
| H04M 3/42 | (2006.01) | |
| G10L 15/02 | (2006.01) | |
| G10L 15/18 | (2013.01) | |
| G10L 15/08 | (2006.01) | |

(52) U.S. Cl.
CPC .............. *G06F 40/30* (2020.01); *G10L 15/02* (2013.01); *G10L 15/1815* (2013.01); *G10L 15/26* (2013.01); *G10L 15/30* (2013.01); *G10L 25/72* (2013.01); *H04M 3/42221* (2013.01); *H04M 3/5191* (2013.01); *G10L 2015/088* (2013.01); *H04M 2203/301* (2013.01); *H04M 2203/303* (2013.01); *H04M 2203/401* (2013.01); *H04M 2203/551* (2013.01); *H04M 2203/6009* (2013.01)

(56) References Cited

U.S. PATENT DOCUMENTS

| | | |
|---|---|---|
| 5,640,490 A | 6/1997 | Hansen et al. |
| 5,652,828 A | 7/1997 | Silverman |
| 5,828,991 A | 10/1998 | Skiena et al. |
| 5,852,801 A | 12/1998 | Hon et al. |
| 5,864,805 A | 1/1999 | Chen et al. |
| 5,909,667 A | 6/1999 | Leontiades et al. |
| 5,956,681 A | 9/1999 | Yamakita |
| 6,018,708 A | 1/2000 | Dahan et al. |
| 6,073,103 A | 6/2000 | Dunn et al. |
| 6,112,172 A | 8/2000 | True et al. |
| 6,112,304 A | 8/2000 | Clawson |
| 6,173,256 B1 | 1/2001 | Gigi |
| 6,173,259 B1 | 1/2001 | Bijl et al. |
| 6,363,346 B1 | 3/2002 | Walters |
| 6,366,882 B1 | 4/2002 | Bijl et al. |
| 6,549,932 B1 | 4/2003 | McNally et al. |
| 6,681,239 B1 | 1/2004 | Munroe et al. |
| 6,687,339 B2 | 2/2004 | Martin |
| 6,697,564 B1 | 2/2004 | Toklu et al. |
| 6,785,654 B2 | 8/2004 | Cyr et al. |
| 6,823,307 B1 | 11/2004 | Steinbiss et al. |
| 6,851,115 B1 | 2/2005 | Cheyer et al. |
| 6,961,954 B1 | 11/2005 | Maybury et al. |
| 6,970,818 B2 | 11/2005 | Menedez-Pidal et al. |
| 7,054,812 B2 | 5/2006 | Charlesworth et al. |
| 7,058,949 B1 | 6/2006 | Willen et al. |
| 7,113,848 B2 | 9/2006 | Hanson |
| 7,191,133 B1 | 3/2007 | Pettay |
| 7,243,069 B2 | 7/2007 | Jaepel et al. |
| 7,292,977 B2 | 11/2007 | Liu |
| 7,346,509 B2 | 3/2008 | Gallino |
| 7,596,788 B1 | 9/2009 | Shpigelman |
| 7,664,641 B1 | 2/2010 | Pettay et al. |
| 7,689,409 B2 | 3/2010 | Heinecke |
| 7,831,427 B2 | 11/2010 | Potter et al. |
| 8,095,371 B2 | 1/2012 | Horioka et al. |
| 8,396,205 B1 | 3/2013 | Lowry et al. |
| 8,583,434 B2 | 11/2013 | Gallina |
| 9,413,891 B2 | 8/2016 | Dwyer |
| 9,843,768 B1 | 12/2017 | Negi et al. |
| 10,313,520 B2 | 6/2019 | Dwyer et al. |
| 10,582,056 B2 | 3/2020 | Dwyer et al. |
| 10,601,992 B2 | 3/2020 | Dwyer et al. |
| 10,645,224 B2 | 5/2020 | Dwyer et al. |
| 10,992,807 B2 | 4/2021 | Dwyer et al. |
| 2002/0019844 A1 | 2/2002 | Kurowski et al. |
| 2002/0052742 A1 | 5/2002 | Thrasher et al. |
| 2002/0072896 A1 | 6/2002 | Roberge et al. |
| 2002/0087310 A1 | 7/2002 | Lee et al. |
| 2002/0091713 A1 | 7/2002 | Walker |
| 2002/0133341 A1 | 9/2002 | Gillick et al. |
| 2002/0184019 A1 | 12/2002 | Hartley et al. |
| 2003/0088413 A1 | 5/2003 | Gomez et al. |
| 2003/0154072 A1 | 8/2003 | Young et al. |
| 2004/0024585 A1 | 2/2004 | Srivastava et al. |
| 2004/0064316 A1 | 4/2004 | Gallino |
| 2004/0153321 A1 | 8/2004 | Chung et al. |
| 2004/0249634 A1 | 12/2004 | Degani et al. |
| 2004/0254787 A1 | 12/2004 | Shah et al. |
| 2005/0065796 A1 | 3/2005 | Wyss et al. |
| 2005/0071843 A1 | 3/2005 | Guo et al. |
| 2005/0149319 A1* | 7/2005 | Honda .................. G10L 15/075 704/9 |
| 2005/0188088 A1 | 8/2005 | Fellenstein et al. |
| 2005/0198634 A1 | 9/2005 | Nielsen et al. |
| 2006/0041427 A1 | 2/2006 | Yegnanarayanan et al. |
| 2006/0064338 A1 | 3/2006 | Brotman et al. |
| 2006/0075228 A1 | 4/2006 | Black et al. |
| 2006/0265222 A1 | 11/2006 | Chelba et al. |
| 2007/0061322 A1 | 3/2007 | Nemoto |
| 2007/0094023 A1 | 4/2007 | Gallino et al. |
| 2007/0094270 A1 | 4/2007 | Gallino et al. |
| 2007/0106773 A1 | 5/2007 | Gallino et al. |
| 2007/0208569 A1* | 9/2007 | Subramanian ...... G10L 19/0018 704/270 |
| 2008/0208582 A1 | 8/2008 | Gallino |
| 2008/0221882 A1 | 9/2008 | Bundock et al. |
| 2009/0019379 A1 | 1/2009 | Pendergast et al. |
| 2009/0116636 A1 | 5/2009 | Pickering et al. |
| 2009/0232296 A1 | 9/2009 | Jaiswal et al. |
| 2009/0313014 A1 | 12/2009 | Shin et al. |
| 2010/0228777 A1 | 9/2010 | Imig et al. |
| 2011/0082874 A1 | 4/2011 | Gainsboro et al. |
| 2011/0307257 A1 | 12/2011 | Pereg et al. |
| 2012/0195421 A1 | 8/2012 | Cutajar et al. |
| 2013/0007137 A1* | 1/2013 | Azzam .................... H04L 51/16 709/206 |
| 2013/0018723 A1 | 1/2013 | Khanna et al. |
| 2013/0019195 A1 | 1/2013 | Gates |
| 2013/0024786 A1 | 1/2013 | Dayal |
| 2013/0053008 A1 | 2/2013 | Hymel et al. |
| 2013/0060912 A1 | 3/2013 | Rensin et al. |
| 2013/0085809 A1 | 4/2013 | Muir |
| 2013/0185634 A1 | 7/2013 | Fox et al. |
| 2013/0239026 A1 | 9/2013 | Farooque et al. |
| 2013/0266127 A1* | 10/2013 | Schachter ........... H04M 3/5175 379/88.01 |
| 2013/0279672 A1 | 10/2013 | Mohan et al. |
| 2013/0287187 A1* | 10/2013 | Gandhe ............. H04M 3/42042 379/93.17 |
| 2014/0140497 A1* | 5/2014 | Ripa ................... H04M 3/5133 379/265.06 |
| 2014/0163960 A1 | 6/2014 | Dimitriadis et al. |
| 2014/0163961 A1 | 6/2014 | Whitten et al. |
| 2015/0134648 A1 | 5/2015 | Deshpande et al. |
| 2015/0169886 A1 | 6/2015 | Bhagwan et al. |
| 2015/0195406 A1 | 7/2015 | Dwyer et al. |
| 2015/0295808 A1 | 10/2015 | O'Malley et al. |
| 2017/0011232 A1 | 1/2017 | Xue et al. |
| 2017/0011233 A1 | 1/2017 | Xue et al. |
| 2017/0013127 A1 | 1/2017 | Xue et al. |
| 2017/0026514 A1 | 1/2017 | Dwyer et al. |
| 2019/0245971 A1 | 8/2019 | Dwyer et al. |
| 2019/0245972 A1 | 8/2019 | Dwyer et al. |

(56) References Cited

U.S. PATENT DOCUMENTS

2019/0245973 A1 8/2019 Dwyer et al.
2019/0245974 A1 8/2019 Dwyer et al.

FOREIGN PATENT DOCUMENTS

| JP | 2004317822 A | 11/2004 |
|---|---|---|
| WO | 9400836 A1 | 1/1994 |
| WO | 0174042 A2 | 10/2001 |
| WO | 2004029773 A2 | 4/2004 |
| WO | 2007050358 A2 | 5/2007 |
| WO | 2010008722 A1 | 1/2010 |
| WO | 2015/105994 A1 | 7/2015 |

OTHER PUBLICATIONS

Garofolo, John S, et al., "The TREC Spoken Document Retrieval Track: A Success Story", RIAO 2000 Paris: Recherche D'Information Assistee Par Ordinateur, http://trec.nist.gov/pubs/trec8/papers/riao-2000-sdr.pdf (accessed Jul. 3, 2007), Apr. 12, 2000, 20 pages.

Huang, Xuedong, et al., Spoken Language Processing, Prentice Hall, Upper Saddle River, 2001, pp. 422-424.

Hughes, Baden, et al., "A Grid-Based Architecture for High-Performance NLP", Natural Language Engineering, Jun. 2004, pp. 1-15.

Hughes, Baden, et al., "Experiments with data-intensive NLP on a computational grid", Proceedings of the International Workshop on Human Language Technology, 2004, pp. 1-8.

Hughes, Baden, et al., "Grid-based Indexing of a Newswire Corpus", 5th IEEE/ACM International Workshop on Grid Computing, 2004, 8 pages.

Juang, Biing-Hwang, et al., "Automatic Recognition and Understanding of Spoken Language—A First Step Toward Natural Human-Machine Communication", Proceedings of the IEEE, vol. 88, No. 8, Aug. 2000, pp. 1142-1165.

Neustein, Amy, ""Smart" Call Centers: Building Natural Language Intelligence into Voice-Based Applications", Smart Technology Magazine, http://www.speechtechmag.com/issues/7_4/cover/915-1.html (accessed Mar. 15, 2005), Jul./Aug. 2002, pp. 1-5.

Neustein, Amy, "A New Natural Language Method for Performing Efficient Mining of Government Tape-Recordings of the Conversations of Terror Suspects", Linguistic Technology Systems, 5 pages.

Neustein, Amy, "Sequence Package Analysis: A New Global Standard for Processing Natural Language Input?", The Lisa Newsletter, Globalization Insider, vol. XIII, 1.2, http://www.lisa.org/archive_domain/newsletters/2004/1.2/neustein_html, Feb. 18, 2004, pp. 1-2.

Neustein, Amy, "Sequence Package Analysis: A New Natural Language Understanding Method for Performing Data Mining of Help-Line Calls and Doctor-Patient Interviews", Natural Language Understanding and Cognitive Science Workshop, Apr. 13, 2004, 11 pages.

Neustein, Amy, "Using Sequence Package Analysis to Improve Natural Language Understanding", International Journal of Speech Technology,vol. 4, 2001, pp. 31-44.

PCT/US03/30614, "International Search Report and Written Opinion for International Application Serial No. PCT/US03/30614 dated Mar. 15, 2006", 9 pages.

PCT/US2006/040470, "Form PCT/ISA/206, Invitation to Pay Additional Fees for PCT/US2006/040470, dated Feb. 13, 2007", 5 pages.

PCT/US2006/040470, "International Preliminary Report on Patentability for International Application Serial No. PCT/US2006/040470 dated Mar. 13, 2008", 21 pages.

PCT/US2006/040470, "International Search Report for International Application Serial No. PCT/US2006/040470 dated May 7, 2007", 6 pages.

PCT/US2006/040470, "International Written Opinion for International Application Serial No. PCT/US2006/040470 dated Apr. 21, 2008", 9 pages.

PCT/US2015/010649, "International Application Serial No. PCT/US2015/010649, International Preliminary Report on Patentability and Written Opinion dated Jul. 21, 2016", Callminer, Inc., 10 Pages.

PCT/US2015/010649, "International Application Serial No. PCT/US2015/010649, International Search Report and Written Opinion dated Apr. 24, 2015", Callminer, Inc., 13 pages.

Rose, R. C, et al., "Techniques for Information Retrieval from Voice Messages", Speech Processing 2, VLSI, Underwater SIgnal Processing, Toronto, May 14-17, 1991, International Conference on Acoustics, Speech & Signal Processing. ICASSP, New York, IEEE, US, vol. 2, Conf. 16, Apr. 14, 1991, pp. 317-320.

Shinozaki, Takahiro, et al., "Spontaneous speech recognition using a massively parallel decoder", Proc. Interspeech-ICSLP, Jeju, Korea, vol. 3, 2004, pp. 1705-1708.

* cited by examiner

| SNIPPETHITS | CALLS HIT | %OFCALLS HIT | VERIFIED | HITS | FPs | FPRECO | FPCONTEXT | VERIFIED% |
|---|---|---|---|---|---|---|---|---|
| 7% | 276 | 47.59% | 0 | 0 | 0 | 0 | 0 | 0% |
| 7% | 213 | 36.72% | 0 | 0 | 0 | 0 | 0 | 0% |
| 2% | 83 | 14.31% | 0 | 0 | 0 | 0 | 0 | 0% |
| 2% | 8 | 1.38% | 0 | 0 | 0 | 0 | 0 | 0% |
| 2% | 580 | 100% | 0 | 0 | 0 | 0 | 0 | 0% |

| | BEFORE | MATCHED | AFTER | STARTTIME | ENDTIME |
|---|---|---|---|---|---|
| | HM ONES YOU'LL YOU'LL SAVE | GET YOU OVER | TO EXCUSE ME OH THE TISSUE DEALS OKAY THOSE TWO | 6m11s | 6m11s |
| | BE TAUGHT WHEN I'M TRYING | GET YOU OVER | THERE THEY CAN TAKE A LOOK AT A FREE I MEAN YOU | 6m20s | 6m21s |
| | BELIEVE YOU DON'T HAVE TO | GET YOU OVER | TO PROTEST BECAUSE I DON'T HAVE THE UM INFORMATIO | 1m17s | 1m18s |
| | I KNOW EXCEPT FOR AND UP | GET YOU OVER | TO THE TRADE IS DIRECTLY LIKE NOW HOW DO THEY SHO | 5m51s | 5m51s |
| | CHCHCHCHA ALL THAT AND Y | GET YOU OVER | TO THE TRADE AS IN THE UM IT'S GONNA BE A MINUTE | 6m11s | 6m11s |
| | WERE AWARE OH OKAY AT A | ON THE LINE WITH US | IF YOU WANT TO SUBMIT A REQUEST FOR THE PROGRAM | 9m7s | 9m8s |
| | MILLION CHCHCHCHA MILLION | ON THE LINE WITH US | TONIGHT OKAY UM OR I NEED TO REAL MADRID OR JUDY | 2m19s | 2m20s |
| | HERM AH ALL THE KETS LOSS | GET YOU OVER | TO THAT AREA STATIONARY BIKE AWFUL FORTY THAT'S E | 3m19s | 3m19s |
| | BY IT YEAH YES MUCH YEAH | GET YOU OVER | TO THAT APARTMENT AND THEN THEY CAN TELL YOU I | 9m0s | 9m1s |
| | IF YOU NEED YOUR THE ACC | GET YOU OVER | TO THEM AND YOU CAN JUST DOUBLE CHECK WITH THER. | 9m39s | 9m39s |
| | WAS TRYING TO REGISTER N. | ON THE LINE WITH US | TOO OK NO PROBLEM ALRIGHT RONALD IF YOU DON'T MIR | 45s | 45s |
| | AGAIN IF YOU KNOW SO DAY | GET YOU RIGHT OVER | OKAY GREAT THANK YOU HAVE A GREAT DAY IT'S IF YOU | 20m37s | 20m38s |

FIG. 1

CONTACTS (SORTED BY DURATION)

SORT BY: DURATION

| | DATE/TIME | AGENT | DURATION |
|---|---|---|---|
| f | | | |
| | | | |
| | 1/24/2012 8:02 PM | AGENT 1 | |
| | 1/24/2012 8:02 PM | AGENT 0 | |
| | 1/24/2012 8:02 PM | AGENT 1 | |
| | 1/24/2012 8:02 PM | AGENT 0 | |
| @ | 1/24/2012 8:02 PM | AGENT 1 | |
| | 1/24/2012 12:03 AM | DANNY F. | 0s |
| | 1/24/2012 12:02 AM | HARRY V. | 0s |
| | 1/24/2012 7:51 PM | DANNY F. | 0s |
| ☎ | 1/23/2012 4:32 PM | O'MALLEY | 10s |

COMMAND POST

TEAMS ▽ TEAM 3 ▽ NAME [____]

🏳 📧 ⚐ 📎 CALL TIME ▽ SEARCH 🔍

NAME
PHOTO
AGENT ID: 5128468B
ACCOUNT: MARINE BANK
DIRECTION: OUT BOUND
CUSTOMER ID: 5125487

LEGAL THREAT
LONG CALL
PROFANITY
CUSTOMER ESCALATION
+ 2 ALERTS     RED

8m34     0M00 🔊

TODAY'S ALERTS PER CALL

ALERTS PER CALL

☑ TEAM AVG  ◯ TREND LINE /

ADD NOTES...

ALERT FEED

| CUSTOMER | 0m15 | ⊚ ...ASKED YOU TO STOP CALLING ME SEVERAL TIMES |
| AGENT | 0m40 | RIGHT PARTY CONTACT SCRIPT FAILURE |
| CUSTOMER | 4m48 | ⊚ ...NEED TO SPEAK WITH YOUR SUPERVISOR NOW |
| CUSTOMER | 6m25 | ⊚ ...ASKING YOU FOR THE LAST G........ TIME |
| AGENT | 7m01 | LONG CALL THRESHOLD |
| CUSTOMER | 8m29 | ⊚ ...CONTACTING MY ATTORNEY AND YOU'LL BE HEARING |

CALL ALERT — 1 ANALYSTS ARE CURRENTLY ONLINE. I AM: AVAILABLY

🏴 THIS CALL HAS BEEN FLAGGED.  [ UNDO FLAG ]  [ NEXT CALL ]

CALL NOTES
OVER THREATENS TO CALL ME POLICE

CALL DATA

CALL ID:
AGENT: JGALTINO
EXT:
CUST: VALUED CUSTOMER
ACCT: 10023976544
CALL ENDED
1m54
EVENTS
6

00:00 ▶ ◉ ◀ ────●──── 00:05

| TIME | EVENT | AGE SNIPPET |
|------|-------|-------------|
| [NAME] | | |
| 0m10 | PROPER GREETING ◉ | ▶ AGENT: THANK YOU FOR CALLING CITY BANK THIS ERIC SPEAKING |
| 0m25 | REFUND REQUEST ◉ | ▶ CALLER: YES I DON'T LIKE YOUR PRODUCT AND I'D LIKE A FULL REFUND OF MY MONEY |
| 0m35 | DISSATISFACTION ◉ | ▶ CALLER: THIS CUSTOMER SERVICE IS RIDICULOUS |
| | ESCALATION ◉ | ▶ CALLER: PLEASE LET ME SPEAK TO YOU SUPERVISOR |
| 1m5 | DISSATISFACTION ◉ | ▶ CALLER: I'M DISGUSTED THIS IS AWFUL YOU TERRIBLE PEOPLE |
| 1m10 | LAW ENFORCEMENT ◉ | ▶ CALLER: I SHOULD CALL THE POLICE |

QUEUE STATUS — 1 IN REVIEW — 0 IN QUEUE — REPORTS

*FIG. 8*

USE CASE 1: COMPLIANCE

WHY

✓ Reduced complaints

✓ Reduced fines / litigation

✓ Improved call efficiency

*Mini Miranda Reminder*

✓ This call may be recorded for quality assurance

* This is an attempt to collect a debt

* Any information obtained will be used for that purpose

HOW

* Prompt agents of time-sensitive required scripts

* Prompt agents of event driven procedures

* Warn agents/monitors of escalating calls

* Alert agents/monitors of compliance breaches

*FIG. 10*

USE CASE 2: SALES

HOW

* Notify agents of upsell or cross sell opportunities

* Customize offer based on metadata & language

* Guide agent on disclaimers & close procedures

* Notify supervisors for shadowing opportunities

WHY

✓ Increased revenue

✓ Improved call efficiency

✓ Reduced disputes/returns

USE CASE 3: ESCALATIONS

HOW

* Warn agents of increasing temperature
* Alert monitors to escalations
* Track progression – walk-down or intensification
* Intervene as necessary to defuse situation

WHY

✓ Increased C-SAT / NPS
✓ Reduced transfers
✓ Reduced complaints
✓ Regulatory appeasement

USE CASE 4: CUSTOMER RETENTION

HOW

- ALERT AGENT OR MONITORS TO CHURN RISK BEHAVIOR
- ADVISE AGENTS WITH PROCEDURES OR OFFERS
- INITIATE SUPERVISORS COMMUNICATION
- PRO-ACTIVE SAVES NOTIFICATION
- APPROPRIATE RE-ROUTE TO SAVES DEPARTMENT

HOW

✓ REVENUE CONTINUITY
✓ INCREASED C-SAT / NPS
✓ REDUCED TRANSFERS

TEAMS ∨ TEAM 3 ∨ ALEX PORTNOY

NAME
PHOTO
AGENT ID: 51284758
STATUS: GOLD
DIRECTION: OUTBOUND
CUSTOMER ID: 5125487

CHURN LANGUAGE
COMPETITIVE MENTION
DISSATISFACTION
PRODUCT DEFECT
+1 ALERTS

8m34 / 0m00

CALL TIME ∨ SEARCH

ALERT FEED

| | | |
|---|---|---|
| 0m15 | REPEAT CONTACT | ...CALLED ABOUT THIS LAST WEEK AND STILL NO |
| 0m40 | PRODUCT DEFECT | ...IT KEEPS CRASHING WHEN I POWER ON EVERY |
| 4m48 | DISSATISFACTION | ...I'M EXTREMELY FRUSTRATED WITH THE LACK OF |
| 6m25 | PROFANITY | |
| 8m29 | CHURN LANGUAGE | ...HEARD OF YOUR COMPETITORS HAVE ANY ISSUES |
| 8m34 | RETENTION OFFER | ...PROBABLY JUST END UP SWITCHING PROVIDERS |
| | | OFFER: $10M DISCOUNT, 6 MONTHS |

FIG. 13

| Events | Details | Transcript | | |
|---|---|---|---|---|
| ANI: | none | | | |
| Measures | | | | |
| Date/Time: | 1/3/2014 7:00:00 AM | Duration: | 3m51s | |
| Percent Silence: | 19.83% | Agitation: | 4,687 | |
| Index Scores | | | | |
| Emotion Score: | 5 | Agent Quality: | 64 | |
| Dissatisfaction Score | 0 | Politeness Score | 0 | |
| Escalation Score | 0 | Compliments Score | 0 | |
| Agitation Score | 24.09 | Percentage Silence Score | 65.56 | |
| | | Empathy Score | 100 | |
| | | Agent Ownership Score | 100 | |
| AQ - Cust Serv: | 60 | Customer Satisfa...: | none | |
| Appropriate Opening Score | 0 | Compliance Risk: | 5 | |
| Politeness Score | 0 | Right Party Contact Risk Indicator | 0 | |
| Agent Ownership Score | 33.00 | | | |
| Percent Silence Score | 98.35 | Mini-Miranda Risk Indicator | 0 | |
| Proper Hold Procedure Score | 100 | FDCPA Risk Indicator | 24.09 | |
| Empathy Score | 100 | | | |

FIG. 15

Score Builder

Score name: Emotion Score  ⊙ Possible score (average): 0 to 100

| Indicator | Input range | Weight | Actions |
|---|---|---|---|
| Agitation Score | 0 to 100 | 1 | ✗ |
| Dissatisfaction Score | 0 to 100 | 2 | ✗ |
| Escalation Score | 0 to 100 | 2 | ✗ |
| Negative Emoticon | 0 to 100 | 2 | ✗ |

*Click to add a new indicator*

---

Score name: Emotion Score

Filters:

Aggregation method: ○ Sum  ⦿ Average

Acceptable Ranges

Number of ranges: Three ▾

| | Start | End | Description | Color | Target |
|---|---|---|---|---|---|
| Range 1: | Min | - 79 | Suspected Emotion | ■ | ○ |
| Range 2: | 79 | - 80 | Normal | ■ | ○ |
| Range 3: | 80 | - Max | Calm | ■ | ⦿ |

Display as: Score ▾

*FIG. 16*

Category (Behavior): Dissatisfaction

| Time frame: Last 14 days ▼ | Threshold: 1 | All Off | Set All |
|---|---|---|---|

| | | | |
|---|---|---|---|
| Absolutely ridiculous | 1 | Once ▶ | ✓ On  ✗ |
| Angry about | 1 | Once ▶ | ✓ On  ✗ |
| Annoyed about | 1 | Once ▶ | ✓ On  ✗ |
| Are you kidding me | 1 | Once ▶ | ✓ On  ✗ |
| Attorney general | 1 | Once ▶ | ✓ On  ✗ |
| Been being rude | 1 | Once ▶ | ✓ On  ✗ |
| Been on hold a while | 1 | Once ▶ | ✓ On  ✗ |
| Been on hold long time | 1 | Once ▶ | ✓ On  ✗ |
| Board of directors | 1 | Once ▶ | ✓ On  ✗ |
| Bulls–t | 1 | Once ▶ | ✓ On  ✗ |

Add new search   Add existing search                                                          Show all

COMPLIANCE RISK COLLECTIONS
SCORES CALLS TO IDENTIFY RELATIVE LIKELIHOOD OF COMPLIANCE BREACH

○ MYEUREKA ANALYSIS OF ...
  ▪ COMPLIANCE RISK
  ▪ HOT CALLS
  ▪ DURATION

○ SUPPORTING CATEGORIES
  ▪ RISK & ABUSIVE LANGUAGE
  ▪ LEGAL ACTION MENTIONS
  ▪ MINI-MIRANDA
  ▪ RIGHT PARTY CONTACT
  ▪ FDCPA COMPLIANCE

MYEUREKA    COLLECTORS - GROUP 6
            COLLECTORS - GROUP 6 ⌄
LAST 7 DAYS COMPARED TO LAST MONTH.
ALL METRICS > COMPLIANCE RISK (1365 CONTACTS)

| COMPLIANCE RISK | | | |
|---|---|---|---|
| HIGH | | | |
| IMPROVING, -8 | | | |

| HOT CALLS |
|---|
| 15% |
| STABLE |

| CALL DURATION |
|---|
| 10m23 |
| IMPROVING, -15s |

| 48 HIGH | ◇ IMPROVING, -8 | ◇ WATCH | | |
|---|---|---|---|---|
| AGENT | COMPLIANCE RISK | COUNT | | |
| NICK ADAMS | 58 | ◇ +5 | 132 | ACTION - WATCH |
| SULA PEACE | 55 | ◇ +3 | 148 | ACTION - WATCH |
| JUDGE HOLDEN | 55 | ◇ +1 | 140 | ACTION - WATCH |
| NEDDY MERRILL | 53 | ◇ -5 | 128 | ACTION - WATCH |
| STEPHEN DEDALUS | 50 | ◇ +1 | 137 | ACTION - WATCH |
| BINX BOLLING | 44 | ◇ -3 | 152 | ACTION - WATCH |
| PHILLIP MARLOWE | 42 | ◇ -9 | 146 | ACTION - WATCH |
| SCOUT FINCH | 40 | ◇ -3 | 131 | ACTION - WATCH |
| CLARISSA DALLOWAY | 38 | ◇ +1 | 129 | ACTION - WATCH |
| HOLDEN CAULFIELD | 34 | ◇ -5 | 121 | ACTION - WATCH |

HIGH — COMPLIANCE RISK - HIGH
COMPLIANCE RISK IS IN THE HIGH RANK, LAST 7 DAYS
COMMENT - VIEW CONTACT - ACTION - UNWATCH ▣(4) ◎(1)

LOW RANK — COMPLIANCE RISK - LOW RANK
NICK ADAMS HAS THE LOWEST RANK IN COMPLIANCE RISK, LAST 7 DAYS
COMMENT - VIEW CONTACT - ACTION - WATCH

COMPLIANCE CATEGORIES CAN BE FINE TUNED FOR YOUR POLICIES

| FAVORITES | FILTERS | TOPICS | | CATEGORY: FDCPA COMPLIANCE | | | | NEW SEARCH |
|---|---|---|---|---|---|---|---|---|
| SAVED SEARCHES | | | | TIME FRAME: YESTERDAY ▽ | THRESHOLD: 1 | | SEARCH | |
| ORGANIZE | | | | NAME | WEIGHT | COUNT | STATUS | ACTIONS |
| ▷ MY SEARCHES | | | | WAGES GARNISHED | 1 | ONCE ▽ | ON | ☑ |
| ▷ SHARED SEARCHES | | | | PRESS CHARGES | 1 | ONCE ▽ | ON | ☑ |
| ▽ MITIGATOR SEARCHES | | | | BROKE PROMISE | 1 | ONCE ▽ | ON | ☑ |
| ⌕ FDCPA NON-COMPLIA... | | | | AFFECT YOUR CREDIT | 1 | ONCE ▽ | ON | ☑ |
| ⌕ LEGAL ACTION MENTIONS | | | | TAXES GARNISHED | 1 | ONCE ▽ | ON | ☑ |
| ⌕ MIN-MIRANDA MISSES | | | | LAWSUIT THREATS | 1 | ONCE ▽ | OFF | ☑ |
| ⌕ RIGHT PARTY CONTACT... | | | | ARREST THREATS | 1 | ONCE ▽ | OFF | ☑ |
| ⌕ RISK LANGUAGE | | | | CONTACT AUTHORITY THREATS | 1 | ONCE ▽ | OFF | ☑ |
| ▷ OUTSTANDING BEHAVIORS | | | | REPOSSESSION THREATS | 1 | ONCE ▽ | OFF | ☑ |
| ▷ SAMPLE SEARCHES | | | | CRIME ACCUSATIONS | 1 | ONCE ▽ | ON | ☑ |
| | | | | FRAUD ACCUSATIONS | 1 | ONCE ▽ | ON | ☑ |
| SAVED CATEGORIES | | | | INTIMIDATING LANGUAGE | 1 | ONCE ▽ | ON | ☑ |
| ORGANIZE | | | | FDCPA MENTIONS | 1 | ONCE ▽ | ON | ☑ |
| ▷ MY CATEGORIES | | | | FTC MENTIONS | 1 | ONCE ▽ | ON | ☑ |
| ▷ BEHAVIOR | | | | IMMIGRATION THREATS | 1 | ONCE ▽ | OFF | ☑ |
| ▷ FDCPA COMPONENTS | | | | PERJURY MENTIONS | 1 | ONCE ▽ | ON | ☑ |
| ▷ OUTLIERS | | | | | | | | |
| ▷ OUTSTANDING BEHAVIORS | | | | | | | | |
| ▷ PROCEDURE | | | | | | | | |
| ▷ RISK MITIGATION | | | | | | | | |

*FIG. 29*

SYSTEM AND METHOD FOR AB TESTING BASED ON COMMUNICATION CONTENT

CROSS-REFERENCE TO RELATED APPLICATIONS

This application is a continuation of the following U.S. patent application, which is incorporated by reference in its entirety: U.S. application Ser. No. 16/386,499, filed Apr. 17, 2019.

U.S. application Ser. No. 16/386,499 is a continuation of the following U.S. patent application, which is incorporated by reference in its entirety: U.S. application Ser. No. 15/194,742, filed Jun. 28, 2016, now issued as U.S. Pat. No. 10,313,520.

U.S. application Ser. No. 15/194,742 is a continuation of the following U.S. patent application, which is incorporated by reference in its entirety: U.S. application Ser. No. 14/592,510, filed Jan. 8, 2015, now issued on Aug. 9, 2016 as U.S. Pat. No. 9,413,891.

U.S. application Ser. No. 14/592,510 claims the benefit of the following provisional applications, each of which is hereby incorporated by reference in its entirety: U.S. Application No. 61/924,909, entitled "Real-Time Conversational Analytics Facility", filed Jan. 8, 2014 and U.S. Application No. 62/005,857, entitled "Real-Time Conversational Analytics Facility and Redaction", filed May 30, 2014.

BACKGROUND

Field

This present disclosure relates to automated systems for monitoring communications, and more specifically to real-time automated monitoring systems for monitoring and improving live communications, including by providing feedback on communications performance.

Description of Related Art

Monitoring and improving the performance of a call center employee in handling a call from a customer, typically a customer that has an issue or a problem, has always been a challenge. Supervisors may listen in on a call, and attempt to provide real-time feedback to the employee (hereafter referred to as a 'call agent', or simply 'agent'), but given the number of concurrent calls coming into the call center it is not practical to listen into but a very small number of calls. To handle the large number of concurrent calls, a post-call analytics system may be employed that provides reports on the performance of the calls that have been recorded, but this does not help the agent during a particular call, and thus only acts to provide overall "lessons learned" from an aggregate of calls and history thereof. Therefore there is a need for improved methods and systems for monitoring and performance of live calls, in real, or near-real time.

SUMMARY

In an aspect, a non-transitory computer readable medium with an executable program may provide a dynamic graphical representation of at least one of a category, a score, a sentiment, and an alert. The program may instruct a computer processor to perform at least the following steps: receiving a voice communication, analyzing the voice communication in at least near real-time relative to the receipt of the communication using a computer-based communications analytics facility for at least one of a language characteristic and an acoustic characteristic, determining at least one of the category, the score, the sentiment, and the alert associated with at least one participant in the voice communication using the at least one language and/or acoustic characteristic, and providing a dynamic graphical representation of the at least one category, score, sentiment, or alert through a graphical user interface. The dynamic graphical representation may be provided to a user other than the participant in the voice communication as the received voice communication is on-going. The user may be a non-participant in the voice communication and the dynamic graphical representation is provided to assist the non-participant in at least one of supervising and evaluating a participant in the voice communication. The dynamic graphical representation may be provided as feedback to a participant in the voice communication as the received voice communication is on-going. The acoustic characteristic may be at least one of a stress of words, an aggregated stress of a plurality of words, an agitation, a tempo, a change in tempo, an amount of silence, a silence between words, a gain in volume or energy of the words, a tone, an overtalk, a time lag between words, a time dependency between key words and phrases, an inter-word timing, an inflexion of words, and a temporal pattern. The language characteristic may be at least one of a category, a sentiment, a regulation compliance, a score, a text, an alternative text, a presence or absence of specific language, and a confidence in word match. The steps may further include repeating the steps for a plurality of in-progress voice communications, and displaying a dynamic graphical representation of each in-progress voice communication on the graphical user interface. The steps may further include assigning metadata representative of the voice communication based on the analysis, and displaying the metadata for the voice communication on the graphical user interface. Metadata representative of the voice communication may include at least one of a speaker, an agent data, an agent grouping, a call handling location, a time and date of call, a department, a skill or queue, a pertinent IVR path data, and a call length. The steps may further include before analyzing the voice communication for the at least one language characteristic, converting the voice communication to text using computer-based speech recognition. The analysis for the presence or absence of specific language may include identifying whether a required statement has been spoken within a specific time period. The required statement may be a disclosure to a participant that satisfies a legal requirement, identifying the use of profanity, or identifying the absence of compliance scripts.

In an aspect, a product that provides a visual indication of a language analysis and an acoustic analysis of a communication may include a receiver for receiving a copy of the communication in near real-time or real-time relative to the origination of the communication, a computer-based communications analytics facility for evaluating the received communication in near real-time or real-time relative to the receipt of the copy, including a language module for analyzing the communication for at least one of a language characteristic and a non-word symbol within the communication text that mimics a verbal element, an acoustic analysis module for analyzing the communication for an acoustic characteristic, and a determination module for determining at least one of a category, a score, a sentiment, and an alert associated with the communication using the at least one language characteristic, non-word symbol, and/or acoustic characteristic, and an interface for displaying at least one visual indication representative of the category, the score, the sentiment, or the alert. The communication may be at least one of a voice communication, a voice mail, a chat, an email, a blog post, a survey, a social media post, an IVR session, and an SMS. The acoustic characteristic may be at least one of a stress of words, an aggregated stress of a plurality of words, an agitation, a tempo, a change in tempo, an amount of silence, a silence between words, a gain in volume or energy of the words, a tone, an overtalk, a time lag between words, a time dependency between key words and phrases, an inter-word timing, an inflexion of words, and a temporal pattern. The language characteristic may be at least one of a category, a sentiment, a regulation compliance, a score, a text, an alternative text, a presence or absence of specific language, and a confidence in word match. The visual indication may be at least one of a blinking, a vibrating, a shaking, a pulsing, a movement, a color, a color change, a category label, a score, and a sentiment. The analysis for the presence or absence of specific language may include identifying whether a required statement has been spoken within a specific time period, identifying the use of profanity, or identifying the absence of compliance scripts. The required statement may be constructed to satisfy a legal requirement. The computer-based communications analytics facility may further include a metadata module for determining metadata of the communication. The metadata may be at least one of a speaker, an agent data, an agent grouping, a call handling location, a time and date of call, a department, a skill or queue, a pertinent IVR path data, and a call length. The non-word symbol may be at least one of an emoticon, a capitalization, a punctuation, an ellipses, and a spacing. The at least one category, score, sentiment, or alert may enable automatically monitoring at least one of a customer satisfaction, a compliance, an agent performance, and a performance indicator. The product may further include before analyzing the communication for the at least one language characteristic, converting the communication to text using computer-based speech recognition if it is a voice communication. Analyzing the text may include matching portions of converted text to text strings, wherein the text strings include key words and phrases.

In an aspect, a non-transitory computer readable medium with an executable program may provide a dynamic graphical representation of at least one of a category, a score, a sentiment, and an alert. The program may instruct a processor to perform at least the following steps: receiving a communication, analyzing the communication in at least near real-time relative to receipt of the communication using a computer-based communications analytics facility for at least one of a language characteristic, a non-word symbol that mimics a verbal element, and an acoustic characteristic, wherein analyzing the language characteristic of voice communications includes converting the voice communication to text using computer-based speech recognition, determining at least one of the category, the score, the sentiment, and the alert associated with the communication using the at least one language characteristic, non-word symbol, and/or acoustic characteristic, and providing a dynamic graphical representation of the at least one category, score, sentiment, or alert through a graphical user interface.

In an aspect, a method may include receiving a telephonic voice communication, analyzing the voice communication in real time during the telephonic voice communication using a computer-based communications analytics facility for at least one of a language characteristic and an acoustic characteristic, determining at least one emotional state indicator of a participant in the telephonic voice communication using the at least one characteristic, and providing a dynamic graphical representation of the at least one emotional state indicator through a graphical user interface. The dynamic graphical representation may be provided to a user other than the first participant in the telephonic voice communication as the received voice communication is on-going, the participant in the telephonic voice communication as the received voice communication is on-going, another participant in the telephonic voice communication as the received voice communication is on-going, or the like. The user may be a second participant in the telephonic voice communication and the dynamic graphical representation is provided as feedback to the second participant during the voice communication or a non-participant in the telephonic voice communication and the dynamic graphical representation is provided to assist the non-participant in at least one of supervising and evaluating a participant in the voice communication.

In an aspect, a method may include receiving a stream of a communication, analyzing the communication in real time during the communication using a computer-based communications analytics facility for at least one of a language characteristic and an acoustic characteristic, determining at least one of an emotional state indicator of a first participant and a category of the communication using the at least one characteristic, and providing a graphical user interface to display the at least one emotional state indicator or the category. The at least one emotional state indicator or the category is provided to a user other than the first participant or the first participant in the communication as the communication is on-going. The user may be a second participant in the communication and the emotional state indicator or the category is provided as feedback to the second participant during the communication. The user may be a non-participant in the communication and the emotional state indicator or the category is provided to assist the non-participant in at least one of supervising and evaluating a participant in the communication.

In an aspect, a multi-platform customer input analysis system may include a receiving module for receiving a plurality of heterogeneous inputs comprising at least one of a vocal communication and a text source, a voice-to-text converter for converting vocal communication inputs to text using computer-based speech recognition, an analysis module for analyzing the text of each input source using a computer-based communications analytics facility, a category facility for assigning a minimum of one category to each input based on the text analysis, a scoring facility for assigning a minimum of one score to each input based on the text analysis, and a storage facility for storing at least one of the resulting scores, categories, input source text, input vocal communications stream, text translation of the input vocal stream, and input source type in a searchable database. The text source may be one of chat, email, blog, survey, Facebook, Twitter, Google+, IVR, social media input, and SMS. The database may be searchable by a minimum of one of category, score, and input source. The system may further include an acoustic analyzer for acoustically analyzing vocal communication input and assigning a minimum of one category to each vocal communication based on the acoustical analysis. The conversion of the vocal communications input to text may be done once and both the translation and the vocal communications input may be made available for one or more of redaction, additional analysis, mining, and archiving in a searchable database.

In an aspect, a non-transitory computer readable medium may include an executable program for emotional analysis of text communications, wherein the program instructs a microprocessor to perform the following steps: receiving a text communication, analyzing the text communication in real time for non-word symbols within the text that mimic verbal elements, and determining at least one emotional state indicator of the sender from the analysis. The steps may further include providing a dynamic graphical representation of the at least one emotional state indicator through a graphical user interface. Analysis of incoming text may include analysis of non-word symbols such as emoticons, capitalization, punctuation, ellipses, and spacing. The steps may further include storing the incoming text and the one or more emotional states in a searchable database.

In an aspect, a non-transitory computer readable medium may include an executable program for real time or near real time customer input evaluation stored thereon, wherein the program instructs a microprocessor to perform at least the following steps: receiving vocal communications from a plurality of heterogeneous sources, evaluating sentiment of the vocal communications based on a plurality of acoustic characteristics, assigning category metadata to the vocal communications based on a plurality of acoustic characteristics, assigning scoring metadata to the vocal communications based on a plurality of acoustic characteristics, and storing at least one of the resulting scores, categories, input vocal communications stream, and input source type in a searchable database. The acoustic characteristics may include one or more of silence between words, stress of words, aggregate stress of a plurality of words, tempo, changes in tempo, and gain of words. The conversion of the vocal communications input to text may be done once and both the translation and the vocal communications input may be made available for one or more of redaction, additional analysis, mining, and archiving in a searchable database. The medium may further include displaying visual indicators representative of one or more of the sentiment, category and score of the vocal communication.

In an aspect, a machine for automating support for a call center agent may be clearly programmed to carry out at least the following steps in near real time: receiving a plurality of heterogeneous inputs comprising at least one of vocal communications and text sources, analyzing acoustical characteristics of a vocal communication stream, assigning a sentiment to a vocal communication stream based on the acoustical analysis, assigning a score to a vocal communication stream based on the acoustical analysis, and storing a minimum of one of: resulting scores, sentiments, input vocal communication, and input source type in a searchable database. Analyzing acoustical characteristics of the vocal communication stream may include analysis of one or more of tempo, change in tempo, change in stress on words, overtalk, silence, and a change in volume.

In an aspect, a machine for automatically measuring agitation in near real time vocal communications may be clearly programmed to carry out at least the following steps comprising: receiving a plurality of heterogeneous inputs comprising vocal communications, evaluating acoustic qualities comprising at least one of tempo, change in tempo, change in stress on words, overtalk, silence, and a change in volume, and assigning an agitation score to the call based on the analysis.

In an aspect, a machine for categorizing a plurality of heterogeneous inputs comprising at least one of vocal communications and text communications may be programmed to carry out steps comprising: providing an interface to facilitate a user in selecting categories to be used for categorization of incoming communications, and providing an interface to facilitate the user in specifying new categories to be used for categorization of incoming communications.

In an aspect, a machine for categorizing vocal communications may be programmed to receive a plurality of heterogeneous input vocal communications, analyze the acoustic characteristics of the vocal communication, convert the vocal communication to text using computer-based speech recognition, analyze the text of the vocal communication using a computer-based communications analytics facility, store the text of the vocal communication in conjunction with the acoustic characteristics of the corresponding portions of the vocal communication in a searchable database; categorize the vocal communication according to the analysis, and search the database for at least one of the acoustic characteristic and the text. The text analysis may include matching portions of converted text to text strings such as key words and phrases. Analyzing the acoustical characteristics of the vocal communication may include analysis of at least one of time lag between words, time dependencies between key words and phrases, inter-word timing, inflexion of words, gain in volume, and temporal patterns. The analysis may be done in near real time or real time.

In an aspect, a machine for real-time quality monitoring of phone calls may be clearly programmed to carry out steps: analyzing in-progress calls for the presence or absence of specific language, analyzing in-progress calls for the presence or absence of specific acoustic characteristics, further analyzing in-progress calls for the conjunction of temporal and acoustic properties associated with the presence of specific language, providing alerts to at least one user based on the analysis of the in-progress call, and enabling immediate, real-time review of in-progress calls. The analysis for the presence or absence of specific language may include identifying whether a required statement has been spoken within a specific time period, the use of profanity, or the absence of compliance scripts. The required statement may be a "Mini Miranda." The user may be at least one of a call-center agent and a call-center supervisor. The resulting analysis may be stored in a searchable database. The machine may further include calculating cumulative scores based on analysis relative to target metrics or displaying cumulative scores and trends to individuals.

In an aspect, a product for real-time compliance monitoring of phone calls may be clearly programmed to carry out steps including: analyzing in-progress calls for the presence or absence of specific compliance-related language, analyzing in-progress calls for the presence or absence of specific acoustic characteristics, analyzing in-progress calls for the conjunction of temporal and acoustic properties associated with the presence of specific language, providing an alert to at least one of a call-center agent and call-center supervisor based on one or more of the presence or absence of specific compliance related language in the in-progress call and the presence or absence of specific acoustic characteristics in the in-progress call, and enabling immediate, real-time review of in-progress calls where one or more of the presence or absence of specific compliance related language and the presence or absence of specific acoustic characteristics is detected.

In an aspect, a non-transitory computer readable medium with an executable program for facilitating the coaching of call-center agents relative to conformance with compliance regulations stored thereon, wherein the program instructs a microprocessor to perform at least the following steps: analyzing in-progress calls for the presence or absence of specific compliance related language, analyzing in-progress calls for the presence or absence of specific acoustic characteristics, tracking the results of the analysis for individual call-center agents, and providing a tool for reviewing the performance of individual call-center agents identifying opportunities for improved compliance with regulations.

In an aspect, a non-transitory computer readable medium may include an executable program for real-time quality monitoring of a plurality of in-progress phone calls stored thereon, wherein the program instructs a microprocessor to perform at least the following steps: analyzing a plurality of in-progress phone calls, assigning metadata representative of the call based on the analysis, and displaying a visual representation of each in-progress phone call on a screen where the visual representation is representative of phone call metadata. Metadata representative of the call may include at least one of category, sentiment, regulation compliance, tone, score, and agitation.

In an aspect, a machine for visually displaying relationships between a set of conversations may be clearly programmed to carry out steps including providing identifiers for each of a set of conversations, and visually displaying metadata common to two or more of the conversations where the visual display of the metadata provides information as to the frequency of that metadata in the set of conversations being analyzed. The visual display may include sizing the metadata by frequency of occurrence in the set of conversations. The visual display may include representing metadata in different colors according to their relative correlation.

In an aspect, a machine for automating support for a call center agent may be clearly programmed to carry out the steps of: receiving a copy of vocal communications from a plurality of heterogeneous sources in near real-time or real-time, analyzing received vocal communications in near real time for the presence or absence of specific language, the presence or absence of specific acoustic characteristics, and the conjunction of temporal and acoustic properties associated with the presence of specific language, and automatically providing at least one of data and scripts to an agent based on the near real time or real time analysis of the conversation. Analyzing received vocal communication in near real time or real time may include one of: acoustically analyzing the received vocal communication including evaluating at least one of time lag between words, time dependencies between key words and phrases, inter-word timing, inflexion of words, gain in volume, and temporal patterns, converting the vocal communication to text, and matching portions of converted text to text strings such as key words and phrases.

In an aspect, a machine for automating a call center may be programmed to carry out the steps of: receiving a copy of vocal communications from a plurality of heterogeneous sources in near real-time or real time, analyzing a received vocal communication in near real time and automatically providing a vocal response based on the real time or near real time analysis of the conversation. The step of analyzing a received vocal communication in near real time or real time may be executed on an analysis module including: an acoustical analysis module for acoustical analysis of vocal communication comprising evaluation of at least one of time lag between words, time dependencies between key words and phrases, inter-word timing, inflexion of words, gain in volume, and temporal patterns, a voice-to-text converter for converting the vocal communication stream to text, and an identification facility for identifying the presence or absence of specific language to acoustic characteristics.

In an aspect, a product that provides a visual indication of an acoustical analysis to a participant in the communication may include a receiver for receiving a copy of vocal communications from a plurality of heterogeneous sources in real time or near real-time, an analyzer for evaluating received vocal communications in near real time including a language module for analyzing the presence or absence of specific language, an acoustical analysis module for analyzing vocal communication comprising at least one of time lag between words, time dependencies between key words and phrases, overtalk, inter-word timing, inflexion of words, gain in volume, and temporal patterns, a sentiment assignment module for assigning a sentiment to the vocal communication as a function of the acoustical analysis and the presence or absence of specific language, and a display for displaying at least one visual indicator representative of the real time or near real time evaluation of the vocal communication to one of the participants. The visual indicator may indicate the results of the real time or near real time evaluation by one of blinking, vibrating, shaking, moving, changing color, and changing category label.

In an aspect, a machine for tracking all customer communication with an entity may be programmed to carry out the steps of: receiving a plurality of heterogeneous inputs comprising one of a vocal communication and a text source, assigning a customer identification to each input, analyzing each input, assigning one of a category, score, sentiment, tone, compliance and agitation to each input based on the analysis, storing the input, customer identification and one of score, category, sentiment, tone, compliance, and agitation in a searchable database, searching the database by customer identification, and displaying all inputs associated with a customer identification. The input may be one of phone call, voice mail, VOIP, Chat, Email, SMS, Twitter, Facebook, Blogs and Surveys. Displaying all inputs may include displaying a chart of metadata over time.

In an aspect, a method of call classification capable of automated AB testing utilizing historical data may include creating two or more categories of calls, which differ in value for an identified piece of metadata, identifying similarities between calls within each group, and identifying differences between groups.

In an aspect, a method of categorizing and storing customer communications may include receiving a plurality of vocal communication streams from a plurality of heterogeneous sources, identifying patterns within a vocal communication stream including: converting the vocal communication stream to text, matching portions of converted text to text strings such as key words and phrases, identifying recurring words and phrases not associated with existing key words and phrases, categorizing the vocal communication stream as a function of identified key words and phrases, and creating new categories associated with recurring words and phrases not associated with exiting key words and phrases.

In an aspect, automatically generating new categories for a customer communications analysis system may include analyzing sets of archived call recordings, identifying a repeating word or phrase across a plurality of calls wherein the identified word or phrase is not a previously known key word or phrase, generating a new category label to be associated with the repeating word or phrase, and adding the identified word or phrase and new category to means of categorization.

In an aspect, a non-transitory computer readable medium may include an executable program for a sortable database of acoustically analyzed communications stored thereon, wherein the program instructs a microprocessor to perform the following steps including receiving incoming vocal communications, analyzing the acoustics of the incoming vocal communications, assigning one or more metadata values to the incoming vocal communications as a function of the acoustic analysis, converting incoming vocal communications to text, analyzing the text translation of the incoming vocal communications, assigning one or more metadata values to the text translation, storing the metadata from the acoustic analysis and a minimum of one of incoming vocal communication, the text translation of the incoming vocal communication, customer identification, agent, input source, time of day, location, and the metadata from the text analysis in a searchable database, sorting the entries in the searchable database based on the metadata from the acoustic analysis, and displaying a subset of the entries in the searchable database as a function of the metadata from the acoustical analysis. The entries may be sorted and displayed according to the confidence level of the analysis.

In an aspect, a method for redacting numbers from a vocal stream may include translating a vocal stream to text, analyzing the text to identify the locations of numbers within the text, and redacting the numbers from the vocal stream. Redacting may include one of removing, muting and bleeping. The vocal stream may be an incoming telephonic voice communication or an archived voice recording. Translation of the vocal stream may be done using one of large vocabulary speech recognition technology, phonetic engines, direct phrase recognition and cloud-based speech recognition.

In an aspect, a method for removing sensitive information from a vocal stream may include receiving a copy of the vocal stream, converting the vocal stream to text, analyzing the text and identifying sensitive information in accordance with one or more rules, identifying the location of the sensitive information in the vocal stream, and redacting the sensitive information from the vocal stream. The sensitive information may be one of credit card number, security code, expiration date, PIN number, date of birth, driver's license data, social security number and financial account data.

In an aspect, a method of redacting incoming PCI sensitive authentication and cardholder data prior to recording may include caching an incoming vocal stream in volatile memory such as RAM, converting the vocal stream to text, analyzing the text and identifying sensitive information in accordance with one or more rules, identifying the location of the sensitive information in the vocal stream, redacting the sensitive information from the vocal stream, and at least one of storing and transmitting the redacted vocal stream. In some cases, there may be a redaction device attached to a recording system. The recording system may store unredacted incoming vocal streams to volatile memory on the redaction device. The unredacted vocal streams may then be redacted according to various methods described herein. In this way, the unredacted vocal stream need not be stored in non-volatile memory, facilitating compliance with various regulations on the handling of PCI data.

In an aspect, a method of redacting incoming PCI sensitive authentication and cardholder data from an incoming vocal stream prior to receipt by an agent may include caching the incoming vocal stream, converting the vocal stream to text, analyzing the text and identifying sensitive information in accordance with one or more rules, identifying the location of the sensitive information in the vocal stream, redacting the sensitive information from the vocal stream, and transmitting the redacted vocal stream to an agent. The method may further include transferring the unredacted incoming vocal stream to an alternate method of receiving PCI sensitive authentication and cardholder data. 5-6 seconds of the incoming vocal stream may be cached.

In an aspect, a machine for redacting PCI sensitive authentication and cardholder data prior to transmission may be clearly programmed to carry out the steps of the algorithmic method including identifying the recipient of an outgoing vocal stream, comparing the recipient to a set of approved recipients, for recipients not in the set of approved recipients, caching the outgoing vocal stream, converting the outgoing vocal stream to text using speech analytics technology, analyzing the text and identifying sensitive information in accordance with one or more rules, identifying the location of the sensitive information in the vocal stream, redacting the sensitive information from the vocal stream, and transmitting the redacted vocal stream to the unapproved recipient.

In an aspect, a machine for redacting PCI sensitive authentication and cardholder data prior to transmission may be clearly programmed to carry out the steps of the algorithmic method including identifying the recipient of an outgoing vocal stream, comparing the recipient to a set of approved recipients, transmitting the vocal stream to the approved recipients, for recipients not in the set of approved recipients, caching the outgoing vocal stream, converting the outgoing vocal stream to text using speech analytics technology, analyzing the text and identifying sensitive information in accordance with one or more rules, identifying the location of the sensitive information in the vocal stream, redacting the sensitive information from the vocal stream, and transmitting the redacted vocal stream to the unapproved recipient.

In an aspect, a system for redacting PCI sensitive authentication and cardholder data may include a data server deploying speech analytics technology, a hardware buffer for storing an incoming vocal stream, a speech-to-text converter for converting the incoming vocal stream to text, an analysis module for analyzing the text and identifying sensitive information in the vocal stream in accordance with one or more rules, a redaction module for redacting the sensitive information from the vocal stream, and a server for storing the redacted vocal stream.

In an aspect, a method for multi-level redaction of vocal streams including caching an incoming vocal stream, converting the vocal stream to text, analyzing the text and identifying sensitive information in accordance with one or more first rules, identifying the location of the sensitive information in the vocal stream, redacting the sensitive information from the vocal stream, archiving the redacted vocal stream and the text, analyzing the text and identifying sensitive information in accordance with one or more second rules, identifying the location of the sensitive information in the text, redacting sensitive information from the vocal stream, and archiving the redacted vocal stream and text.

In an aspect, a method of multi-level redaction of vocal streams may include caching an incoming vocal stream, converting the vocal stream to text, analyzing the text and identifying sensitive information in accordance with one or more first rules, identifying the location of the sensitive information in the vocal stream, redacting the sensitive information from the vocal stream, archiving the redacted vocal stream, analyzing the text and identifying sensitive information in accordance with one or more second rules, identifying the location of the sensitive information in the vocal stream, redacting sensitive information from the vocal stream, and archiving the redacted vocal stream and text.

In an aspect, a method of redacting PCI sensitive authentication and cardholder data from cloud based data may include converting the cloud-based vocal stream to text, analyzing the text and identifying sensitive information in accordance with one or more rules, identifying the location of the sensitive information in the vocal stream, redacting the sensitive information from the vocal stream, and storing the redacted vocal stream in a cloud-based storage system.

In an aspect, a non-transitory computer readable medium may include an executable program for redacting sensitive information from an incoming vocal stream prior to persisting incoming vocal stream to long-term memory stored thereon, wherein the program instructs a microprocessor of a recording device to perform at least the following steps: receive an incoming vocal stream, temporarily store the incoming vocal stream, convert the incoming vocal stream to text, analyze the text and identifying sensitive information in accordance with one or more rules, identify the location of the sensitive information in the vocal stream, redact the sensitive information from the vocal stream, and persist the redacted vocal stream to long-term memory. The rules for identifying sensitive information may include contextual analysis to identify information protected by lawyer/client privilege or doctor/patient privilege.

In an aspect, a non-transitory computer readable medium with an executable program for providing a dynamic graphical representation of an emotional state indicator may instruct a microprocessor to perform at least the following steps: receiving a voice communication, analyzing the voice communication in real time using a computer-based communications analytics facility for at least one of a language characteristic and an acoustic characteristic, determining at least one emotional state indicator of a participant in the voice communication using the at least one characteristic, and providing a dynamic graphical representation of the at least one emotional state indicator through a graphical user interface. The dynamic graphical representation may be provided to a user other than the first participant in the voice communication as the received voice communication is on-going. The dynamic graphical representation may be provided to the participant in the voice communication as the received voice communication is on-going. The dynamic graphical representation may be provided to another participant in the voice communication as the received voice communication is on-going. The user may be a second participant in the voice communication and the dynamic graphical representation is provided as feedback to the second participant during the voice communication. The user may be a non-participant in the voice communication and the dynamic graphical representation is provided to assist the non-participant in at least one of supervising and evaluating a participant in the voice communication. The acoustic characteristic may be at least one of a stress of words, an aggregated stress of a plurality of words, an agitation, a tempo, a change in tempo, an amount of silence, a silence between words, a gain in volume or energy of the words, a tone, an overtalk, a time lag between words, a time dependency between key words and phrases, an inter-word timing, an inflexion of words, and a temporal pattern. The language characteristic may be at least one of a category, a sentiment, a regulation compliance, a score, a text, an alternative text, a speaker, an agent data, an agent grouping, a call handling location, a time and date of call, a department, a skill or queue, a pertinent IVR path data, a call length, and a confidence in word match.

In an aspect, a non-transitory computer readable medium with an executable program for real-time quality monitoring of a plurality of in-progress phone calls stored thereon may instruct a microprocessor to perform at least the following steps: analyzing a plurality of in-progress voice calls, assigning metadata representative of the voice call based on the analysis, and displaying a visual representation of each in-progress voice call on a screen wherein the visual representation is representative of phone call metadata. Metadata representative of the voice call may include at least one of a category, a sentiment, a regulation compliance, a tone, a score, an agitation, a text, an alternative text, a speaker, an agent data, an agent grouping, a call handling location, a time and date of call, a department, a skill or queue, a pertinent IVR path data, a call length, and a confidence in word match.

In an aspect, a product that provides a visual indication of an acoustic analysis to a participant in the communication may include a receiver for receiving a copy of vocal communications from a plurality of heterogeneous sources in near real-time or real-time, and an analyzer for evaluating received vocal communications in near real-time including: a language module for analyzing the presence or absence of specific language, an acoustic analysis module for analyzing vocal communication comprising at least one of a stress of words, an aggregated stress of a plurality of words, an agitation, a tempo, a change in tempo, an amount of silence, a silence between words, a gain in volume or energy of the words, a tone, an overtalk, a time lag between words, a time dependency between key words and phrases, an inter-word timing, an inflexion of words, and a temporal pattern. The product further includes a sentiment assignment module for assigning a sentiment to the vocal communication as a function of the acoustic analysis and the presence or absence of specific language and a display for displaying at least one visual indicator representative of the near real-time or real-time evaluation of the vocal communication to one of the participants. The visual indicator may indicate the results of the near real-time or real-time evaluation by one of blinking, vibrating, shaking, moving, changing color, and changing a category label for the vocal communication. The analysis for the presence or absence of specific language may include identifying whether a required statement has been spoken within a specific time period. The required statement may be a "Mini Miranda". The analysis for the presence or absence of specific language may include identifying the use of profanity. The analysis for the presence or absence of specific language may include identifying the absence of compliance scripts.

In an aspect, a non-transitory computer readable medium with an executable program for emotional analysis of text communications may instruct a microprocessor to perform the following steps, including: receiving a text communication, analyzing the text communication in real time for at least one of a language characteristic and a non-word symbol within the text that mimics a verbal element, and determining at least one emotional state indicator of the sender from the analysis. The steps may further include providing a dynamic graphical representation of the at least one emotional state indicator through a graphical user interface. The non-word symbol may be at least one of an emoticon, a capitalization, a punctuation, an ellipses, and a spacing. The steps may further include storing the incoming text and the one or more emotional states in a searchable database. The language characteristic may be at least one of a category, a sentiment, a regulation compliance, a score, a text, an alternative text, a speaker, an agent data, an agent grouping, a call handling location, a time and date of call, a department, a skill or queue, a pertinent IVR path data, a call length, and a confidence in word match.

In an aspect, a non-transitory computer readable medium with an executable program for providing a dynamic graphical representation of an emotional state indicator may instruct a microprocessor to perform at least the following steps: receiving a voice communication, analyzing the voice communication for at least one acoustic characteristic, converting the voice communication to text using computer-based speech recognition, analyzing the text of the voice communication using a computer-based communications analytics facility for at least one language characteristic, determining at least one emotional state indicator of a participant in the voice communication using the at least one acoustic or language characteristic, and providing a dynamic graphical representation of the at least one emotional state indicator through a graphical user interface. The acoustic characteristic may be at least one of a stress of words, an aggregated stress of a plurality of words, an agitation, a tempo, a change in tempo, an amount of silence, a silence between words, a gain in volume or energy of the words, a tone, an overtalk, a time lag between words, a time dependency between key words and phrases, an inter-word timing, an inflexion of words, and a temporal pattern. The language characteristic may be at least one of a category, a sentiment, a regulation compliance, a score, a text, an alternative text, a speaker, an agent data, an agent grouping, a call handling location, a time and date of call, a department, a skill or queue, a pertinent IVR path data, a call length, and a confidence in word match. Analyzing the text may include matching portions of converted text to text strings such as key words and phrases.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context

BRIEF DESCRIPTION OF THE FIGURES

The invention and the following detailed description of certain embodiments thereof may be understood by reference to the following figures:

FIG. 1 shows a screen shot where it can be seen how the application assists in measuring and correcting hits, misses, false positives (FP), and the like.

FIG. 2A, FIG. 2B, FIG. 2C, and FIG. 2D depict embodiment dashboards.

FIG. 6 depicts an embodiment command post with colored tiles representing status of calls.

FIG. 7 depicts an embodiment detail for a call presented in the command post.

FIG. 8 depicts an embodiment call alert detail.

FIG. 10 depicts a compliance user case summary.

FIG. 13 depicts a customer retention user case summary.

FIG. 15 depicts a screenshot of a real time conversational analytics summary page.

FIG. 16 depicts a screenshot of a score builder screenshot for the emotion score.

FIG. 17 depicts a screenshot of a score builder screenshot for the dissatisfaction score.

FIG. 24 depicts a user interface for a topicminer cloud.

FIG. 25 depicts a user interface for a topicminer cloud.

FIG. 26 depicts a user interface for searching communications.

FIG. 28 depicts a compliance summary screen.

FIG. 29 depicts a compliance configuration screen.

Figure 2A:
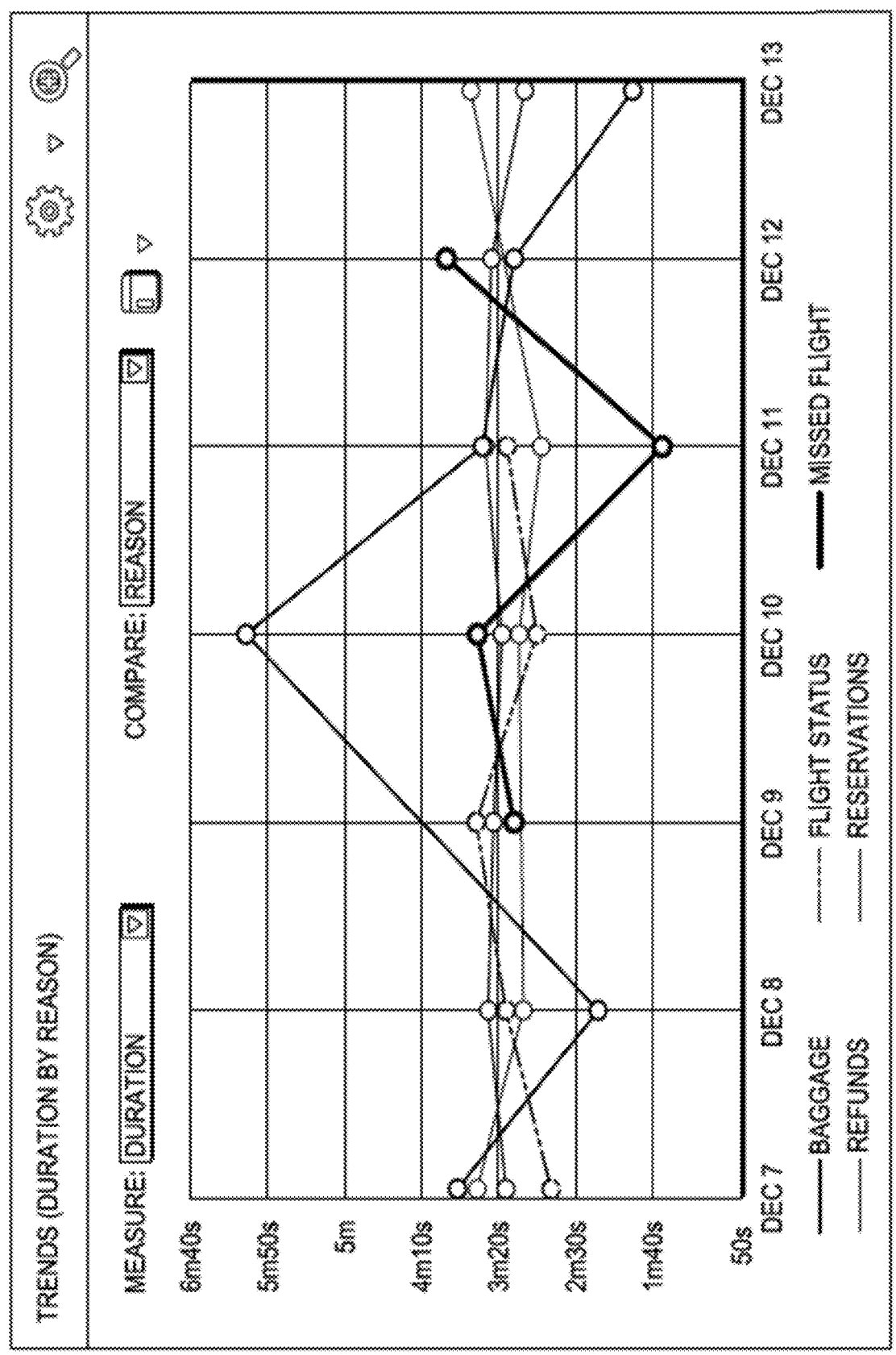
Figure 2B:
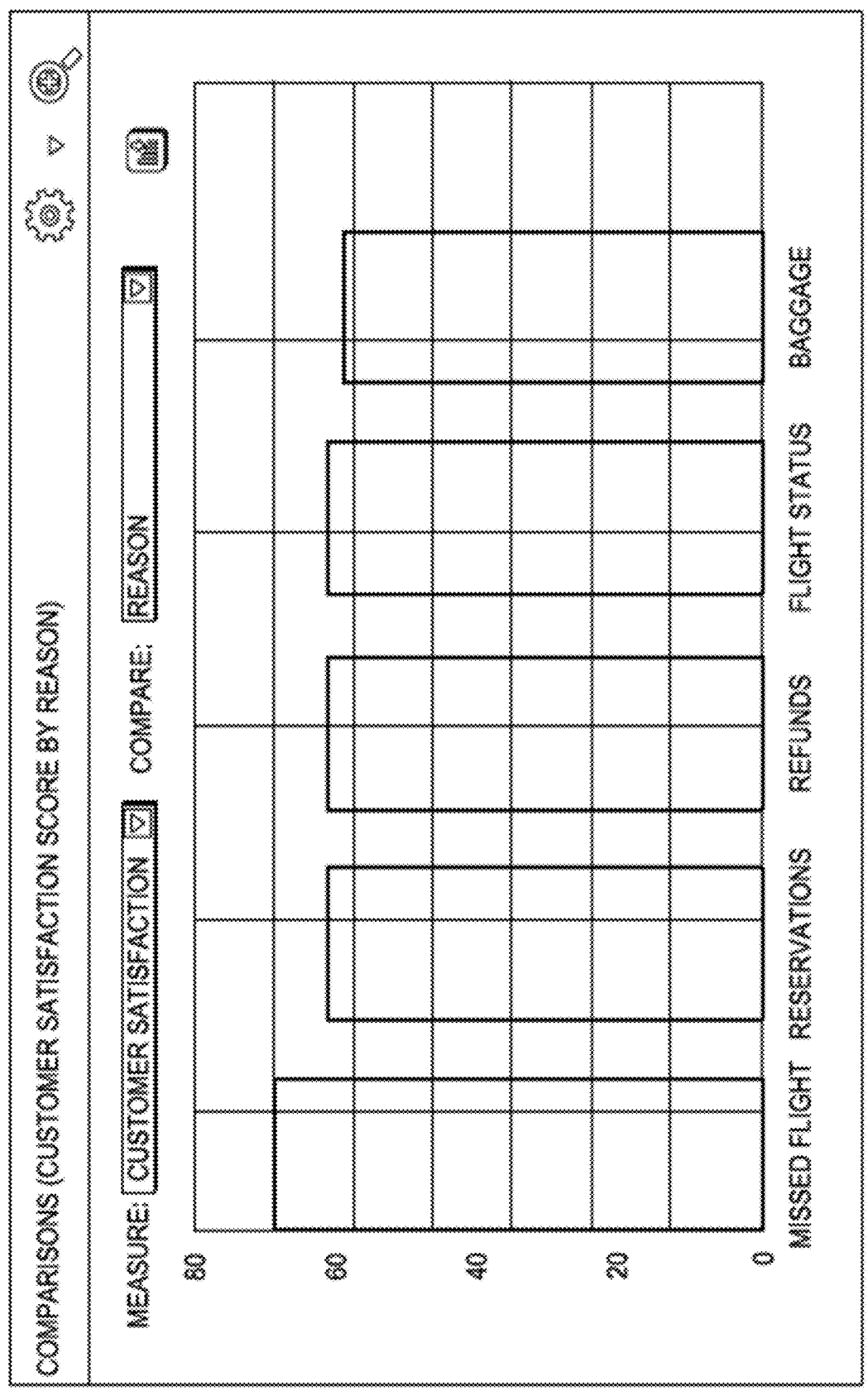
Figure 2C:
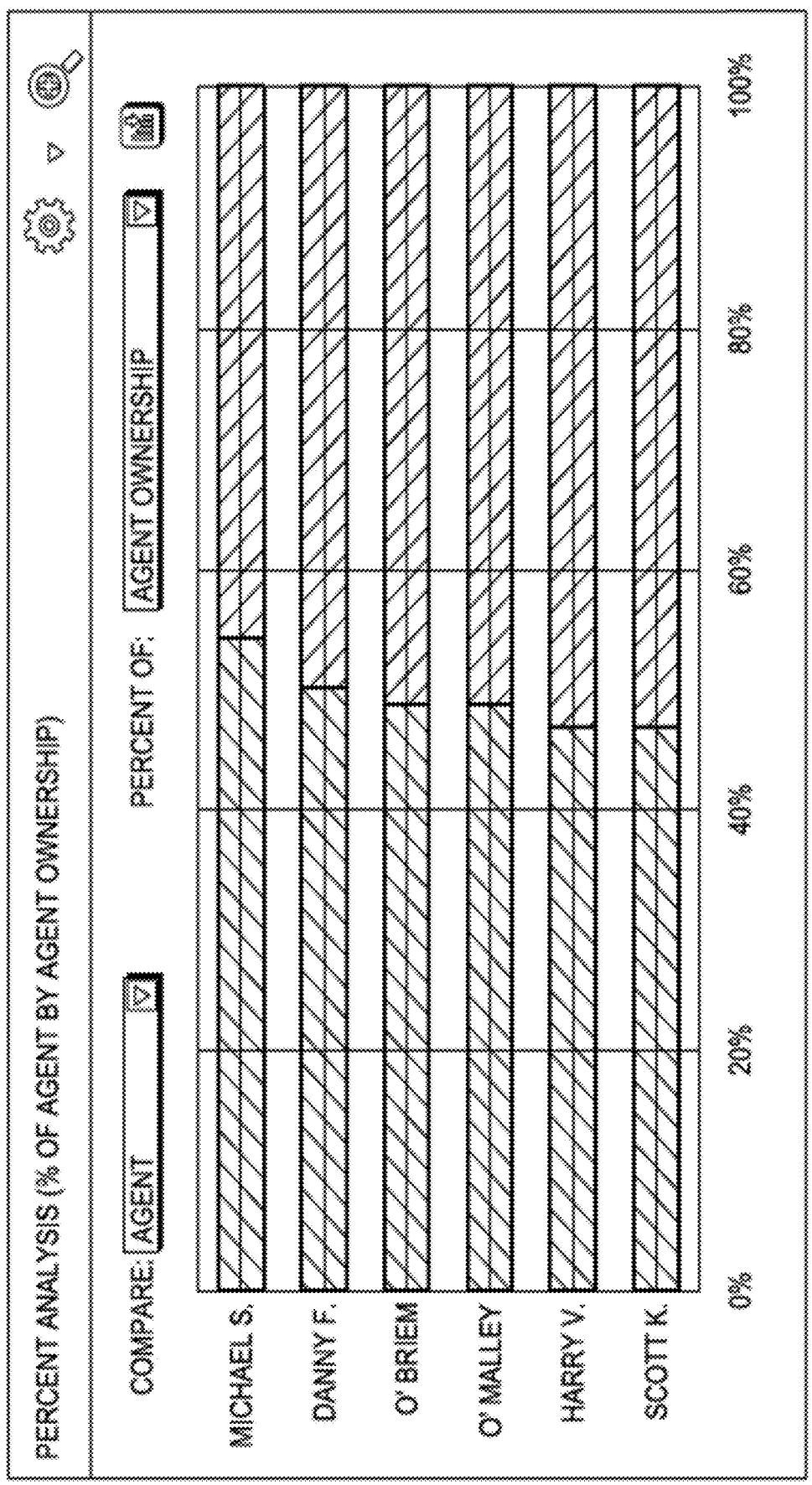

While the invention has been described in connection with certain preferred embodiments, other embodiments would be understood by one of ordinary skill in the art and are encompassed herein.

DETAILED DESCRIPTION

The present disclosure describes a real-time (RT) conversational analytics facility that provides conversational analytics and real-time, or near real-time monitoring of communications from multiple channels, such as phone calls, chats, text messaging, blog posts, social media posts, surveys, IVR, e-mails, and the like, and may provide for facilities that enable increased performance for individuals involved in live conversational support functions (e.g. enterprise customer support call center employees). Real-time or near real-time may indicate that the system processes the conversations as they are received in order to provide an output, such as immediate feedback, during the conversation as it is proceeding. Processing may be on the order of seconds, milliseconds, and the like. The real-time (RT) conversational analytics facility enables automatically evaluating in real-time or near real-time every communication (of heterogeneous types (e.g., voice, phone call [either to the call center or direct dialed to an agent], voicemail, chat, e-mail, blog, survey, Facebook, Twitter, Google+, other social channels, IVR, etc.) related to an activity, such as an activity of an enterprise, including in-progress calls, for sentiment/acoustics, categorization, and performance scoring, including the presence or absence of specific language or acoustic characteristics, utilizing acoustic and conversational analysis to convert communications to a text format for inclusion in a single database repository that includes fields for data relating to, at least, speech analysis/audio mining of spoken communications. The communications may be routed to a centralized host or handled by distributed computing systems in various embodiments disclosed herein or via a cloud-based system. The raw, unstructured data of recorded or real-time conversations is converted into consumable, structured data. Audio conversations are ingested by the system along with call metadata and speech-to-text transcription is performed to generate a transcript that is analyzed using a set of linguistic and acoustic rules to look for certain key words, phrases, topics, and acoustic characteristics. Along with the call metadata, these conversational and acoustic events allow the system to categorize and annotate the calls. In turn, the categories and events are incorporated into scores for each call, which can be used for automatically monitoring customer satisfaction, compliance, agent performance, and any number of customizable performance indicators.

Figure 26:
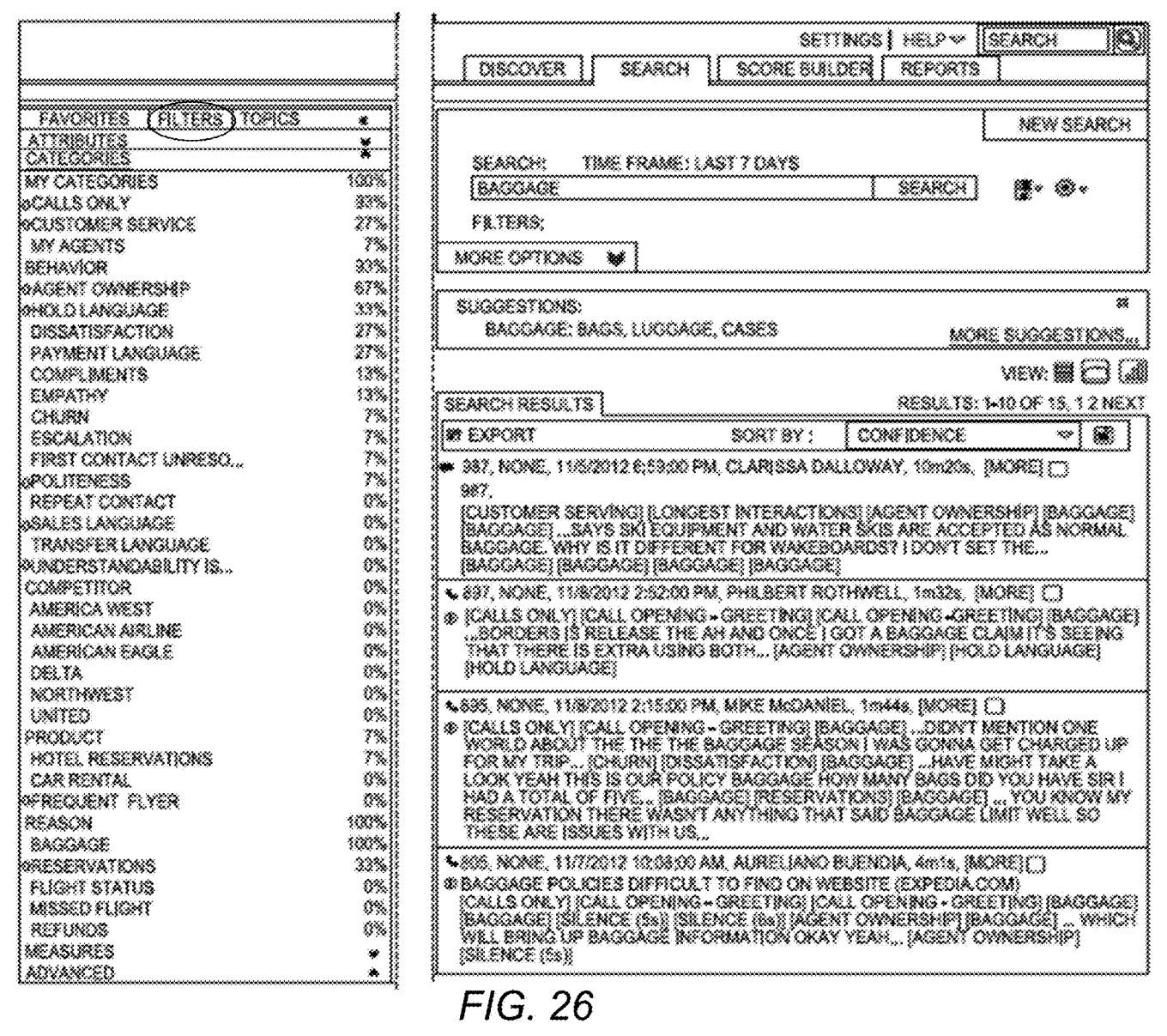

With the basic conversational analytics system (text and speech analytics), all contact points (recorded calls [that are speech recognized], chats, SMS, social posts, blogs, surveys, etc.) are converted into a consistent data structure/format so that they can all be stored in a unified database. All data from multiple channels are contained in the same database, and thus users can search, analyze, and receive reports across these channels through the same interface. For example, if a user wanted to search for instances of escalation across multiple channels, he or she simply needs to define the terms of the search through the main interface, and when the search is run, it will bring results from all forms of interactions. Similarly, users have the ability to examine data from only one channel or a select number of channels. For example, FIG. 26 depicts search results for the keyword "baggage" and results from both web chat customer support and audio calls come up in the search report. The conversational analytics system allows for free form search to find and play back contacts containing certain words and phrases or sharing other characteristics in a familiar web search user experience. The conversational analytics system allows for evaluation and comparison of performance and key metrics using data visualization. The conversational analytics system enables determining root cause through auto topic analysis and automatically identifying outliers. Output of text conversion/sentiment/acoustics analysis of customer conversations and associated metadata from any source communication system (call recorders, chat systems, emails, social posts (e.g. twitter, Facebook), SMS, Blogs and Surveys, etc.) and across multiple contact center sites and locations are stored in a database for a three step process that can be a cloud-based or an on premise call center monitoring solution that is scalable: (i) categorization; (ii) scoring; (iii) auto-analytics. A plurality of category labels are assigned for topics throughout the communication (e.g. Greeting, ID+verification, Behavior/emotions, Procedure discussed, Competitor, Churn, Likelihood for upsell/cross-sell, Agent performance, Customer satisfaction, Credit card (mention CCV code), custom categories, custom sets of categories, search-based categories). The system's sophisticated categorization capabilities are significantly more powerful than simple word and phrase spotting, with the ability to identify more complex language patterns. The ability to weight various discrete searches and set category thresholds allows both false positives and false negatives to be minimized. Category labels enables automatic topic identification for any freeform defined set of calls. Terms can be retrieved in a matter of seconds from literally millions of hours of an indexed database. The weighted sum of categories may be used to determine a scoring. A weighted aggregation of some categories may be performed. Scores may be tied to different goals, such as customer satisfaction, agent performance, etc. These and other systems and methods will be further described herein.

Conversational analytics may provide facilities that enable performance evaluation, determination of call contact influence factors, how to improve 'first-call' resolution, trend tracking and analysis, ad hoc searching, discovery, root cause analysis, handling efficiency, business intelligence, competitive intelligence, and the like. Real-time monitoring may provide facilities that enable monitoring, alerting, decision support, next-best-action guidance, script adherence, offer assistance, supervisor shadowing, monitoring of escalation, call intervention, course correction, immediate review of occurrences of events and infractions such as escalation attempts, the use of profanity, the absence of compliance scripts (e.g. has a mini-Miranda warning been delivered by a particular time or point in the call?), and the like.

The RT conversational analytics facility may provide for the capture of metadata by a recording system, including third-party systems. In addition, the RT conversational analytics facility may generate acoustic metadata, such as including stress of words, aggregated stress of a plurality of words, agitation, tempo, change in tempo, amount of silence, silence between words (implied distance between communication and response), gain or energy of the words, overtalk, and the like, of recognized speech or non-audio on each communication channel. For instance, the RT conversational analytics facility may include metadata to be captured such as text, alternative text (as determined by various processes, such as the one described in U.S. Pat. No. 7,346,509, which is incorporated by reference herein in its entirety), speakers, agent data (e.g., a unique identifier or agent name), agent grouping (e.g., a way to group agents for review purposes), location (e.g., where a call was handled), time and date on call capture (e.g., exactly when the call was captured by the recording system), department, skill or queue, pertinent IVR path data, call length, silence time or percent (e.g., largest block of silence in seconds), silence between words (e.g. implied distance between communication and a response), agitation aggregate, tempo, sentiment, category, score, confidence (confidence of the likelihood of acoustic match and the weight of the model based on previous word/context), aggregated confidence, gain or energy of the words, and the like. In non-audio communication, the analysis of stress/agitation may include analysis of emoticons, capitalization, exclamation points, punctuation and other non-word symbols that mimic verbal elements.

In embodiments, acoustically analyzed communications may be included in a sortable database. The database may be sorted to display the entries with the highest confidences for improved readability, instead of a random display.

Metadata in the system may be provided, such as providing tags or names, such as naming employees, supervisors, groups of users, and the like. For example, the system might refer to agents as 'Team Members'. With this, a name or handle may be substituted for the underlying data representation, where these names persist throughout the user interface. In addition to adding discrete and continuous data during each contact, topics, categories, scores, and the like, may be 'tagged' to a call. The system may provide for a default set as well as providing customization.

The RT conversational analytics facility may utilize large vocabulary continuous speech recognition (LVCSR), non-dictionary dependent system, or other speech recognition engines, such as those detailed for speech analytics (http://en.wikipedia.org/wiki/Speech_analytics). Although LVCSR is used herein as an illustrative speech recognition engine, one skilled in the art would recognize that other speech recognition engines may also be applied to the embodiments described herein, such as phonetic engines, direct phrase recognition, cloud-based speech recognition (such as SpeechAnywhere from Nuance), and the like. Due to the large variations in conversation topics and in speaker voices, the speech recognition engine should preferably obtain the optimal accuracy for word and topic identification. Language modeling may be used to inform recognition. The RT conversational analytics facility may ingest voice through a single pass upon receipt, where upon various data is gathered. These may include all the words that are spoken in the call, as well as acoustic information such as the level of stress in the voices, the amount of silence in the conversation, the rate of speech, overtalk, and the like.

Continuing to utilize a LVCSR speech recognition engine as an illustrative example, the LVCSR may perform not only a phonetic indexing of the data, but also may apply a statistically weighted language model to the sequences of phonemes to derive the most likely combination of phonemes into words (e.g., the sounds "Z" and "K" are rarely heard in that order) and sentences of what was actually being said (e.g., to solve for acoustic confusion, such as for example "recognize speech" versus "wreck a nice beach"). This is similar to how the human brain applies context to reason out of what is being said in a noisy environment. For example, if you are in a loud doctor's office, the nurse most likely said "Wait Here", not "Weight Hear". The RT conversational analytics facility may use a large collection of data, such as thousands of hours of conversational corpus to derive these models, such as utilizing the computational power of many servers to take the place of painstakingly slow manual proofing that is required by separate linguists using a phonetics-based solution. In the case of using a many-server solution, the investment in hardware to perform this automation may be initially slightly more than a phonetics solution, but this automation may lead to a lower overall total cost (TOC) (e.g., trading expensive phonetic/linguistic analysts for off-the-shelf hardware) and a quick payback on business intelligence. The increased accuracy allows the RT conversational analytics facility to derive valuable business intelligence from the audio in a matter of minutes or less, rather than the days it takes a human analyst to review the most likely phonetic candidates and conduct linear searches on the phonetic stream for matches, thus improving the overall speed and efficiency of the computer for analyzing conversations.

The comparison of 'phonetics' and 'LVCSR' is not merely comparing one technique that uses phonetics and one that does not. All LVCSR acoustic models are phonetically based. In both approaches, each phoneme is modeled in its phonetic context (e.g. the "t" between "s" and "r" in "street" is different acoustically than the "t" between the start of a word and "ah", as in "top"). While phonetic approaches do take into account what the possible sequences of sounds are and their frequency (for example, groups of consonants, such as "stldr" never occur in English), they do not typically take into account any higher-level knowledge of the language. In contrast, in an LVCSR approach, the larger context that the sounds occur in is taken into account as well, so in building a lattice of alternatives, only sequences that occur in real words in the language are included, and the likelihood of one word to follow another is taken into account in how likely each alternative is. This compensates for the fact that the sounds are very ambiguous and tend to merge with neighboring sounds (e.g. "dish soap") and the same sequence of sounds can be different word sequences: "let us pray" vs. "lettuce spray". The LVCSR approach algorithmically determines which alternatives are likely in the language, letting the computer mathematically sift through the results quickly and efficiently, rather than requiring a significant manual effort. The knowledge of what words exist, and are likely in the target language, is a major factor in higher accuracy.

An LVCSR-based RT conversational analytics facility may use a lexicon/dictionary with a large vocabulary, such as 50,000 words. The introduction of new words is fairly rare with a vocabulary of this size. The system may on occasion update the dictionary if a new word is repeated consistently across the tens of thousands of hours that the system mines daily. For those words not in the language model, a recognizer may choose a word that is phonetically similar. For example, in audio that has been processed containing mentions of a specific string such as the Verizon product term 'FIOS', the recognizer may consistently choose the word 'files'. Since the RT conversational analytics facility allows users to see the resulting recognition results, this may be easily found in the data. An alias rule may be set up so that in category definitions created to track mentions of the 'Verizon FIOS' product term, the underlying search could utilize the phrase "Verizon files" as a proxy for the term "Verizon FIOS."

In embodiments, recognition may occur as streamed recognition, with recognition of a word at a time versus snippets at a time until coming upon a trigger/viable context time. Contextual look-ahead may improve latency. For example, with respect to the word bankruptcy, the streaming recognizer hears " . . . ruptcy" after "Bank . . . ". Contextually, the phrase "I'd like to declare . . . " may be a signal. So if the streamed recognizer recognizes "declare . . . " followed by "Bank . . . ", then the recognizer may contextually look ahead and determine that it would see "Bankruptcy", thereby reducing recognition latency.

Confidence of acoustic match may be calculated and updated throughout the communication. In embodiments, the RT conversational analytics facility may calculate a confidence level in the translation of the call where the confidence level may represent an aggregation of the confidence levels for individual words within the call. Confidence levels for individual words may be based on the likelihood of an acoustic match and the weight of a context model based on neighboring words/context for individual words. The confidence level for individual words may be updated throughout the call before being finalized at the end of the call.

The RT conversational analytics facility provides advantages for conversation analytics, including allowing the process to be handled by computers rather than relying solely on human resources (e.g., some solutions only organize and structure data for easier human review and 'analytics', where the RT conversational analytics facility is capable of creating full transcription, categories, and quantification of all contact data and alerts without human intervention), providing an architecture that enables fast response times (e.g., because the RT conversational analytics facility may recognize and retain all the words in the conversation, the response time for users working with the application is fast, where other systems retain only phonemes rather than words, such that converting phonemes into words typically causes system performance and analyst productivity to suffer), true discovery (e.g., allowing for both automated and human discovery of trends or issues that users would otherwise not know to look for, such as 'having all of the words' in the data allowing for frequency and clustering analysis that is not feasible in other solutions), and the like.

With respect to data sources, the conversational analytics system may work with many data sources, regardless of the specific call recording system or combination of call recording systems, or sources of text contacts (e.g., voice, text, email, SMS, chat, blog, social network posts, and the like). The open adapters of the RT conversational analytics facility may integrate with multiple third party systems, within a single installation, and the like, to extract the contacts and associated descriptive data demographics (metadata) for processing. If an existing recording system produces speaker separated audio (stereo), the RT conversational analytics facility may identify the individuals in the conversation in all interfaces, and allow them to be analyzed and searched separately. The RT conversational analytics facility may include a cloud analytics and interceptor recording option for voice, where the fidelity of the audio surpasses any proprietary on-premises recorder option, resulting in unprecedented word transcription accuracy. The RT conversational analytics facility interceptor may record TDM and VoIP traffic in a speaker separated manner, such as an exact digital copy of the original conversation with no loss in quality. The Interceptor may be configured to record the IVR portion of the call and treat it as a separate segment. In an embodiment, recording can continue while one side is on mute or on hold.

In embodiments, a customer "call" center system may comprise a plurality of channels for receiving heterogeneous customer input to an enterprise, such as: phone calls to a call center; phone calls to an agent; voice mail; on-line chat; e-mail; blogs; surveys; Facebook; Twitter; Google+; other social channels; IVR; and the like. Customer input received as a vocal stream may be translated to text using a variety of speech analysis techniques such as phonetics, LVSCR, and the like. The translated text may be analyzed and the text categorized and scored. The customer input received as text may be analyzed and the text categorized and scored. A single searchable database may be used to store all of the received customer input such as: vocal stream as received; text translation of the received vocal stream; text as received; categorization; scoring; system metadata such as source of customer input, customer identification, agent ID, and the like; and the like. The database may be searchable by category, score, input source, and the like. In embodiments, database content may be displayed in an ordered manner where the order may be determined based on the value of a metadata category such as: alphabetically by category; ranked high to low by score. For customer input initially received as an input vocal stream the metadata used for sorting may relate to the translation of the customer input from vocal stream to text such as: confidence level in the translation; scores analysis related to auditory processing; and the like.

In embodiments, the recognition and analytics need be only done once to be useful for real-time analysis & monitoring, redaction and/or mining. In embodiments, storing the translation of the input vocal stream may eliminate the need to translate the vocal stream in the future for additional analysis. In embodiments, a multi-platform speech recognition system may facilitate real time vocal analysis and translation of vocal stream from a plurality of sources to text. The redaction of sensitive information, categorization of incoming vocal stream, scoring of incoming vocal stream, and data mining may be done in conjunction with the translation of the vocal stream to text or at a later date. Storing the text translation of the vocal stream may eliminate the need to translate the vocal stream again in the future should additional analysis be of interest.

With respect to accuracy, simple transcription accuracy may be a variable based on a number of influencing factors such as quality of the recording, mono versus stereo recording mode, voice transmission type (i.e. SIP or TDM), headset quality, accents, and the like. Accuracy levels in optimum conditions may be upwards of 95%, where the typical "transcript only" accuracy is typically more in the 55-60% range. Since the transcript is only the first step in the process, the key to substantially higher levels of interaction interpretation accuracy is centered on a next step in the analytics process, namely categorization. Categorization is a method of tagging a conversation that contains certain topics or characteristics, and the like. The RT conversational analytics facility's categorization capabilities are significantly more powerful than simple word and phrase spotting, with the ability to identify more complex language patterns. The ability to weight various discrete searches and set category thresholds may allow both false positives and false negatives to be minimized. Accurate categorization is required for accurate analytics. Use of the RT conversational analytics facility provides a tool that is more accurate than counting search hits by using categories defined by multiple weighted criteria and advanced language logic that maximizes hits while reducing false positives. This provides accuracy in categorization achieved despite the reality of imperfections in speech recognition. The system's automated categorization is more accurate and consistent compared to manual approaches, which translates into, for example, a 50% word accuracy achieving a greater than 80% categorical accuracy. The experience (e.g., such as through the generation of a large corpus) and learned modeling allows users to benefit from libraries of existing vertically targeted categories (e.g., 300 categories, 5400 patterns).

Categorization is a component of voice of customer conversational analytics (speech analytics, text analytics). Categorization is the automatic tagging of contacts that contain certain language patterns, keywords, phrases, or other characteristics. Any given customer contact is likely to be tagged as belonging to several categories. Categories enable a user to find, count, and trend contacts that contain these characteristics. In an embodiment, a common taxonomy of category groups may be used when tagging calls and text communications within contact centers across different industries. One category may be behaviors, for example, how agents or customers are behaving. For example, are customers expressing dissatisfaction, and is there an empathetic response to that dissatisfaction. Various language patterns, keywords, phrases, or other characteristics associated with the overall feel of 'dissatisfaction' may be included in a list for the category. When the listed item appears in the communication, the 'dissatisfaction' tag may be applied.

One category may be reasons, such as the reason for the contact, in voice often referred to as the call driver. For example, a customer may call their bank for a balance inquiry, and as a follow up the agent may conduct a transfer—each of these would be a reason for the call. One category may be procedures, such as whether or not agents are appropriately complying with procedures. This category may be commonly used in collections to ensure agents are saying things they should say and not saying things they shouldn't, according to FDCPA (or FSA) regulations. One category may be outcomes, such as measuring the response to specific actions. For example, how a customer responded to an upsell offer. One category may be products, such as whether or not certain products are mentioned. One category may be competitors, such as whether or not certain competitors are mentioned. Other categories may include dissatisfaction, empathy, repeat contact language, transfer language, politeness, and the like.

Category groups and definitions can be configured, created, and organized to suit a user's needs. The same methodology and often the same language patterns can be used across communication channels for consistent means of analysis and lower overhead in category definition. Categorization is optimized for big data, using simple, consistent algorithms regardless of the communication channel, while still supporting sophisticated language patterns. The language patterning is capable of measuring language in specific locations of conversation, order of occurrence of language, positive or negative rules, standard Boolean logic, and the like. In embodiments, categories may be customizable so that users can edit what they want to be as the language patterns, keywords, phrases, or other characteristics that should give rise to a particular label.

In embodiments, analysis may include acoustical elements such as time lag, time dependencies, inter-word timing, inflexion of words, gain in volume of words or series of words, and the like to provide additional context to the identification and categorization of specific words, phrases, and Boolean combinations thereof. In an illustrative and non-limiting example, a lag or change in emphasis between words may change the meaning of the phrase, indicating sarcasm, irony, and the like. In one example, the two phrases: "you know dude" and "you know . . . . Dude?" may be different. The first example may be rhetorical and the second a request for confirmation that the other party is present. In embodiments, the acoustical analysis may provide information on sentiment, agitation, and the like.

In embodiments, new categories may be automatically created over time. Differences and similarities between sets of calls, where callers are discussing a topic in one set but not the other, such as differences in phrases, words, acoustic characteristics and the like may be analyzed to look for indicators that a new category may be appropriate. A machine for evaluating archived call recordings, where the machine is clearly programmed to carry out the steps of the algorithmic method, may be used to analyze archived call recordings. The analysis may comprise identifying repeating similarities in words, phrases, or acoustic characteristics that are not already associated with a category. The identification of a new pattern of repeated similarities may indicate an opportunity for a new category. In embodiments, the new category may be derived from a repeating word or phrase, acoustic characteristic, or the like. In an illustrative and non-limiting example, an airline call center may have existing categories such as "delayed flight", "cancelled flight", and the like. However, a volcanic eruption, such as that in Iceland in 2010, may result in the sudden appearance of words such as "volcano", "ash cloud" and the like, appearing in calls categorized as "delayed flight" and "cancelled flight." A new category may be added called "volcano." This new category may facilitate distinguishing calls associated with the volcanic eruption from routine calls categorized as "delayed flight" or "cancelled flight."

Figure 24:
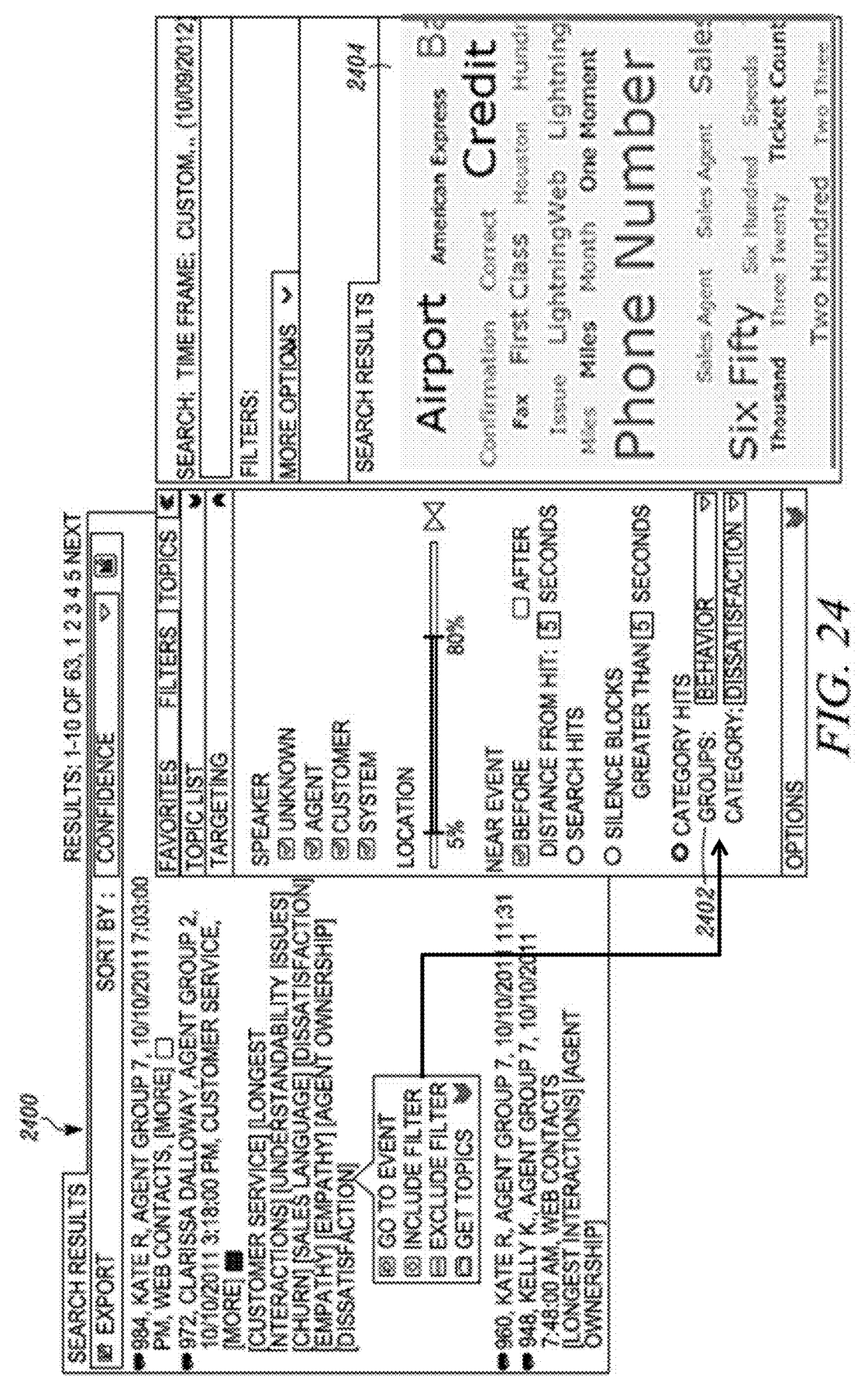

In embodiments, there may an ability to mine archived calls to identify the root topics for a given set of conversations. A user may be able to define a set of conversations based on one or more of a plurality of characteristics such as category, score, sentiment, agent, location, event attributes, call center, time of day, and the like. An analysis of all the words contained in the user-defined set of conversations may be performed and commonalities between the conversations identified. This may facilitate discovering additional common topics or event attributes associated with these conversations without any need for pre-definition of topics. Referring to FIG. 24, an illustrative and non-limiting example of a screenshot 2400 is shown comprising a user input interface 2402 and an output display of common topics 2404. The user input interface 2402 facilitates the identification of a set of conversations based on certain common characteristics. The resulting output display of common topics 2404 may provide insight into topics or characteristics that are more or less common among the selected set of conversations. The degree of commonality may be expressed as an ordered list, by font size of characteristic, as shown in FIG. 24, color, and the like. This may facilitate insight into commonalities in a set of conversations. In embodiments, changes in trends across all measures, categories and attributes may be identified. Outliers within a conversation set may be highlighted in comparison to a chosen baseline. This may facilitate user insight regarding where to pay attention and what is significant. The output display may be shown either as a tree view or as a tag cloud. Both provide a quick visual understanding of what is happening in the communications with no pre-conceived notion (or scripted query) of what to look for. The topic cloud can be alphabetically ordered, sized by frequency, colored by correlative relationship to each other, and the like. TopicMiner is a clustering engine that takes all the words contained in a set of conversations defined by the user, and presents various topics that drive these conversations. In essence, the system automatically discovers the nature of these conversations for the user without any need for pre-definition of topics. Referring to FIG. 24, users can even target results by speaker, location, and various event attributes. This allows users to get to the facts and contacts that reveal the issues within a conversation set rather than having to sift through each and every contact. In this example, one call is clicked on to 'Get Topics' and then a topic cloud is formed.

Figure 25:
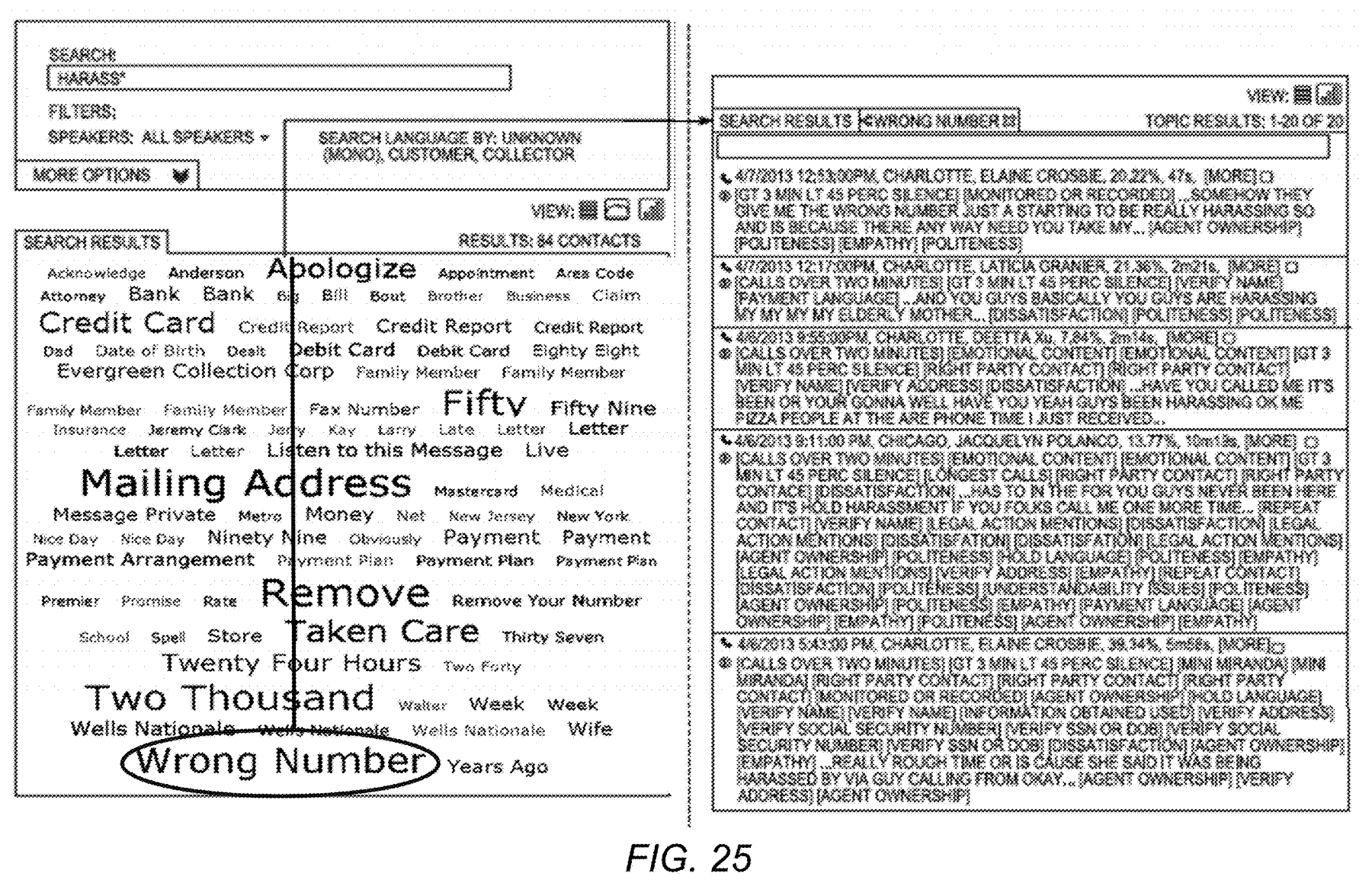

Referring now to FIG. 25, a search for "harass*" revealed many topics associated with communications that included the keyword "harass*". Once a topic cloud is formed, one can click a word from the cloud and the call list is filtered to obtain just the calls to which the topic belongs. In this example, the category "Wrong number" is being clicked to reveal those communications that include the phrase "harass*" and the category "Wrong Number". The topic cloud may also be modified to only include topics from the subset of calls. Thus, root causes, or insights you didn't know to look for are revealed through TopicMiner™.

The RT conversational analytics facility may provide full configurability of categories to the users in a friendly intuitive search interface. Each category search predicate may be weighted and refined with others so that 'context' can be achieved (e.g., a 10 digit number near the phrase "area code" is most likely a telephone number). False positives generated by events such as IVR and hold messages full of product mentions or customer service tactics (e.g., "please wait") are removed by either excluding the specific offending phrase from the aggregated list of results or by requiring additional evidence that this is indeed the topic being searched for (i.e. other topic mentions in close proximity, specific location in a call such as in the first 30 seconds, or speech recognition confidence thresholds). In addition, the RT conversational analytics facility may contain a set of pre-configured behavior categories that are common across all contact centers. These behavior categories may be tuned by identifying categories that are under or over-hitting on a specific phrase or topic, such as because of a matching script, IVR message, and the like, and narrowing search criteria to a more likely set of topic mentions. Finally, the huge statistical models of the LVCSR engine may ensure that false positives generated by the recognition process itself are minimized, especially in comparison to a phonetics engine. As new categories are created, or as words are added to the vocabulary, the data can simply be re-processed. Referring to FIG. 26, a search of communications for the term "baggage" reveals results from multiple channels of communications. The results can be sorted along multiple dimensions, such as confidence, score, duration, date, and the like. A filters tab may reveal scores per category for the communication(s) in the search results. Results may be drilled down by clicking on the particular category to review only those communications that have the keyword and the category from the filter. In an embodiment, outliers within each conversation set may be highlighted in comparison to a chosen baseline.

In an example, a customer service quality package may provide a standard set of 'instant insight' categories and scores to help measure the performance of agents and an associated contact center. The RT conversational analytics facility is relevant to a broad range of industries and includes a plurality of metrics, categories, scores, and the like. For instance, categories may include agent ownership, churn language, compliments, dissatisfaction, empathy, escalation, hold language, payment language, politeness, repeat contact, sales language, transfer language, understandability issues, and the like. Scores may include agent quality, customer satisfaction, emotion, and the like. Other metrics may include contact duration, percent silence, longest silence, tempo, word count, acoustic agitation, and the like.

In an example, a sales effectiveness package may provide a standard set of instant insight categories and scores to help measure the performance and effectiveness of sales personnel (e.g., agents in a contact center). For instance, categories may include sales ownership, assumptive close, upsell/cross sell, touting benefits, objection handling, do not call, dissatisfaction, payment language, politeness, empathy, hold language, transfer language, understandability issues, and the like. Scores may include sales effectiveness, customer satisfaction, emotion, and the like. Other metrics may include contact duration, percent silence, longest silence, tempo, word count, acoustic agitation, and the like.

In an example, a collections compliance risk mitigation package may provide a standard set of Instant Insight categories and scores to help measure and monitor compliance, such as the collections effectiveness of agents. Based on specific compliance rules, the RT conversational analytics facility automatically monitors in-progress calls, utilizing this package, for the presence or absence of specific compliance-related language. With the broadening focus of the Consumer Financial Protection Bureau (CFPB), and other federal, state and local officials on the collections industry, being able to effectively monitor compliance across all contacts is a requirement. This solution package may be relevant to first and third party collections agencies, financial services and other or organizations with collectors in their contact center. For instance, this package may include categories such as right party contact mini-Miranda, Fair Debt Collection Practices Act (FDCPA) violations, legal action mentions, dissatisfaction, risk & abusive language, wrong number, request for payment, promise to pay, refusal to pay, collector ownership, politeness, empathy, hold language, transfer language, understandability issues, and the like. Scores may include compliance risk, collector effectiveness, hot calls, and the like. Other metrics may include contact duration, percent silence, longest silence, tempo, word count, acoustic agitation, and the like. Thus, based on specific compliance rules, in-progress calls may be automatically monitored for the presence or absence of specific compliance-related language to provide alerts and enable immediate review of occurrences of events.

In embodiments, a search QA may be provided that is a specific tool that advanced analysts can use to build and test categories. Referring to FIG. 1, a screen shot is presented where it can be seen how the application assists in measuring and correcting hits, misses, false positives (FP), and the like.

With the ability to analyze and examine each contact, the RT conversational analytics facility may allow for automated scoring of contacts/communications, such as every call center contact. Scores may be created using a mixture of categories, acoustic measures, filters, attributes, and the like. This mix of tools allows analysts to tailor scores to fit the specific needs of an organization. These scores may be provided prominently to a user through the user interface. Scores for calls and non-audio contacts may be continually updated throughout the interaction. Once individual contacts are scored, they can then be aggregated and combined across different timeframes to identify performance trends. Scoring allows users to aggregate any number of metrics including category hits or weights, acoustic measures, and measures ingested as metadata, into a performance index that can be assessed against every contact. This data is then sent to the user UI page to provide direct and continuous feedback. When creating a score, Acceptable Ranges may be set in order to identify which score values correspond to good, average, and poor performance. These ranges may be used to provide feedback on performance across various timeframes.

Scores may be the most meaningful and useful information for effective consumption by business users. They are the basis for tracking trends, measuring improvements in performance, comparing peers, and the like. Scores may enable the organization to implement key performance indicators (KPIs) relating to customer conversations.

In embodiments, a score builder application may allow a user to edit or build scores in an intuitive and easy-to-use interface with a wide variety of configuration options. Scores may be assessed against any contact, or targeted to specific contacts defined through filtering (e.g., using metadata, attributes, acoustics, or categories). For example, a score may be assessed against contacts handled by certain agent groups, of a certain length, that contain escalation language, and the like. Configuration of weights for each component of a score may provide the control to fine-tune a score and to match existing manual performance measures, quality programs, and the like.

In embodiments, automated call center performance management with scoring may be provided. Scores help a user track performance trends over time and compare relative performance across different groups of contacts (e.g., such as agent groups or teams). A user may have the ability to define thresholds or acceptable and unacceptable ranges for scores, with the ability to label and color-code each range. Labeling and coloring target ranges may simplify the analysis of scores in heat maps, scorecards, or performance portals. Sometimes a grade, descriptive label, or color is more telling than the underlying number value. If the call recording platform has ability to do speaker separation, such as which dictates a "stereo recording" mode, then the system may be able to determine emotional scoring differences between the caller and the agent.

Scoring enables the aggregation of any number of metrics including category hits or weights, acoustic measures, and measures ingested as metadata, into a performance index that can be assessed against every contact. This unique ability to score every contact is the heart of the automated quality monitoring and performance management solution, but can be used to measure any key aspect of business performance such as agent quality, sales effectiveness, contact efficiency, compliance risk, customer satisfaction, network reliability (in communications), and the like. A Score Builder application and method enables editing or building scores in an intuitive and easy-to-use interface with a wide variety of configuration options. Scores can be assessed against any contact, or targeted to specific contacts defined through filtering (using metadata, attributes, acoustics, or categories). For example, a score can be assessed against contacts handled by certain agent groups, of a certain length, and that contain escalation language. Configuration of weights for each component of a score provides control to fine tune scores and to match existing manual performance measures or quality programs. Scores enable tracking performance trends over time and comparing relative performance across different groups of contacts (such as agent groups or teams). Thresholds may be defined or acceptable and unacceptable ranges for scores may be defined, with the ability to label and color code each range. Labeling and coloring target ranges simplifies the analysis of scores in heat maps, scorecards, or various user interfaces of the system. Action may be taken automatically based on the score, such as with a coaching tool. For example, for an agent scoring low in customer satisfaction, politeness training may be delivered automatically. Effectiveness of the training may be evaluated by re-scoring subsequent to the training.

Referring now to FIG. 15, a summary page of scores generated by the RT conversational analytics facility for a single call is shown. In this view, measures, such as percentage silence, date/time of the call, the duration, and an indication of agitation are shown. Various index scores, such as emotion score, agent quality score, agent quality—customer service, customer satisfaction, and compliance risk are shown. Various other index scores, individual behavior scores or other measures may be shown in this view. In this example, it can be seen that each index score comprises one or more individual scores that contribute to it. In this example, the emotion score is an aggregate of the dissatisfaction score, the escalation score, and the agitation score. In this example, the Agent Quality—Customer service score is an aggregate of the appropriate opening score, politeness score, agent ownership score, percentile silence score, proper hold procedure score, and empathy score. In this example, the agent quality score is an aggregate of the politeness score, complements score, percentage silence score, empathy score, and agent ownership score. In this example, the compliance risk score is an aggregate of the right party contact risk indicator, mini-Miranda risk indicator, and FDCPA risk indicator.

Referring now to FIG. 16, a view of the score builder application is shown. The score builder displays settings for which individual scores are aggregated to generate an index score. In this example, the emotion score is shown and the individual scores, or indicators, that are aggregated to generate the emotion score are agitation score, dissatisfaction score, escalation score, and negative emoticon. Indicators may be added or subtracted by the user. For each indicator score, a point range is given within which the individual score will be used in the calculation of the index score. In this example, the point range is 0 to 100 for each of the individual scores, however, it should be understood that any point range may be used in the calculation of the index score. For example, the user can modify the settings so that only points scores in a narrow range, say 60 to 100, are used in the calculation of the index score, and if the points fall outside of the range, the score is ignored for the purposes of calculating the index score. The point value may indicate how many times a particular phrase or a particular word was uttered during the conversation. For each individual score, there may be particular phrases or words that are counted. The phrases and words used for each individual score may be customizable by the user. In other embodiments, the score may increment on the basis of volume, tone, silence, occurrence of a specific event, and the like. FIG. 17 shows a listing of words and phrases that are category hits for the dissatisfaction score. For each time the word or phrase indicated in the 'Name' column is uttered, a count is incremented for the dissatisfaction score. Additionally, a weight may be applied to the counts for the uttered words and phrases when generating the overall dissatisfaction score. In this case, the weight is 1 for each of the words and phrases, however, it is understood that any weight can be applied to the words or phrases and the weight may be user customizable. For example, if the phrases 'angry about' and 'Board of Directors' were uttered during the conversation, the dissatisfaction score would be 2. In the example of FIG. 16, the dissatisfaction score is 0 indicating that none of the words or phrases listed in the behavior category of dissatisfaction was uttered. In some embodiments, the individual score is not calculated based on words or phrases uttered, but on the lack of words or phrases uttered. For example, a percentage silence score may be calculated based on the actual percentage of time that silence was detected during the conversation. As with the other scores that are based on the accumulation of detected words or phrases, the percentage silence score may also be weighted. Further, the weight may be user customizable.

Continuing with the example of FIG. 16, a weighting may also be used in the calculation of the index score. Once the individual indicator scores are calculated, a weight may be applied in the aggregation of the individual indicator scores to generate the index score. In this example, the dissatisfaction, escalation, and negative emoticon scores are more heavily weighted than the measure of agitation (which itself is a measure derived from the change in tempo, change in stress, and volume) in the calculation of the emotion score. If the settings depicted in FIG. 16 aside from the negative emoticon score are used in the calculation of the emotion score shown in FIG. 15, the dissatisfaction score would be weighted by 2/5, the escalation score would be weighted by 2/5, and the measure of agitation would be weighted by 1/5. Thus, the dissatisfaction and the escalation scores are 0, and the measure of agitation of 24.09 is divided by 5 to achieve the final emotion score, which is 4.8, rounded up to 5. For each index score, the aggregation method may be sum or average. There may be settings related to the index score. For example, particular ranges of scores may be associated with a description. In the example of FIG. 16, a score through 79 indicates the suspected emotion, a score from 79 to 80 indicates normal emotion, and any score above 80 indicates calm. The user may define any number of ranges. Each score range may also be associated with a particular color when displayed to a user. At least one score range made be identified as the target range outside of which an alert may possibly be generated. The user may indicate if the emotion score should be displayed as a numerical score, as the text description, as a color, some combination of any of the above, or the like.

Figure 18:
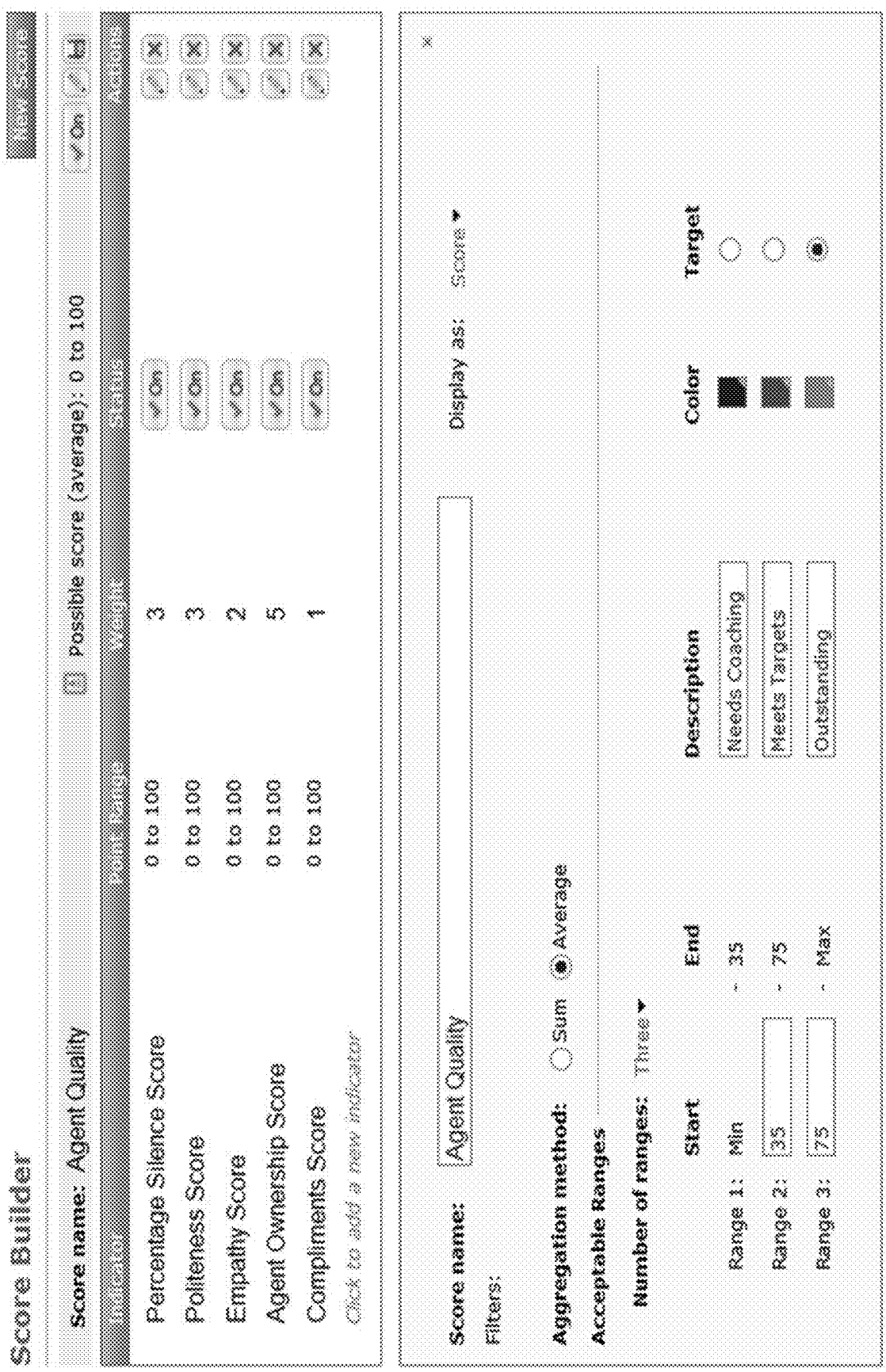
FIG. 18 depicts a screenshot of a score builder screenshot for the agent quality score.

Referring now to FIG. 18, another example of the score builder for the agent quality score is shown. In this example, the indicators are percentage silence score, politeness score, empathy score, agent ownership score, and complements score. When aggregated to generate an agent quality score, in this example, the percentage silence score is weighted by 3/14, the politeness score is weighted by 3/14, the empathy score is weighted by 2/14, the agent ownership score is weighted by 5/14, and the complement score is weighted by 1/14. Further, in this example, there are 3 defined ranges of agent quality score that are associated with a description. In this example, scores below 35 indicate needs coaching, scores between 35 and 75 indicate meets targets, and scores above 75 indicate outstanding. Each score range may also be associated with a particular color when displayed to a user, at least one score range made be identified as the target range, and the user may indicate if the score should be displayed as a numerical score, as the text description, as a color, some combination of any of the above, or the like.

The RT conversational analytics facility may examine the emotional content of a conversation from a variety of factors. For auditory data, the RT conversational analytics facility may measure emotion based on a combination of acoustic characteristics of each speaker's voice as well as the context of the conversation. These acoustic characteristics may include the amount of physical stress in the voice, the changes in the stress, as well as the rate of speech. All three of these components may then be combined based on a weighted average into a measure called agitation. Agitation by itself may be purely a measure of the volatility of a speaker's voice throughout a conversation. This volatility could be the result of an extremely negative event or an extremely positive event. The system may then take that measurement and combine it with the context of the conversation, which is revealed through the speech recognition engine. A final emotion score may be assigned to each call based on the aggregate of the agitation measure as well as the context of the call. A low emotion score may be associated with negative emotion and a high emotion score may be associated with positive emotion. For text data, a similar process may be used to generate an emotion score for each side of a conversation, but since text data does not contain acoustic characteristics, the system may measure other forms of emotional expressions, such as emoticons, capitalization, spacing, punctuation such as ellipsis, exclamation marks, and the like.

Each conversation, whether verbal or non-verbal, may be associated with an emotion score, and the score may be available for any type of analysis offered by the user interface. These may include trend analysis of emotion scores over time, comparison of emotion scores across various aggregations based on metadata, as well as inclusion of the emotion score in the construction of other measures.

Referring to FIGS. 2A, 2B, 2C, and 2D, example dashboards are presented that focus on the emotion score measure, including a trend graph (FIG. 2A), comparisons of the score across various aggregations/measures (FIG. 2B), Percent Analysis (FIG. 2C), a listing of contacts (FIG. 2D), and even the ability to pull up the best scoring (or worst scoring) calls directly on the front page of the application. The dashboard overview may provide an at-a-glance high-level review of the metrics and trends compared across data segmentation, such as type of contact, contact driver, agent group, agent, and the like. Each user, based on their interests and objectives, may dynamically configure the overview. Parameters of the charts can be changed on the fly, allowing the quick visualization of different information and comparison of data across the multiple charts. For example, for a trend analysis graph of compliance risk, if the chart showed a particularly high risk on a particular day, the data point for that day can be clicked on to drill down and obtain details of the communications that gave rise to the high compliance risk. An interface, such as the interface shown in FIG. 26, may reveal the search parameter (e.g. the selected time frame), may show transcripts of communications from that time frame, data on the scores per category for communications or communication sets, and the like.

Figure 3:
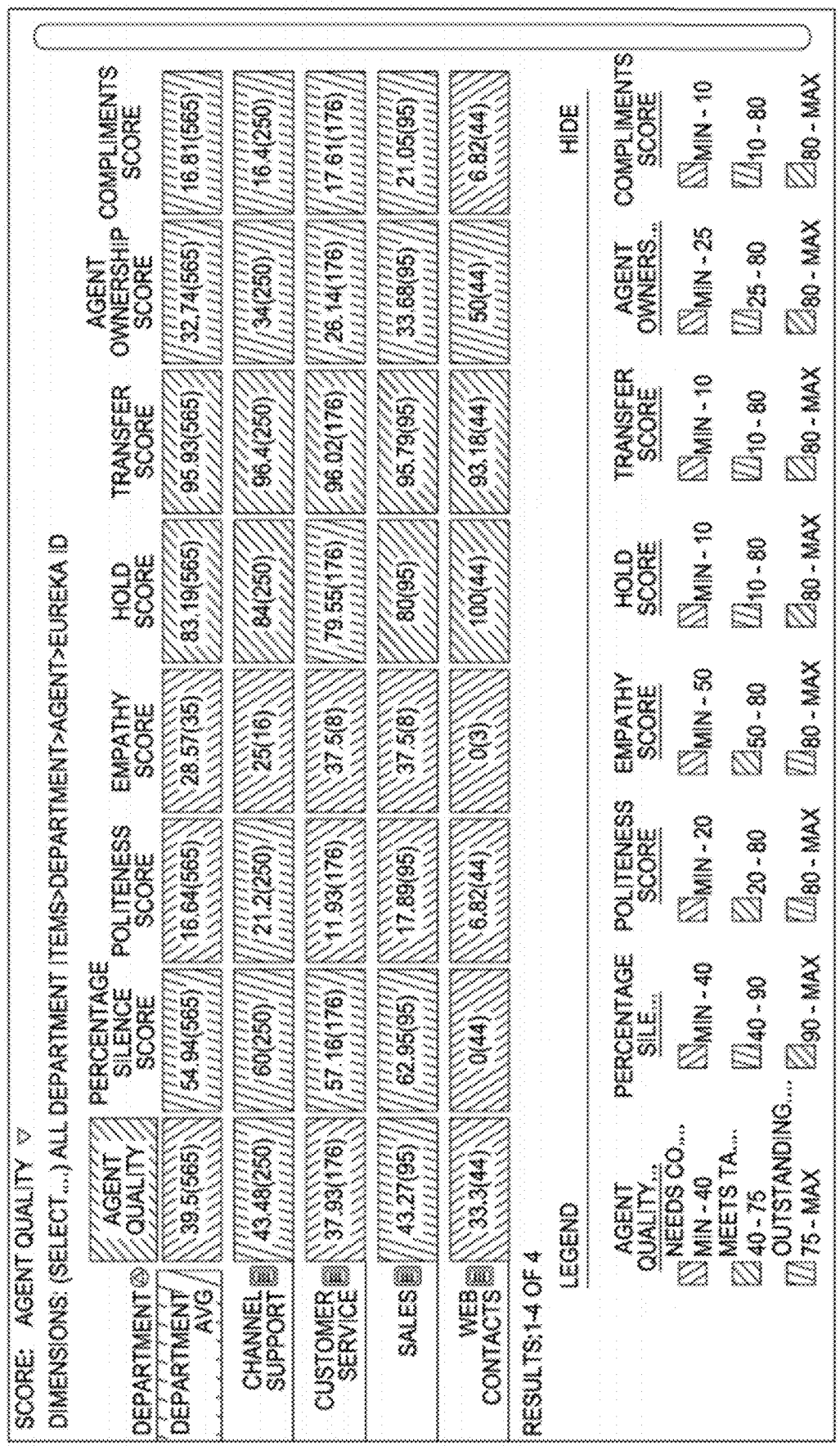
FIG. 3 depicts an alternative embodiment dashboard.

Referring to FIG. 3, another style of dashboard is presented to examine scores, the explorer. Explorer provides a 'heat-map' style summary of any score and its contributing indicators or score components. Scores may be grouped dynamically across any sub-categories. From the Explorer, users may be able to increase detail to include all underlying detail and effectively determine the root cause and record corrective or coaching actions.

Figure 4A:
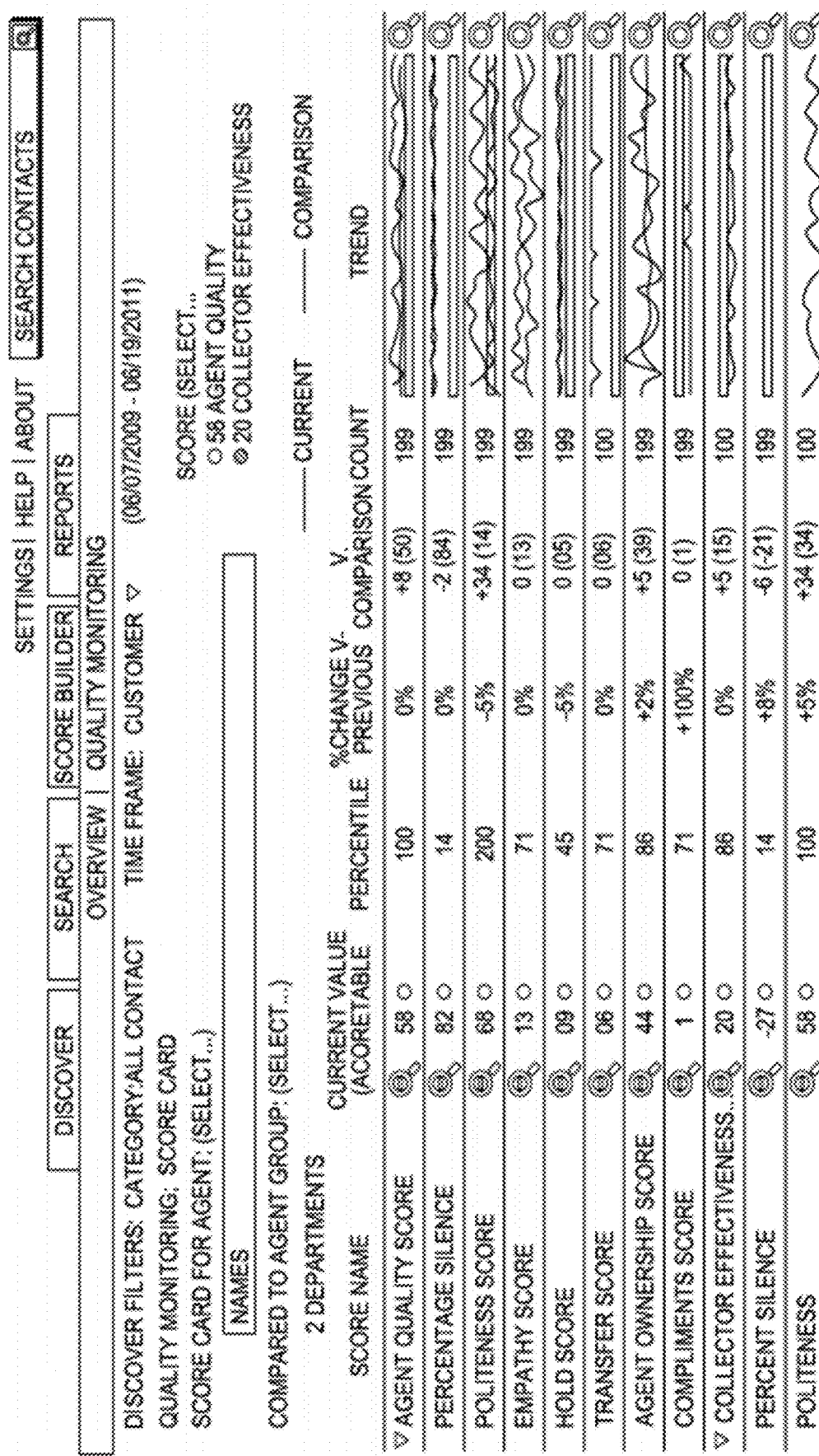
FIG. 4A depicts an embodiment scorecard.

Referring to FIG. 4A, with the score card, multiple scores and their contributing indicators may be viewed within a single page view that is designed for distribution to a person, group, department manager, and the like. A comparison for performance across scores and indicators may be drawn against a user-selected entity, such as another agent, group, or otherwise defined set of contacts. Performance feedback is delivered as continuous, plain language alerts and notifications, personalized for each user (individuals or team leaders) so that agents or supervisors can take direct action from feed items. Action may be taken automatically such as by delivering politeness training automatically to an agent in need, grading the agent's effectiveness, and then re-scoring the agent after training.

Figure 4B:
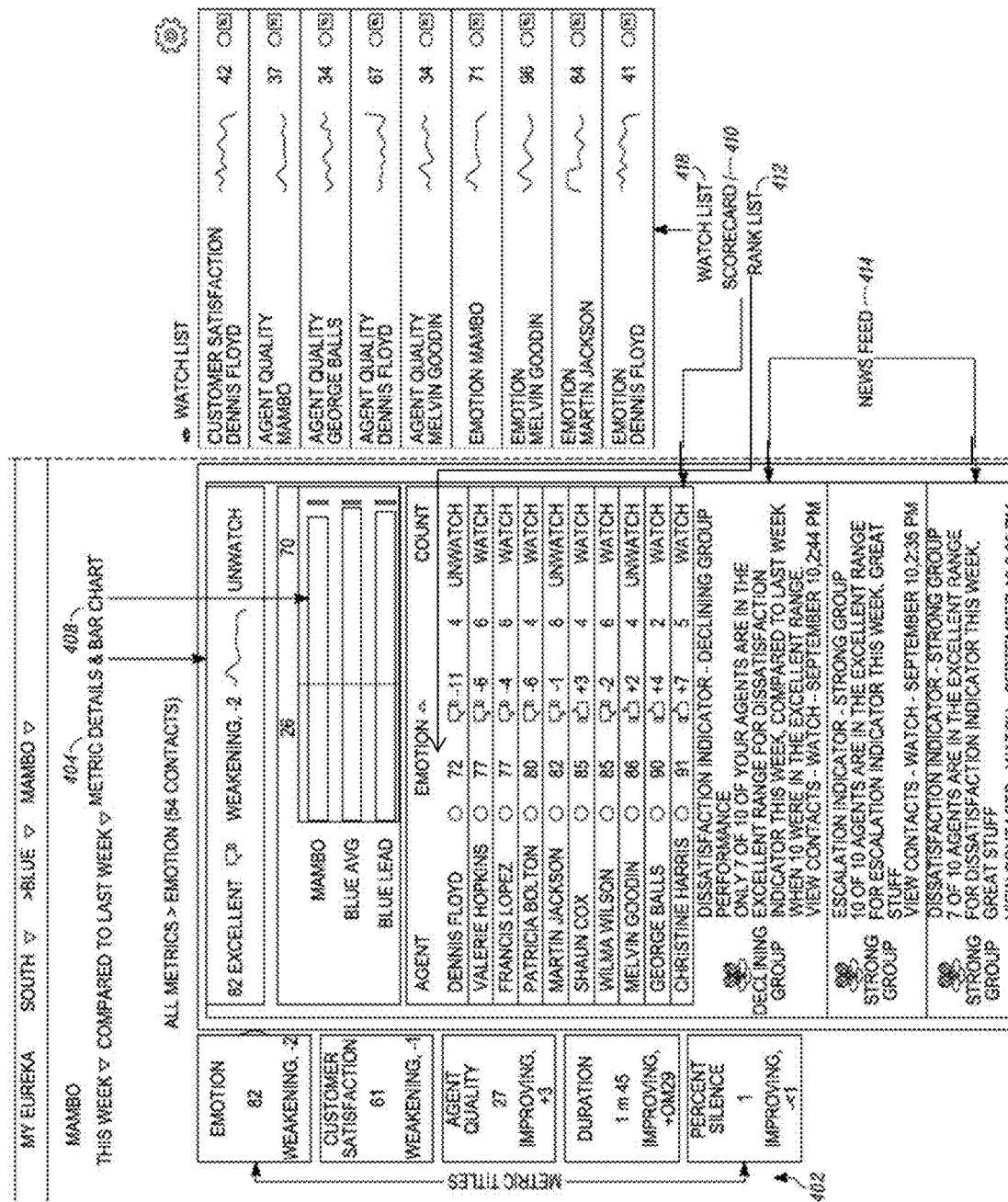
FIG. 4B depicts an embodiment of a personalized performance portal.

FIG. 4B displays another example of a personalized performance portal that provides contact center managers, supervisors, and agents direct access to comprehensible and continuous feedback, driving sustainable performance improvement. From this view, any individual agent can be selected so that all of the data pertains to that agent only. Agents or supervisors may have access to this view, so agents may be encouraged to compete beyond just hitting the minimum target since access to rank data for each metric and key performance driver motivates a competitive culture for high performance.

The Metric Tiles 402 are easy to read performance indicators that display current performance & trend information, and compare scores from the timeframes selected on the page. The score shown in the metric tile is generated using available contacts from the current timeframe for either internal data and/or third party data. If applicable, the metric tile also indicates whether a metric has improved or declined since the comparison timeframe when compared to the current timeframe. To view more details and filter the page by a metric, the corresponding metric tile may be selected. Metric tiles may aggregate automated scores, manual scores, & other key performance metrics from disparate systems. Metric tiles may enable quick interpretation of performance through box and value colors with configurable ranges. Users may customize which metrics to display for each team/group. Metrics may be displayed as numbers, labels, or ratings (80, A+, Exceeds Expectations, «««, etc.). Customers can customize "weighting" for each metric to their specific priorities and goals. Selecting which metrics to display is simple, such as by drag and dropping a metric from the Available Metrics column to the Selected Metrics column. Only metrics that contain data for the last month will be displayed in the Available Metrics column. For convenience, the Available Metrics column is sorted alphabetically. Once in the Selected Metrics column, a user may indicate whether they would like to display the metric numerically or as a descriptive label. The order of the metrics in the Selected Metrics column dictates the order metrics are displayed on the user interface. The Selected Metrics columns may be re-ordered by dragging scores up or down. To remove a metric from the Selected Metrics column, the corresponding 'X' may be selected; the metric should reappear in the Available Metrics column. To save the settings, the 'Save' button at the bottom of the page may be selected.

Metric Details 404 are visible when the page is filtered by a metric. Metric details Displays the metric score for the current timeframe along with an improving/weakening trend indicator. Also included in the Metric Details box is a sparkline graph. The sparkline operates independent of the page's timeframes, and is instead generated using data that is available for a time period. The sparkline allows a user to monitor the most recent performance for the selected metric, and can be added to a Watch List by clicking on the Watch link to its right.

The Bar Chart 408 is visible when the page is filtered by a metric. The bar chart is a visual representation of score data for the selected timeframes. The first bar represents the entity's current score value, while the next two bars provide comparisons against the entity's peers. The vertical line indicators on each bar denote the entity's previous scores according to the comparison timeframe. The bar chart's background colors correspond to the scoring ranges setup for that metric.

Scorecard 410 provides a complete breakdown of the selected score. Each score component is displayed along with its corresponding sub-score. In addition to providing an inside view for the selected metric, comparisons against past performance and that of peers is provided. For ease of use, information is presented in both text form and graphically.

Rank List 412 is visible when the page is filtered by a metric. The rank list displays the immediate child entities of the currently selected entity. Child entities are ranked according to score. The default view sorts entities on the list by score in ascending order. Child entities can be added to a Watch List directly from the Rank List by clicking on the supplied Watch links.

News Feed 414 displays several different types of items, from 'Did You Know' alerts, to action items from a supervisor. The news feed generates news items using the latest available data, so users can react and adjust performance as necessary.

Watch List 418 provides a snapshot of recent performance. Watch list may not be affected by the page timeframes, but rather may always display data for a predetermined time period. By monitoring the sparklines in the watch list, trends in recent performance may be identified and, if necessary, adjusted accordingly. Wherever there is a Watch link, it can be clicked to add the metric to the watch list. Individuals can keep an eye on key areas at risk or needing improvement through a personalized list.

Underlying contact information may be accessed readily from any of these dashboards. Views may be published or subscribed to for recurring distribution to an email account and to a selected schedule. In addition, a full set of predefined standard management reports may be developed through reporting services.

The RT conversational analytics facility may measure the amount of silence in a call at ingestion time. The process may involve looking for periods of silence, such as longer than 1.3 seconds long, and each of these segments may be captured individually. This granularity may allow the system to capture silence information in high detail. Users may be able to see the overall amount of silence within a call, the places during which silence segments occurred, the average length of those segments, the number of those segments, and the like. At a more advanced level, users may perform analysis on content before and right after silence segments to determine the reasons for silence. Silence measures may be present and available for use by analysts at different interaction levels. Silence may be used to define searches, incorporated into scores, used as aggregation for comparison of groups, used in creation of conversation sets for ad-hoc analysis, and the like. The measurement of silence may lead to determination of issues that can be tackled immediately upon the implementation of the system.

The RT conversational analytics facility may offer a comprehensive set of compliance features. The RT conversational analytics facility may have standard solutions that monitor every call, such as for Mini Miranda language, Right Party Contact language, FDCPA violations, abusive language from either party, and other risky language. Every call may be scored to identify relative risk level associated with an aspect of compliance based on content of the conversation. This may allow for narrowing corrective action efforts and investigation where they are needed most. Call analysis may occur in near real-time and tagging or indexing of violations within contacts may allow for immediate navigation to the occurrence of the violation. The RT conversational analytics facility may enable the ability to tag calls that are in or out of compliance, quickly conduct ad hoc searches for language, navigate directly to potential compliance breaches, produce compliance audit scorecards, pinpoint high risk teams and agents, and the like. The result may be lower cost and effort in monitoring, faster response times, and ultimately reduction and/or elimination of fines or lawsuits for non-compliance with CFPB regulations and the FDCPA.

Figure 27:
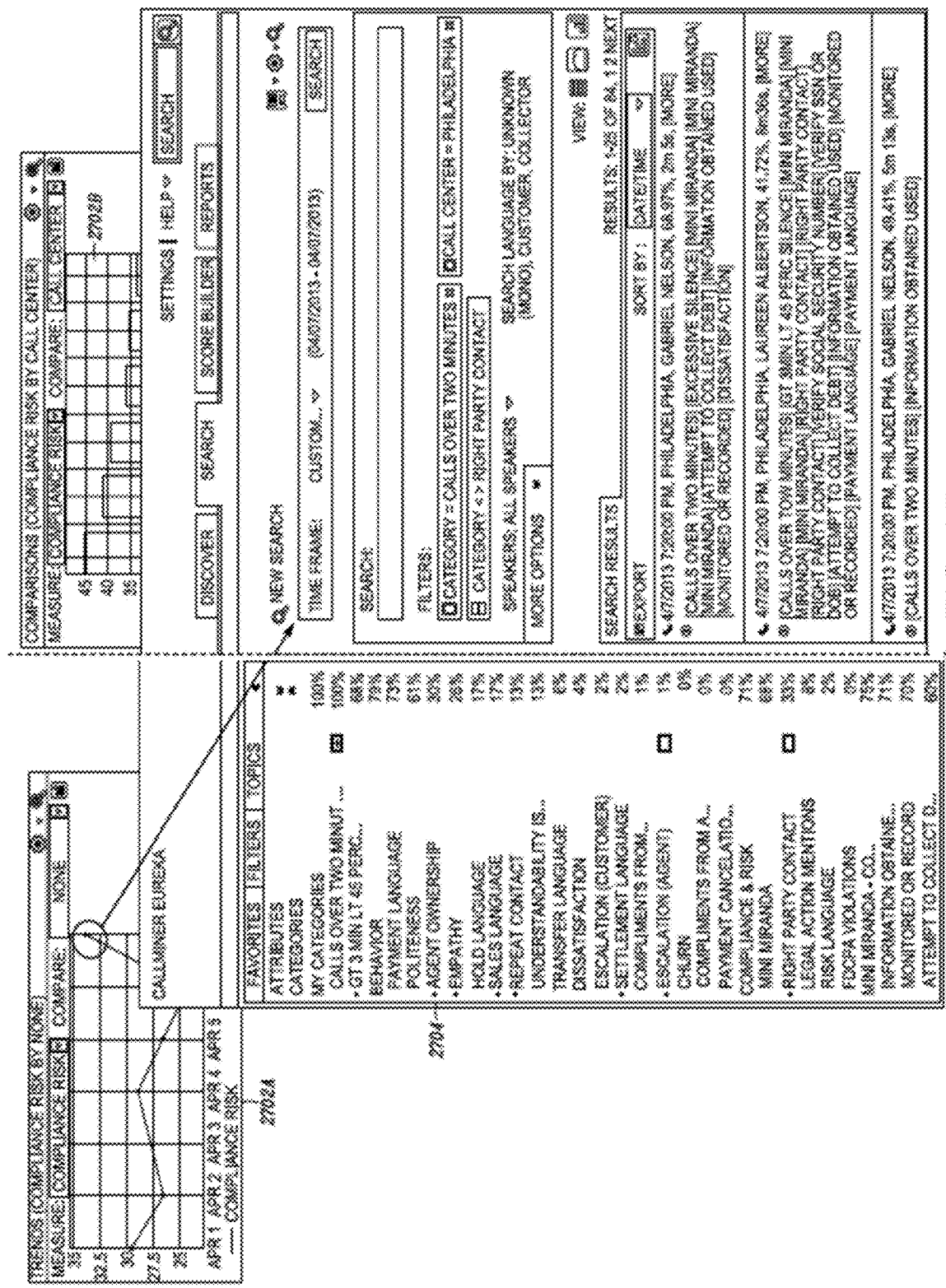
FIG. 27 depicts a compliance summary screen.

For instance, working in the debt collection and financial spaces the system may be able to fine-tune a baseline content to give clients a significant edge from day one. This content may include compliance related to the Mini Miranda, Right Party Contact, FDCPA, risks associated with legal action mentions, and the like. This content may be applied both from a post-call perspective to highlight non-compliant conversations as well as from a real-time perspective, to ensure that calls are proceeding in a compliant fashion. Supervisors may be alerted to situations where compliance was not met, and review and remedy or intervene in those calls. In addition, from an analytical perspective, the RT conversational analytics facility may help a client understand the compliance levels of various agents and agent teams and pin-point potentially problematic areas. Referring to FIG. 27, two illustrative and non-limiting examples of compliance summary screens 2702A 2702B are shown together with an example of a detailed drill down 2704 showing the specifics of the conversations aggregated in the compliance summary screens 2702A 2704. Referring to FIG. 28, another illustrative and non-limiting example is shown of a compliance summary screen 2702C displaying a list of call agents ordered by compliance risk. Although retrospective views are shown in FIG. 27-FIG. 28 it should be understood that this analysis may be done in near real-time or real-time on in-progress calls. In addition to the default content, the system may also provide users with the ability to define additional content related to more specific disclosures or other compliance items. These pieces may be easily configured via a standard user interface, and provide the ability to track both the presence as well as absence of specific compliance items. Referring to FIG. 29, an illustrative and non-limiting example of a compliance configuration screen 2902 is shown which may facilitate the ability to configure the compliance monitoring facility through such features as: adding additional content to be monitored for compliance; selecting which content is monitored; identifying action to be taken on identification of content associated with compliance; and the like.

With RT conversational analytics facility, a user may be able to automatically analyze a contact to protect privacy and monitor privacy compliance policies, review for explicit compliance language, such as FDCPA/CFPB and CCA requirements for credit discussions, monitor 100% of protected class discussions, forensically discover fraud and abuse risk and research events, automatically redact transcripts and mined audio for private information, such as social security numbers, credit card numbers, and the like, to ensure PCI compliance, and the like.

In embodiments, for integration, the RT conversational analytics facility may need access to at least two items: the calls/recordings and the metadata. Depending on the recording system, these can be retrieved in multiple ways. For recordings, they can come from a file share, from a web service, or sometimes from an API call. Metadata usually comes from the recordings system's database, but can also be ingested as XML files or CSV files. Some systems may involve database integration for the metadata. Recordings may be pulled from the file store of the recording system while ongoing calls may be analyzed in the cloud or as they are being recorded.

The RT conversational analytics facility may comprise several components. For example, on the backend, a site manager may be responsible for interfacing with various audio and text sources to prepare content for mining. One audio format may be PCM WAV (8 khz, 16 kbps) but other supported audio formats include those playable in Windows Media Player (AIF, AIFC, AIFF, ASF, AU, AVI, MOV, MP2, MP3, MP4, MPEG, MPG, MPG4, QT, WMA, WMV), WAV (linear PCM, 8 KHz, ulaw, A-law, GSM, MP3, G.726, G.729 encoding), VOX (ADPCM encoding), NICE.nmf., and the like.

A group of pipeline servers may then handle the processing. The site manager may control the assignment and assembly of information to and from these pipelines. For data storage, the system may utilize SQL Server and has multiple primary databases: The operational database may contain all mining results; the logging database may keep track of activity; the pipeline database may be used by a site manager to track mining operations, the reports database may contain the interface for third party systems to extract data, and the like. For the front end, the system web and search API may host the applications, a mongo server to host the database, and SQL reporting services to support report capabilities.

In embodiments, once a call/email/chat is available for the RT conversational analytics facility to ingest, the processing time may be dependent on the current contact volumes and the amount of hardware deployed. In some configurations, data may be available within seconds, while in other configurations with less processing capability, data may be available within, for instance, 5-15 minutes and 30-60 minutes during peak times. This may all be dependent on a queuing mechanism that is, for example, first in first out (FIFO). The system may support other queuing mechanisms that are designed to avoid FIFO queue starvation for high volume peaks. Pre-emptive FIFO may allow a portion of newest calls to the front of the line to ensure that backlog calls and new calls are being processed together. Audio may be cached and may include, for instance, 90 days of audio and word retention, with 13 months of business data retention (e.g., scores, category hits). In a premise-based environment, database storage may be a matter of storage allocation, such as configured at approximately 1 gb for each 2,000-2,500 hours of voice recordings. All original audio may be deleted on ingestion into the application. Only redacted audio may be stored for playback. Foreign languages may remain transcribed in their original language and not converted to English, however the categorization and scorecards may be converted to English.

With the RT conversational analytics facility, a user may gain the ability to quickly distribute this data to individuals at several different levels of the organization, leveraging the power of voice-of-the-customer analytics. By dispensing this data throughout the organization, the user may be enabled with information that allows them to improve performance, efficiency, decision-making, and the like. Typical distribution may be by email list. A report may be delivered one time or on a recurring subscription basis allowing a user to get regular updates for tracking and monitoring a specific metric or problem. A user may use a send report feature to automatically e-mail a report to individual users or groups. In addition, instead of emailing reports to a large distribution group, a user may be able to save the reports in a shared folder on the network. As long as the person viewing the report has access, the reports will open. This is an efficient way of managing a large volume of reports that are intended to be shared by a large group.

The RT conversational analytics facility offers real-time speech analytics on top of the foundational analytics structures described herein, which may be applied, for example, as a call center monitoring system, and may include a command user interface for an agent supervisor, administrator, agent monitor, and the like. Although a call center monitoring system is used herein, one skilled in the art will appreciate that the system may be applied to other systems where live monitoring of a caller or participant in a conversation is to be monitored to improve the ability for a receiver of the call to provide feedback in handling of the call, and additionally, for monitoring supervisors to more fully and actively assist the receiver, as well as monitor overall performance (e.g. for a plurality of call channels). In addition, and continuing with the call center example, an agent assistant for the individual agents may be provided, such as for flexibility and customization of scripts, campaigns, timing, acoustical tuning, weighting and fly-outs for script prompting and adherence, and the like.

The RT conversational analytics facility may provide features that allow both supervisors and agents to monitor live calls. On the supervisor side, a supervisor user interface for all ongoing agent calls may be displayed to a supervisor, and he or she can then easily track the general sentiment of each call as well as be alerted to adverse events (such as noncompliance or escalation). On the agent side, the system may provide an application that sits on the agent's screen, and provides feedback as the call is ongoing, which may be based on the categories and scoring described herein (e.g., an agent assistant or 'mood ring' that graphically displays attributes for the caller, such as in color code, text, blinking, vibrating, shaking, category label, and the like), such as described in FIG. 9, FIG. 10, and FIG. 11. The application may be set to provide reminders for agents to give mandatory disclosures, inform them if such actions have taken or not taken place, and the like. The system may also provide for advice to be displayed, such as in a graphical "fly-out" of the application, as certain language is detected on the call. For example, if the customer asks to "speak to a supervisor", the application can pop out a small reminder to the agent on the proper escalation procedures. There is no limit to the amount of different fly-outs that the system can configure into the application, and setting them is as easy as identifying the language that would trigger each fly-out, and the content of these fly outs. Since the content is driven from a central server onto the agent desktop applications, a user may only need to perform these content updates at one location. The agent assistant may be configured to show fully customizable guidance and alerts based on a variety of business scenarios. Agents may be provided next-best-action guidance in the form of links to relevant information or advice when certain items of interest occur on the call, for example: a technical issue with a product or a specific objection to an agent offer.

In embodiments, one or more screen shots of an agent's screen may be captured at different points during a call and stored in a searchable database together with a plurality of information about the call such as a recording of the call, categories assigned to the call, scores assigned to the call and the like. In embodiments, it may be possible to link a screen shot to a location in the call recording or text translation at which the agent would have been viewing the saved screen shot. In embodiments, the agent may select to initiate a screen shot. In embodiments, a screen shot may be initiated based on one or more of a plurality of metadata related to the call such as categorization, scoring, key words, sentiments, and the like.

The RT conversational analytics facility may benefit applications, including increased sales, improved legal compliance, increased customer satisfaction, and the like, thus maximizing performance, such as in industry contact centers. For instance, the RT conversational analytics facility may enable increased contact center agent performance in real-time while calls are still ongoing, such as to ensure positive outcomes. The RT conversational analytics facility may optimize real-time agent performance with state-of-the-art speech technology, monitoring ongoing calls in the call center, sending critical real-time alerts to supervisors, providing timely next best action guidance to agents, and the like. From the supervisor user interface command post, supervisors may be provided a view of key events on calls in progress, such as including customer sentiment, escalation attempts, compliance violations, sales opportunities, and the like, where the command post may automatically prioritize high-value call events, giving supervisors the opportunity to adjust performance in real-time (e.g., by making a crucial adjustment to the progress of the call). Based on conversational flow between agents and customers, the call agent user interface assistant may produce timely, relevant information and pivotal guidance to agents. For example, constant feedback of customer agitation may keep agents mindful of talk-down opportunities. Procedural scripts, qualifying upsell offers, or context driven guidance, may be automatically offered at critical moments, ensuring agents follow correct procedures and stay compliant with complex regulations.

Figure 5:
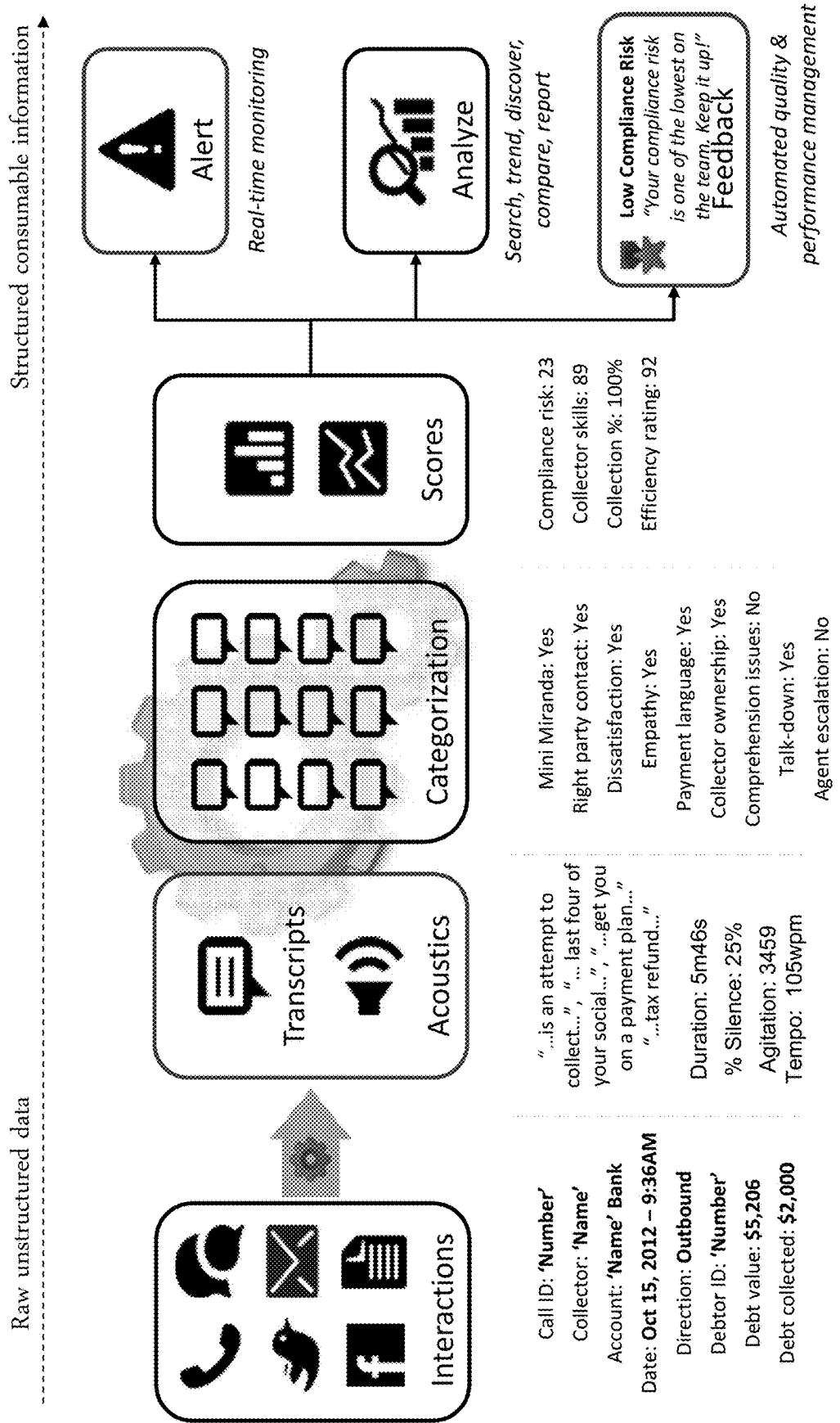
FIG. 5 depicts an embodiment high-level functional block diagram of the RT conversational analytics facility.

FIG. 5 provides a high-level functional block diagram of the RT conversational analytics facility, where the system takes the raw unstructured data from conversations, and turns it into consumable structured data. Real-time speech analytics analyzes live audio for ongoing conversation, and produces alerts and guidance (e.g., within seconds) of key events occurring on the call.

The process starts by ingesting audio conversations along with a rich set of call metadata, and performing full speech recognition transcription, such as based on large vocabulary speech recognition technology or other speech recognition technology. Those transcripts are then analyzed by a sophisticated set of linguistic and acoustic rules, looking for key events and topics of business value. Along with the call metadata, these conversational and acoustic events enable the system to automatically categorize and annotate each call. In turn, those categories and events may be incorporated into scores for each call contact, which may be used for automatically monitoring customer satisfaction, compliance, agent performance, and the like. The end result is a wealth of structured data ready for analysis, automated quality, performance management scorecards, real-time supervisor and agent alerts, and the like.

Figure 23:
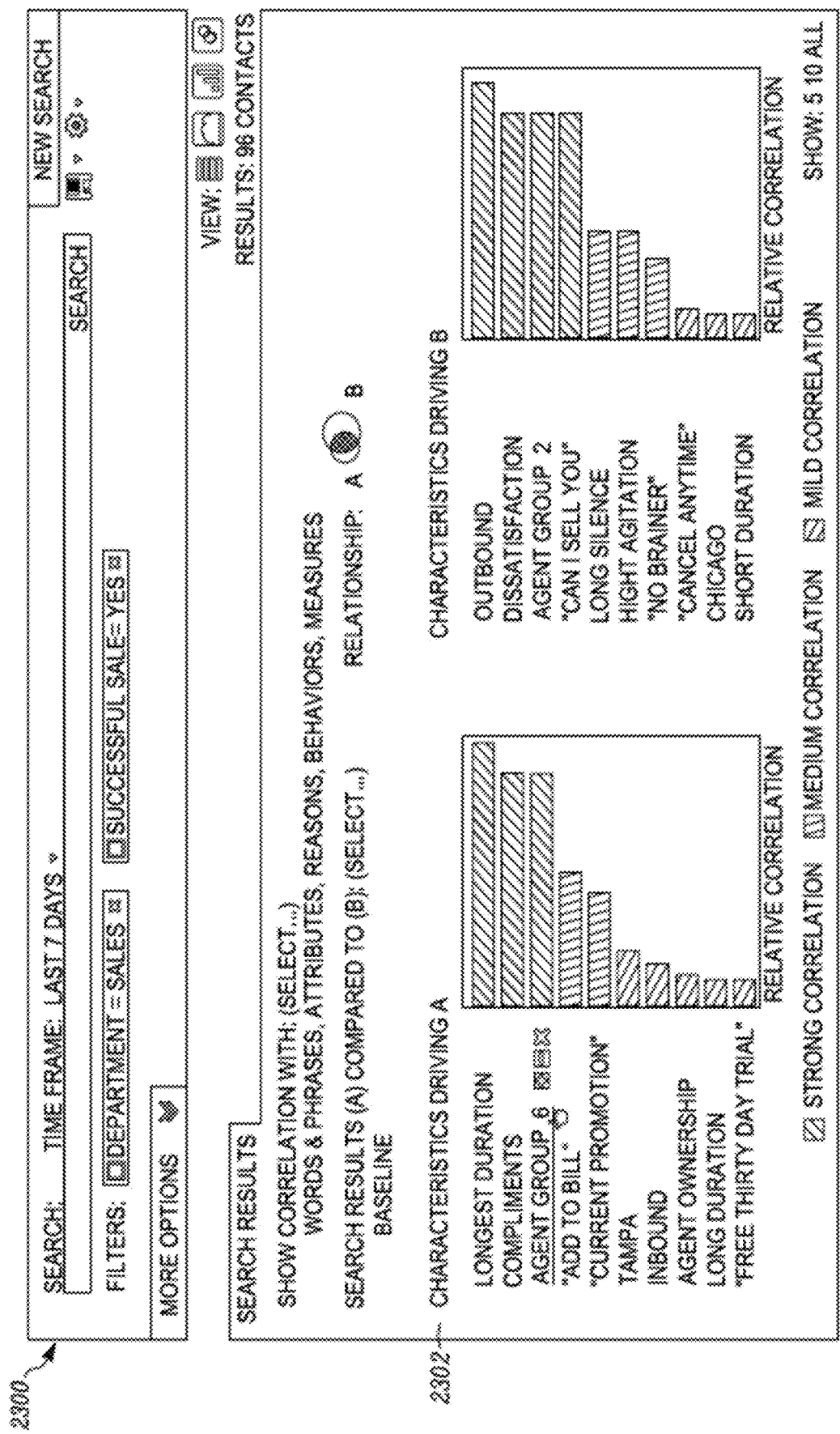
FIG. 23 depicts a user interface for AB testing.

In embodiments, this wealth of structured data may be used to facilitate AB testing. In embodiments, the system may facilitate the identification of two sets of data (A and B) having clear differences in one or more metadata values of interest such as agent, overall call performance, successful upselling, differences in script, differences in shift and the like. The rich metadata associated with the calls of each set may then be mined for similarities between calls within a set. These identified similarities within a set may then be compared with identified similarities in the other set and differences identified. Referring to FIG. 23, an illustrative and non-limiting example of a screen shot 2300 is shown comprising a display of the characteristics common 2302 within each of the two different sets of conversations. In an illustrative and non-limiting example, one set of agents (A) may be given one script, Script 1, from which to work while a second set of agents (B) may be given a different script, Script 2, from which to work. The metadata associated with the calls completed by agents A and B may be analyzed and similarities and differences between the two groups identified. If all the calls completed by agents in group A are ranked higher that those completed by agents in group B where the consistent difference is the script used, this information may be used to facilitate the selection of a script for future calls. In another illustrative and non-limiting example, calls may be divided into two groups based on successful upsell. The metadata associated with the calls may be analyzed and similarities and differences between the calls identified to see if there are certain scripts, agents, acoustic characteristics, and the like, which appear to correlate to successful upselling. This information may then be used to facilitate agent training for successful upselling. In some embodiments, it may be possible to complete the analysis on in progress calls as well as those in a recording archive. For example, communication scoring can be compared between agents who might have done actions/said something differently from their agents. Based on the testing, the system may suggest target phrases for future communications. In FIG. 23, the user has defined two conversation sets A and B, where set A represents calls during which successful sales are made, and set B represents those with unsuccessful sales. The discover analytics automatically processes the data from each set and compares them against a baseline to highlight what topics and characteristics drive A and what drives B. Users can then easily spot the key trends that drive a successful sale versus an unsuccessful one. This methodology can be applied to any segregation of data, and allow users to obtain valuable insights in near real-time.

The system may provide for a supervisor's user interface, also referred to herein as the 'command post'. The supervisor's user interface may provide for headline status and table view of a plurality of call agents. Calls may be sorted by overall status by default, such as with idle agents at the bottom, or other sorting criteria. There may be an interrupt column that allows the supervisor to flag calls (e.g., with color-coded priority) that have been interrupted or escalated for interruption. There may be a status column, such as for the status of current calls, calls that have been interrupted, and the like. There may be a 'talk-idle time' indicator that tracks duration of the call or between calls. There may be an agitation indicator showing the current level of agitation on each call, the highest level of agitation for each call, and the like. Violations may be selectable to access snippets, events, and the like.

Figure 6:
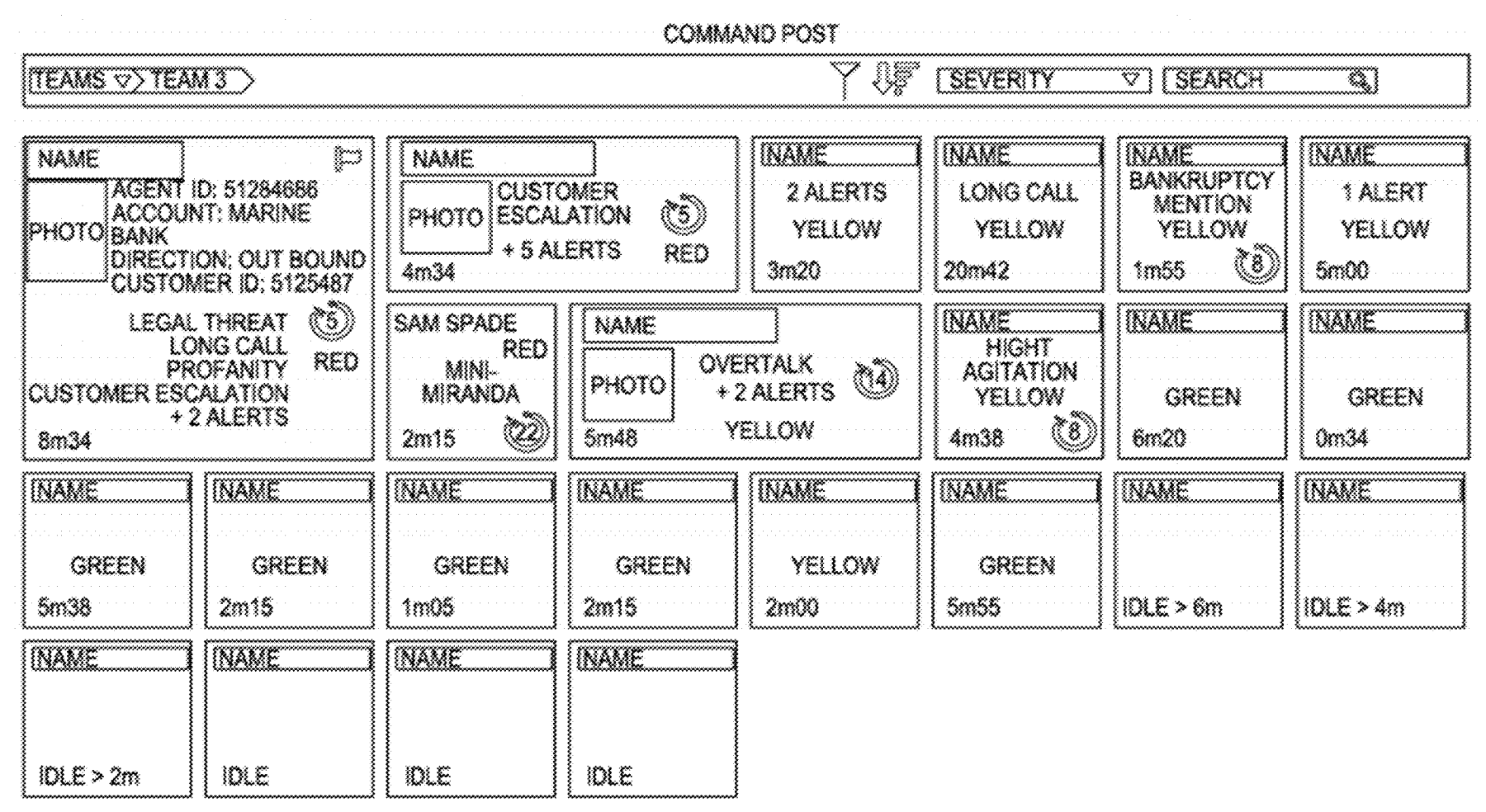

Referring to FIG. 6, the command post may show colored, or otherwise differentiable, tiles, each representing a live ongoing call from one of the agents in an agent group that are based on auto-analytics. In this representation, the green tiles represent calls that are going well, and the yellow tiles show calls that may be of some interest. The red tiles have been determined by the system to be calls that need immediate attention. The tiles may be organized alphabetically, by priority, and the like. When a live call goes through the system it appears on the interface, and dependent upon what language is used and the acoustic characterization of the voices in the conversation, the tile is, in this instance, color coded and correspondingly prioritized. Language used on the call may include key words and phrases that cause call priority to escalate in real-time from green, to yellow, to red, such as the sequence: "Hello, I have an issue I need to resolve" (tile starts out green), "Please let me speak to a supervisor" (the tile transitions to yellow, in response to the language and/or acoustic characteristics of the caller's voice), and finally "This customer service is ridiculous, and I'd like a full refund of my money" (red, in response to a still more agitated language and/or acoustic character of the caller's voice). All of the agent tiles may be sorted by severity, size, and/or color to indicate the status so that a user using the command post can quickly see which agents should be monitored. In this dashboard view of FIG. 6, the tiles are adapted for easy visualization, such as to be big, rectilinear, color block, white text, including relevant data with size, color and placement to provide a visualized score or work flow prioritization. Supervisors can keep an eye on key areas at risk or needing improvement through a personalized list of agents. A social construct (including a social feed) may enable commenting on the insights from auto-analytics and highlighting changes in the analytic flow. The comments may be promoted/sorted based on an "interestingness algorithm" which may account for seniority of commenter, frequency of comments, extent of agitation, and the like. Any user of the system may be able to comment on any of the automated feeds anywhere in the system. The comments themselves may be analyzed for the same acoustic values used to score communications. For example, a bad comment about an agent might rise to the call center manager.

Referring to FIGS. 7 and 8, a detail of the call is shown, such as provided in response to selecting the tile of interest. From this detail, the supervisor may be able to view each of the events on the call, the time they occurred, the text of what was said at the time, and the like. Other actions the supervisor may be able to perform from this interface is to play back each of the call snippets, play back the full call anywhere from the beginning to the current time in the call (the call is still live), such as in a similar manner as in a y1 digital video recorder (DVR) for the call. The supervisor may be able to add notes, and even chat live with the agent. Various agent statistics may be shown, such as alerts per call; alerts per day, legal threats, words that trigger, compliance triggers, volume of voice triggers, timing triggers (too fast/too slow), tempo over time (too slow paced), tempo in current call (too fast to be understood), overtalk, and the like.

The system may provide for a user interface, which is also referred to herein as an agent assistant. The user interface may provide for similar information as provided in the supervisor's user interface as limited to the calls for the particular agent. The user interface may also provide for a real-time graphical interface for indicating behavioral characteristics of the caller, as well as information for the agent, based on language, categories, scoring and/or acoustic characteristics of the caller.

Figure 9:
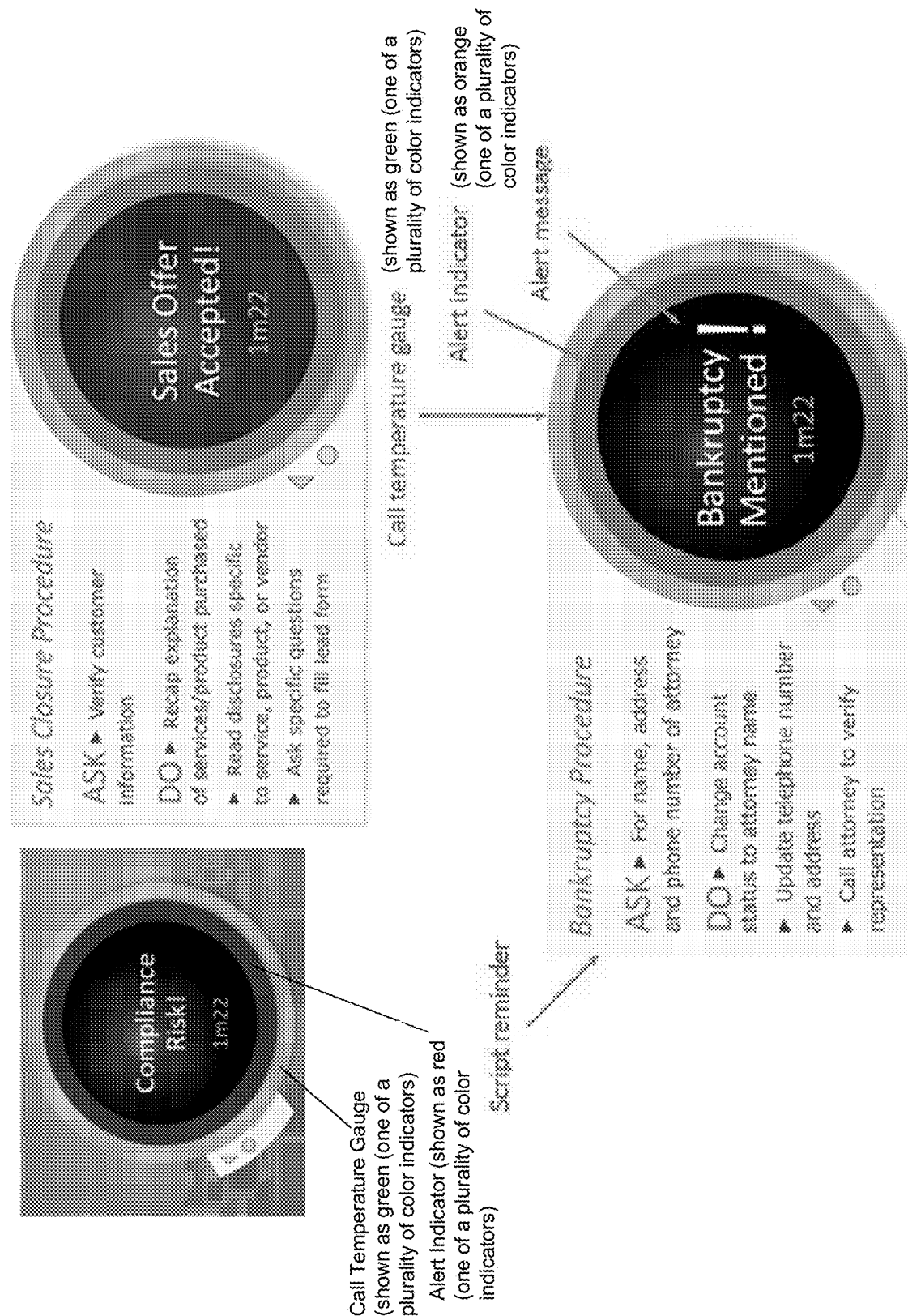
FIG. 9 depicts an embodiment user interface agent assistant.

The agent assistant may be provided on each agent's desktop to provide real-time alerts, next-best-action guidance to the agent (e.g. links to relevant information or advice when certain items of interest occur on the call, for example: a technical issue with a product or a specific objection to an agent offer), and the like. One example of the graphical indicator of the agent assistant is illustrated in FIG. 9, where color-coded rings surround an alert message area, where the alert message area displays messages to the agent, and the colored rings provide indicators of how the call is going. For instance, one colored ring may represent a 'call temperature gauge', showing through a color indicator of the emotional state of the caller as based on real-time language and/or acoustics analytics and scoring, such as green indicating a default condition where the caller is calm and the call is going well, orange indicating something has changed either in the acoustic characteristic of the caller's voice or in the language they are using, and red indicating the caller is now taking actions or has a tone that may indicate they are agitated, upset, and the like, and where the agent needs to take counter-acting measures. Another colored ring may represent an alert indicator that indicates the need to take actions by the agent, such as similarly indicated by different colors, augmented with alert messages, and the like. A ring may change color as the tone of the caller's voice changes, such as from green when there was silence, to yellow as the caller spoke louder, and finally red when the caller became agitated. For example, after the caller had spoken loudly and quickly for several seconds, a high agitation warning may be shown, such as by color ring indication and/or a textual alert message. Not only can the agent's assistant detect agitation/stress and other emotional states, but it can detect other acoustic events like silence or over-talk. Through the agent assistant, the agent may receive various textual and/or graphical feedback indicators to help them adjust to the changing behavior of the caller, thus improving the performance of the agent in handling the needs of the caller. In one embodiment, the outer ring changes color based on the tone of the call. If the color gets to "red", it shakes itself to calm down the agent. Acoustically, volume, tone, and agitation (which itself is a measure of tempo, volume, and stress) may be visually displayed in one of the rings, such as the outer ring, of the assistant and optionally displayed as the actual score in the ring such as the center of the ring. Another ring, such as the inner ring, may change color based on violations and to provide an alert. A portion of the mood ring may present an alert message.

In addition to the agent assistant providing behavioral feedback to the user, such as through color-ring indicators and textual messages, the agent assistant may provide for information in response to key words or phrases from the caller or the absence of key words/phrases, such as in information provided in 'pop-ups' or 'fly-outs'. For instance, in response to certain things said on the call an informational fly-out may appear with information relevant to the words that were spoken. Fly-outs may contain product information, feature information, up-sell suggestions, companion product suggestions, procedural scripts, links to knowledge databases, data related to the user's account (such as package tracking, order history, balance due, and the like), and the like. They may respond to not only the language on the call, but also to the absence of language, such as required disclosures that are missing. Fly-outs may contain information related to the agent such as reminders that required disclosures have not been made, cross-sell/up-sell trend analysis, tone, performance statistics, and the like. For example, if the caller mentions the word "bankruptcy" to a debt collector, a specific script may be provided to deal with bankrupt debtors. After a script is provided in a fly-out, the system may continue to analyze the call, now providing alerts to the agent based on whether or not one or more portions of the script were spoken.

For example, the agent assistant may be useful in compliance monitoring. With compliance monitoring, agents may be kept from creating very expensive finable compliance problems. In a debt collection scenario, the agent must deliver a Mini-Miranda warning within a certain period of time. If the agent is getting close to missing the window of time to deliver the warning, they are warned of a pending infraction via the agent assistant, such as by a change in color, size, a blink, a pulse, a movement, a signal, a text pop-up, and the like. If the agent violates, they are provided a remedy to deal with the violation. The remedy may be part of a fly-out or other communication to the agent. Using speech recognition and category labeling, every call may be tracked in real- or near real-time for Mini Miranda language, Right Party Contact language, FDCPA violations, abusive language from either party, and other risky language.

In another embodiment, when a call is received at a call center and the party is identified, a search for data is down with the identifiers. The system is listening and also knows who you are because of a "data dip". For example, in a call to an e-tailer, when a user asks, "Where's my stuff?" the status of all pending orders are brought out for viewing by the e-tailer. In another example, in a call to a debtor, if the collection agent is told that the user is in bankruptcy, the system pulls out a new script rapidly.

Figure 11:
FIG. 11 depicts a sales user case summary.
Figure 12:
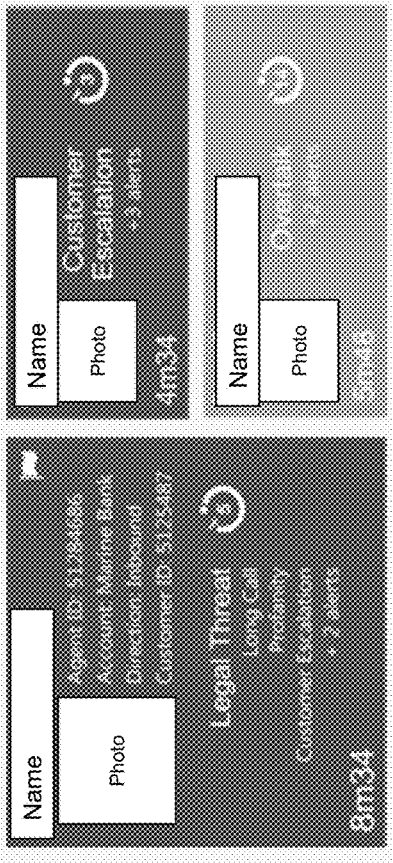
FIG. 12 depicts an escalations user case summary.

There are many powerful use-cases for the RT conversational analytics facility. Referring to FIG. 10, a compliance use-case may have the system prompt agents to time-sensitive scripts, event-driven procedures, warn agents and monitors of escalating calls, alert agents and monitors of compliance breeches, and the like, which may result in reduced complaints, reduced fines and litigation, improved call efficiency, and the like. Referring to FIG. 11, a sales use-case may have the system notify agents of up-sell or cross-sell opportunities, present targeted offers based on call metadata and language, guide agents on disclaimers and close procedures, notify supervisors for shadowing opportunities, and the like, which may result in increased revenue, improved call efficiency, reduced disputes, reduced returns, and the like. Referring to FIG. 12, the system may warn agents of increasing escalation of agitated customers and even offer appropriate talk-down suggestions. The system may alert supervisors immediately to escalation, and offer the opportunity to defuse situations before they get out of hand. This may result in reduced transfers, reduced complaints, regulatory appeasement, and the like. Referring to FIG. 13, the system may provide for greater customer retention, where the system detects churn language, advises agents to save procedures and offers or advise a redirect to appropriate re-route to a 'saves department', and the like.

Figure 14:
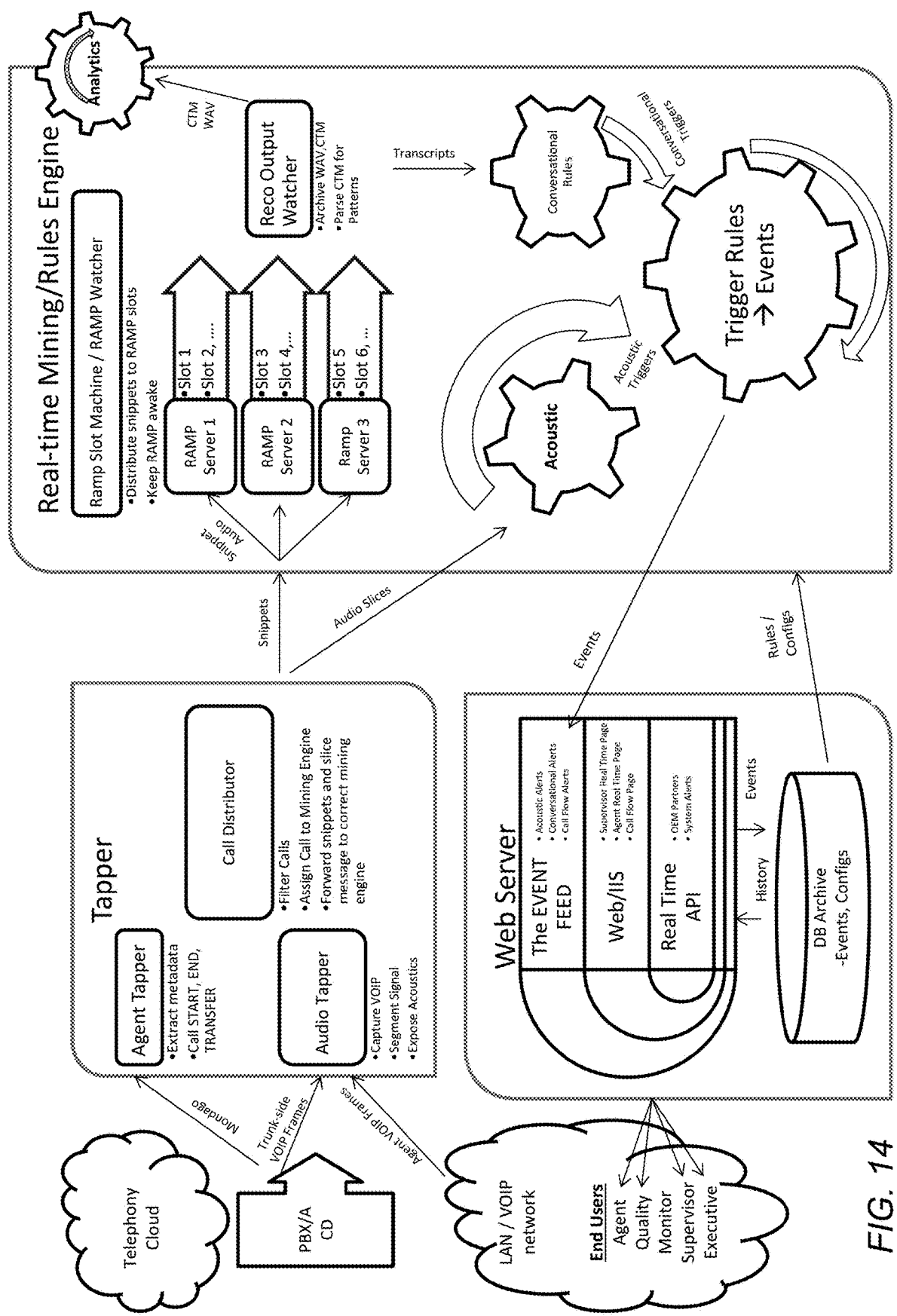
FIG. 14 depicts an embodiment functional diagram for the intake portion of the RT conversational analytics facility.

FIG. 14 presents an embodiment of a functional diagram for the intake portion of the RT conversational analytics facility, where calls coming in through the telephony cloud, and end-users (e.g. call agents, supervisors) coming in through LAN/VOIP, provide call portion streams to a call tapper and distributor. Call snippets (e.g., for snippet parsing and analysis, to be fed to a conversational rules facility, and on to the trigger rules and events facility) and audio slices (e.g., for analysis for acoustic triggers and trigger rules and events facility) are then input to a real-time mining and rules engine, which feeds the analytics portion of the system and feeds back events to end users through a web server providing an event feed (e.g., acoustic alerts, conversational alerts, call flow alerts), Web/IIS (e.g. supervisor real-time data, agent real-time data, call flow data), real-time API (e.g., OEM partners, system alerts), and the like. A database for archiving events and configurations may be provided, which may then feed back into the real-time mining and rules engine. The system may provide for a contextual real-time facility, such as including an audio slicing algorithm producing 'sentence level' events, acoustic and conversational patterns combining for intra-call events and alerts, context confidence thresholds used to suppress costly false positives, a real-time web interface that pushes alerts to users, and the like. The system may provide for workflow facilities, such as including an observer view for monitoring and addressing the most critical events in real-time, an agent view for monitoring recent call performance, a call flow view for receiving real-time intra-call feedback, and the like. The system may provide for volume scaling, such as including capabilities for handling a large volume of agents (e.g., greater than 1000 agents), a large volume of channels (e.g., greater than 100 channels), real-time architecture capable of supporting re-mining of data if necessary, and the like. The system may enable expandability, such as including an event feed as a subscription model that can be used by a third-party consumer of real-time business intelligence), a database archive of events for historical trending analysis, and the like.

Mining may be facilitated by a search engine. The search engine may embody a search method and language for identifying a pattern that may include timing (e.g. time lag, time dependencies, inter-word timing) rather than just words and phrases (or Boolean combinations). The search engine may be a data-type agnostic search engine that can search for speech parameters, such as time-based speech parameters, on any data source, regardless of type. The RT conversational analytics facility captures the time-based features of speech. Audio has lags, which place a constraint on how long the text takes to speak, that are lost upon conversion to text typically. Having captured this, a search can be done for a particular set of words with a minimum lag between them, for example. In a word flipping search, the search is done for any set of words spoken in any order within a time frame. The search engine combined with the categories (e.g. search-based categories) becomes a patterning engine. The search engine can accommodate searches constraints to guarantee words are there or are not there. The search engine may be scalable and may be cloud-based. In embodiments, speech parameters may be searchable in an Internet search engine. In an embodiment, stand-alone code with no database dependencies may be used to search data by speech parameters.

In an embodiment, a method for following a customer's journey with respect to a company/entity regardless of what communication channel they use (e.g. Calls, Chat, Email, SMS, Twitter, Facebook, Blogs and Surveys) may be enabled. From any customer contact, users may be able to navigate to previous or subsequent contacts from the same customer from any channel/platform. When contact linking is combined with Repeat Contact rules, it can be a very powerful tool for determining root cause of repeat contacts and poor first contact resolution, even when contacts cross channels. For example, a user may use Twitter to get an airline's support. The airline can track repeat communication via the Twitter ID. Then, the user may call and talk to the airline about something else. Then, the user may post a blog about the airline. These three communications can be tracked together. Scores may be mapped so that they become "super-interaction" scores or a score of loyalty. Since customers can touch the entity in a multi-channel way, the RT conversational analytics facility is uniquely adapted to unify these channels.

In recent years there has been increasing regulation relative to personally identifiable information (PII) such as date and place of birth, mother's maiden name, biometric records, medical, educational, financial, and employment information, social security number, credit card data, financial account information and the like. State and federal legislation has been enacted requiring business which receive and store such information to provide increased security with respect to such information such as logging all individuals having access to personally identifiable information, limiting the distribution of such information, encrypting the information, limiting accessibility to such information, and the like. Business may find these regulations impose an increasing cost burden. In some cases it may be more desirable to simply remove or delete any personally identifiable information from stored data. Businesses are not allowed to store PCI sensitive information such as account numbers or security codes. The redaction capability, by using conversational and acoustic analysis, can heuristically identify millions of possible combinations of potentially sensitive data and tag them. Additionally, instead of having a few dozen patterns, there are several hundred, each of them created and tested against a very large set of real data. Finally, when a "potential" area is identified, other patterns are deployed to ensure accuracy and overlap. For instance, if a ccv code mention is found, not only are the numbers removed, but expiration date and credit card numbers are explored for and identified for removal. In a sixteen-digit credit card, removing any four numbers makes it virtually impossible to exploit the credit card and removing any other data, like ccv codes or expiration dates eliminates possible fraud. In a large-scale test with an auditing body, no exploitable information was retained after the redaction process.

PCI Targeted Redaction redacts numbers associated with specific types of PCI data. Redaction is performed based on locating keywords in the transcripts, and redacting numbers near those keywords.

Figure 19:
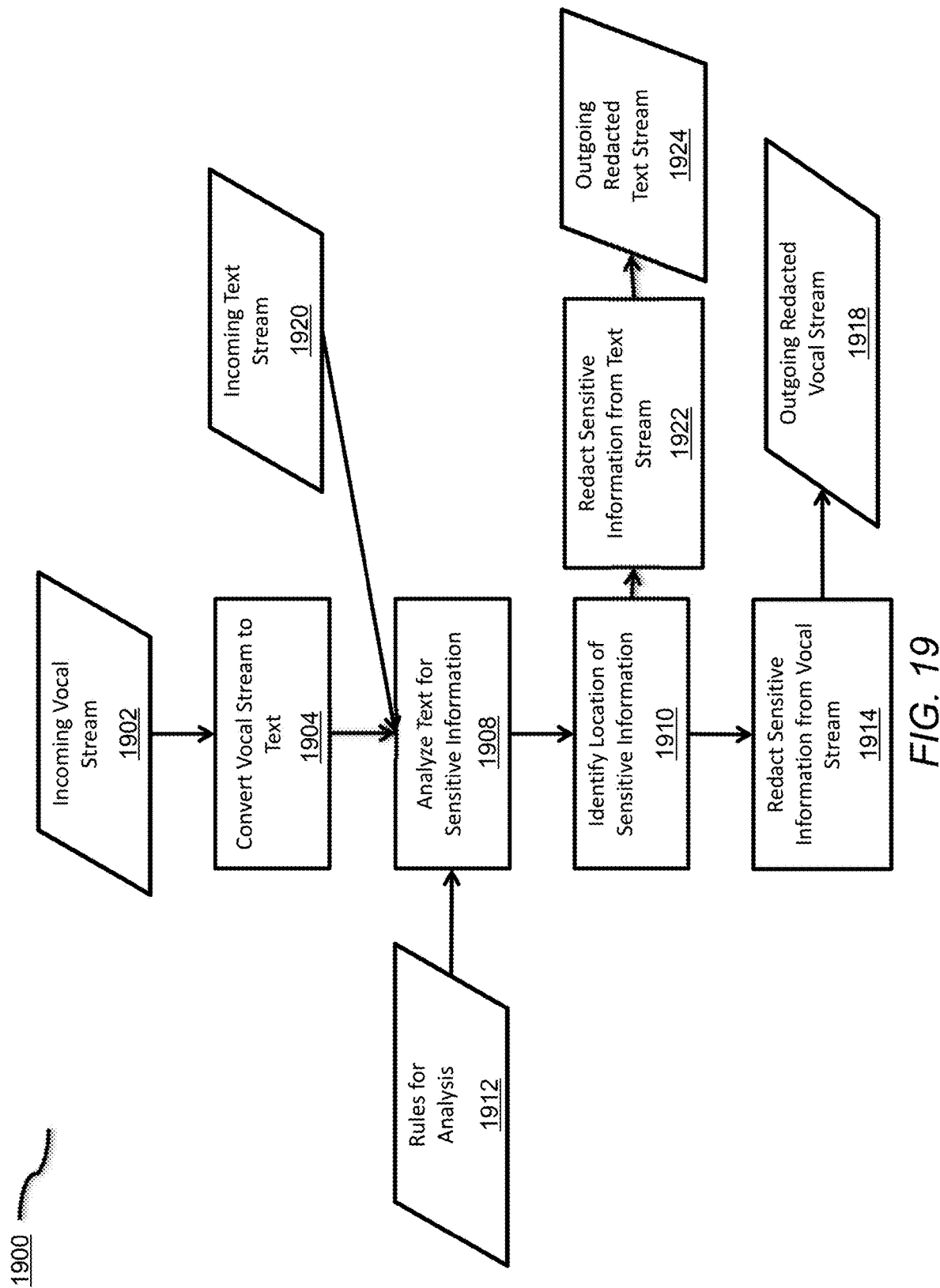
FIG. 19 depicts a top-level process flow diagram for redaction.

Referring to FIG. 19, a top-level process flow diagram 1900 is presented comprising receiving an incoming vocal stream 1902, converting incoming vocal stream to text 1904, analyzing the text for sensitive information 1908 according to a set of rules for analysis 1912, identifying the location of the sensitive information 1910, redacting sensitive information from the vocal stream 1914 and outputting a redacted vocal stream 1918. In embodiments, the incoming vocal stream may comprise a telephonic voice communication. In embodiments, converting vocal stream to text 1904 may occur in real time as the vocal stream is being acquired, with a minimal delay, from existing or archived vocal data, and the like. Conversion of the incoming vocal stream to text 1904 may be accomplished using one or more of large vocabulary speech recognition technology, phonetic engines, direct phrase recognition, cloud-based speech recognition, and the like. After converting the vocal stream to text 1904, the system may analyze the text for sensitive information 1908 according to a set of rules for analysis 1912. In embodiments, the system may receive incoming text 1920 that the system may analyze for sensitive information 1908 according to a set of rules for analysis 1912. As the analysis of the text identifies sensitive information, identification of the location of the sensitive information in the vocal stream 1910 occurs. The location of sensitive data in the recognized communications is identified and "tagged" using an exhaustive list of language "patterns" (credit card strings, expiration dates, ccv codes, social security numbers, and a multitude of other PII data). The start and stop locations/times are annotated and passed on for redaction. Sensitive information at the identified location is redacted 1914 and the redacted vocal stream is output 1918. Sensitive information may be redacted from the text 1922 and redacted text output 1924. In embodiments, the redacted text output 1924 and the redacted vocal stream output 1918 may be stored in a common searchable database. Using the tagged locations, the sensitive audio is replaced with silence/muted/bleeped. This newly redacted file is then encrypted and written to a cache on a storage device or written back into the source format and repository. In embodiments, the tagged locations may be applied to the stream of text before it is to be parsed and written into the database. This text is either the output of the speech to text engine or the direct text coming from a text-based channel. The tagged words may be removed entirely or substituted for other placeholder words that can be recognized.

In embodiments, rules of analysis 1912 may comprise key words and phrases, the presence of numbers or series of numbers, and the like. In embodiments, the rules of analysis 1912 may comprise rules such as: automatically redact all numbers where two or more numbers are found in sequence; automatically redact numbers identified as being separated by less than a specified number of words (e.g. any two numbers within one word of each other are redacted, and redact intervening single words between the two numbers); automatically redact numbers within a specified number of words following a key word or phrase, and the like. Various examples will be described. In a first example, the transcript reads "Cost is sixty nine dollars and ninety nine cents". After redaction, the phrase becomes "Cost is . . . dollars and . . . cents". All numbers redacted due to being within one word of each other—the rest of the words remain. In a second example, the transcript reads "Card number is five three uh two one four". After redaction, the phrase becomes "Card number is . . . ". All numbers and the word "uh" are redacted due to being within one word of each other. In a third example, the transcript reads "Card number is five three uh uh two one four". After redaction, the phrase becomes "Card number is . . . uh uh . . . .". The words "uh uh" remain due to being two words between numbers. In a fourth example, the transcript reads "Card number is five ate blank three two". After redaction, it becomes "Card number is five ate blank . . . ". The word "five" is not within one word of another number so it is not redacted. In a fifth example, the transcript reads "We will give you a seven day trial". After redaction, it becomes "We will give you a seven day trial". Here, there is only one number so no redaction occurs. In a sixth example, the transcript reads "We will give you a seventy five day trial". After redaction, it reads "We will give you a . . . day trial". The numbers are redacted due to there being two of them.

In embodiments, redaction of sensitive information at identified locations 1914 may comprise one or more of: removing that portion of the vocal stream; replacing identified sensitive information in the vocal stream with silence (muting); adding additional audible noise, bleeping, to the vocal stream at the location of the identified sensitive information; and the like. Redaction of said sensitive information may facilitate compliance with regulations such as those of the Affordable Care Act (ACA), the Health Insurance Portability and Accountability Act (HIPPA), Consumer Financial Protection Bureau (CFPB), Fair Debt Collection Practices Act (FDCPA), data privacy regulations, and the like.

Figure 20:
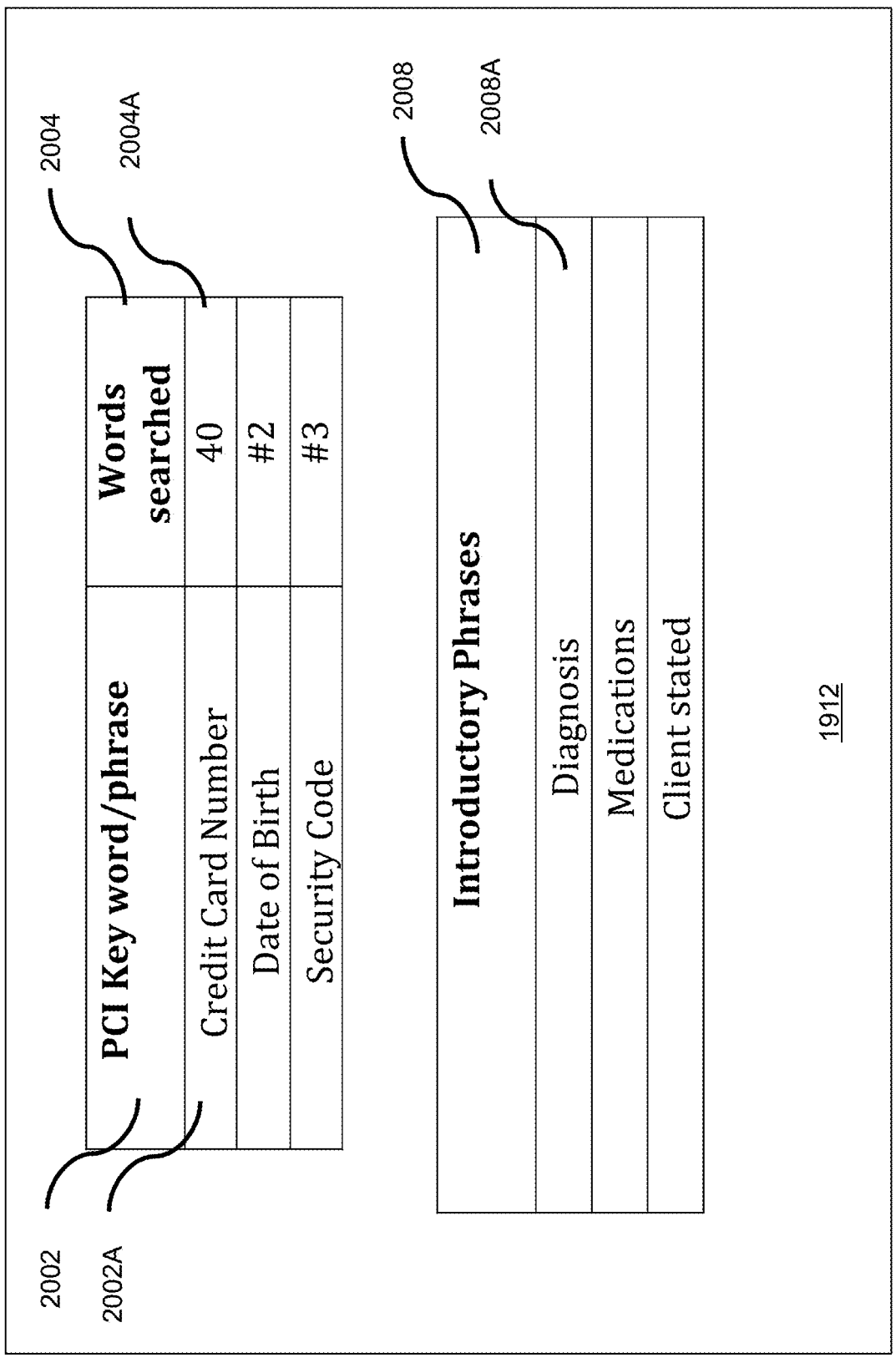
FIG. 20 depicts a high level embodiment of rules of analysis.

Referring to FIG. 20, a high level embodiment of rules of analysis 1912 is shown comprising: a table comprising a plurality of key word/phrase 2002 entries and corresponding number of words searched 2004 entries; a list of introductory phrases 2008; and the like. In embodiments, the system may identify a key word/phrase 2002 from the table and redact information, such as numbers, found within the specified number of words searched 2004 following the key word/phrase 2002 specified in the table. The number of words searched 2004 may vary with the key word/phrase 2002. In embodiments, it may be possible for the rules of analysis 1912 to be customized to identify customer specific sensitive information to be redacted.

In embodiments, the rules of analysis 1912 may be customized to comprise contextual clues to privileged conversations that may be redacted. Privileged conversations may include those between a lawyer and their client, between physicians or psychologists and their patients including content such as names, diagnosis, and the like. In embodiments, there may be a list of introductory phrases 2008 to facilitate contextual analysis wherein the introductory phrase may be followed by sensitive, privileged information to be redacted.

In an illustrative and non-limiting example, FIG. 20 shows a table of key word/phrase 2002 entries and corresponding number of words search 2004 entries. During analysis, the system may identify "Credit Card Number" 2002A. The system may then redact any numbers within the '40' 2004A following words of the identified phrase "Credit Card Number" 2002A. During analysis, the system may identify "Diagnosis" 2008A as an introductory phrase 2008. Information following the introductory phrase "Diagnosis" 2008A may be further contextually analyzed and redacted as appropriate.

In embodiments, a specific recording device (aka: a tapper) may be adapted for realtime analytics that first analyzes the audio and then records/persists to long-term memory or does not record to long term based on that analysis/contextual processing. Redaction is a user case for the tapper.

In embodiments, the identification and redaction of sensitive information may be designed to facilitate compliance with the Payment Card Industry (PCI) standards while retaining other numbers in the text such as pricing and volume data. In one embodiment, a PCI Redactor product may be speech analytics technology to automatically remove/mute/bleep PCI sensitive authentication and cardholder data in accordance with one or more rules from incoming call recordings or call recording archives. Information such as credit card number, security code, expiration date, PIN number, date of birth, driver's license data, social security number, account data, and the like may be redacted to facilitate compliance. In embodiments, keywords may be located in the transcript of an audio call and numbers redacted based on a set of rules of analysis 1912. Rules of analysis 1912 may comprise one or more of the following: redacting numbers in close proximity to identified key words/phrases 2002 (e.g. any two numbers within two words of each other are redacted); iterative processing of text following redacted numbers and further redaction of numbers (e.g. After the initial redaction has been performed, a second pass is done, looking at the next 10 words from the last redacted number, and if numbers are found, these are also redacted. Then, a third pass is then done to identify if there is one more number in the sequence.); not redacting numbers which are closely followed by units not consistent with PCI information such as dollar(s), cent(s), buck(s), minutes, hour(s), day(s), week(s), month(s), monthly, year(s), channel(s), percent(s), percentage, refundable, non-refundable, promotion, promotional, processing, fee(s), total(s), and the like to assist in keeping things like prices and durations from being redacted; and the like.

In a first example, the transcript may read "what is the card number you will be using today oh let me find my card it is in my wallet take your time my purse is always such a mess let me see here oh here it is the number is five four three one seven ate zero two heaven uh seven four nine two six thank you now what is the expiration date . . . " The phrase "Card number" is the keyword identified in the transcript as a clue that information that may need to be redacted may follow. Thus, a pre-determined number of words following the phrase "card number" are searched for numbers to be redacted. In an embodiment, the number of words searched may range from 15 to 40 words or so. In this example, the numbers "five four three one" are redacted, due to 'one' being within 2 words of 'five'. Then, the next 10 words after the last redacted word ('one') are searched to find numbers. The words/numbers "seven ate zero two" are redacted, as are "seven four nine two". The next word is looked at and since it is a number ('six'), it is then redacted. The final transcript after redaction reads "what is the card number you will be using today oh let me find my card it is in my wallet take your time my purse is always such a mess let me see here oh here it is the number is redacted redacted heaven uh redacted redacted thank you now what is the expiration date . . . ."

In a second example, the transcript may read "what is the expiration date oh nine sixteen thank you we will be charging this card ninety nine dollars and twenty ur uh three cents on Friday . . . " The word "expiration" is the keyword identified in the transcript as a clue that information that may need to be redacted may follow. Thus, a pre-determined number of words following the phrase "expiration" are searched for numbers to be redacted. In an embodiment, the number of words searched may range from 15 to 40 words or so. One or more charts of number of words searched for each keyword may be provided and consulted by the redaction process—the one or more charts may be customizable by a user of the system. The numbers "oh nine sixteen" are redacted. The numbers "ninety nine" are not redacted because of being followed by 'dollars'. The numbers "twenty three" are not redacted because they are followed (within 3 words) by 'cents'. The final transcript after redaction reads "what is the expiration date redacted thank you we will be charging this card ninety nine dollars and twenty ur uh three cents on Friday . . . " In embodiments, a string of numbers may be removed based on endpointing (based on silences).

In embodiments, audio data, such as that of a phone call, may be intercepted at the source and redacted prior to being promulgated through the system and made accessible/audible by other participants in a phone call. In embodiments, this may be used for fraud protection as a safeguard to limit the ability of certain parties to provide sensitive information over the phone, and the like. In some embodiments, the transmission of sensitive PCI information may be permitted to a select list of recipients, and redacted for all other participants.

Figure 21:
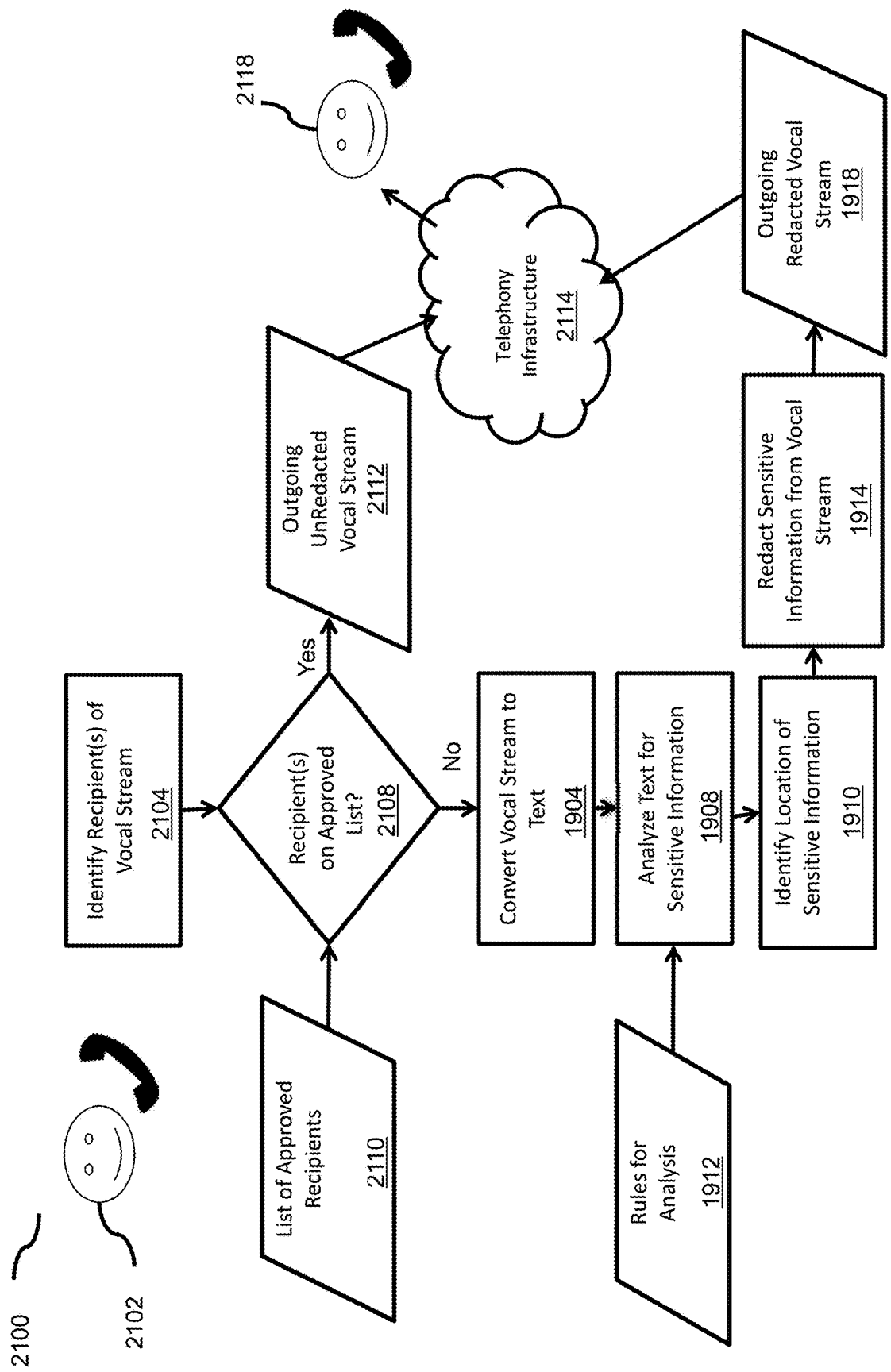
FIG. 21 depicts a high level flow diagram of redaction.

Referring to FIG. 21, a high level flow diagram 2100 illustrates an embodiment of source redaction system comprising a user 2102 at the source, identifying one or more recipient(s) of a vocal stream 2104, a list of approved recipients 2110, alternate paths to a recipient 2118 which may be selected based on whether the recipient is on the list of approved recipient(s) 2108. In embodiments, if the recipient 2118 is on the list of approved recipients 2110, an outgoing unredacted vocal stream 2112 may be sent through the telephony infrastructure 2114 to the recipient 2118. If the recipient 2118 is not on the list of approved recipients 2110, sensitive information may be redacted from the vocal stream and an outgoing redacted vocal stream 1918 may be sent to the recipient 2118. The telephony infrastructure 2114 may comprise one or more of Voice over IP (VOIP) traditional PBX, and the like.

In an illustrative and non-limiting embodiment, a user 2102 is on the telephone and is asked for confidential information such as credit card data, bank account data, and the like. If a recipient, 2118 is on a list of approved recipients 2110, the sensitive information may be transmitted without redaction and the recipient 2118 will be able to hear the sensitive information. If a recipient, 2110, is not on the list of approved recipients, 2110, sensitive information may be redacted from the vocal stream through removal, muting, beeping or the like. The resultant outgoing redacted vocal stream 1918 may be sent to the recipient 2110B who may not be able to hear the sensitive information as it has been redacted prior to being transmitted to them.

In embodiments, this source redaction capability may be incorporated into a phone, a local home network system, and the like. It may be used to limit the exposure of elderly persons, children, and the like to predatory phone solicitations, allowing them to share sensitive information only with approved recipients. In embodiments, the approved recipients may be included in a whitelist of a profile controlling the redaction capability. Thus, only whitelisted entities can have a credit card number or account number spoken to them by an elder.

In embodiments, there may be a recording device capable of real time redaction which caches the incoming vocal stream in temporary memory, analyzes the incoming vocal stream, redacts the vocal data stream according to set of rules of analysis 1912 and then records/persists the outgoing redacted vocal stream 1918 to long-term memory.

In embodiments, sensitive information such as PCI information, card holder data, and the like may be removed from the audio stream in the cache prior to being recorded for call archiving, and the like. In embodiments, the audio stream may be split making available an un-redacted version to an agent and a redacted version for the call archiving system. Thus, in an illustrative and non-limiting example, an agent may be able to hear payment information and enter it on a form and yet the sensitive information is not recorded as part of the call archive. This may reduce the security level required for the call archives, as they may not contain sensitive PCI information.

Figure 22A:
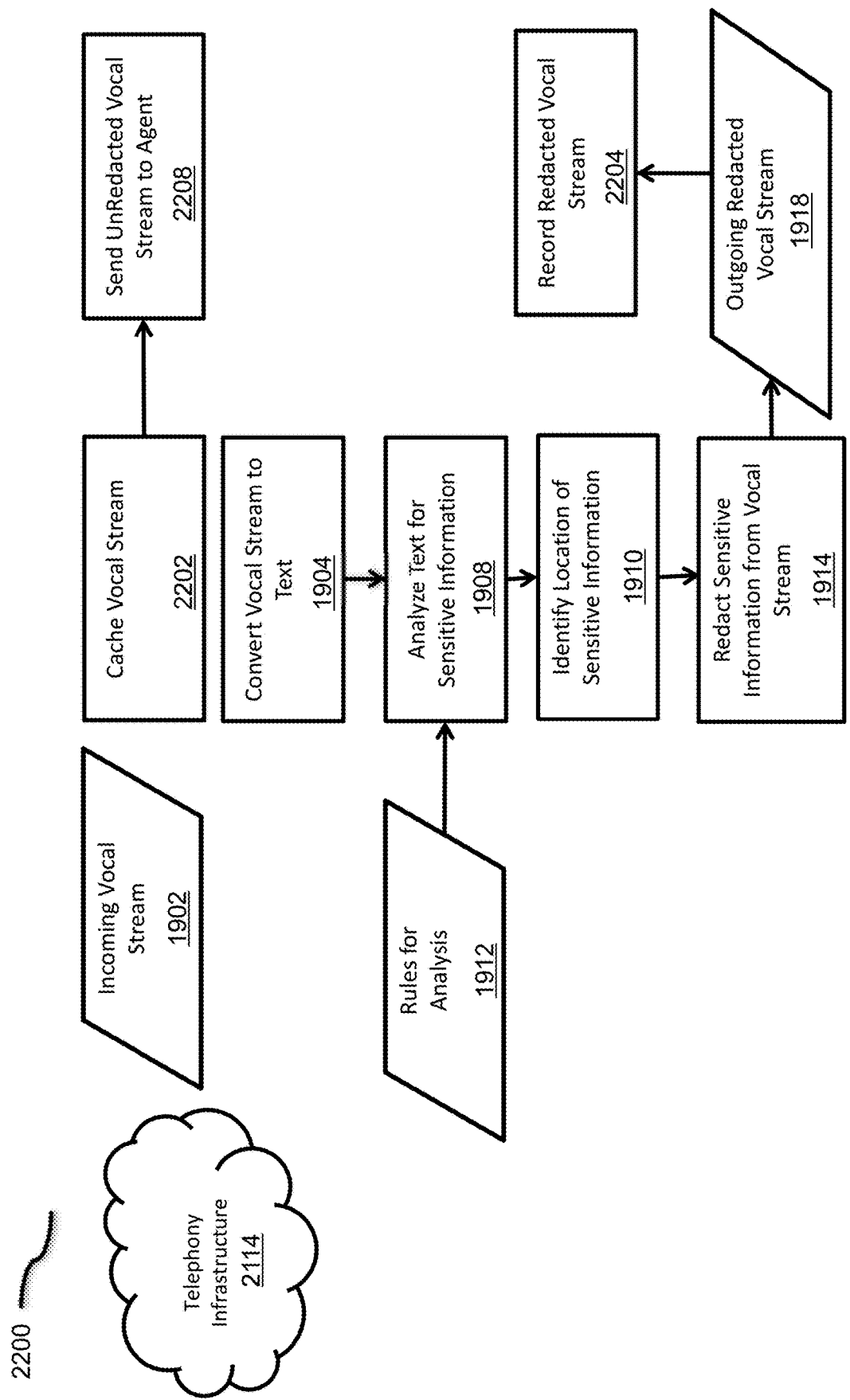
FIG. 22A depicts a high level flow diagram of redaction.

Referring to FIG. 22A, a high level flow diagram 2200 is shown illustrating a process flow comprising: caching an incoming vocal stream 2202; redacting sensitive information from the vocal stream; sending an unredacted vocal stream to an agent 2208; and recording a redacted vocal stream 2204. In embodiments, an incoming vocal stream 1902 may be received through standard telephony infrastructure 2114. The system may cache the vocal stream 2202 and may then send an unredacted vocal stream to an agent 2208 who may process the call. While the vocal stream is cached, it may be converted to text, the text analyzed for sensitive information and the sensitive information redacted from the cached vocal stream. The system may record the redacted vocal stream 2204. Thus, as described in this embodiment, sensitive information may be made available to an agent for processing but redacted prior to being recorded.

Figure 22B:
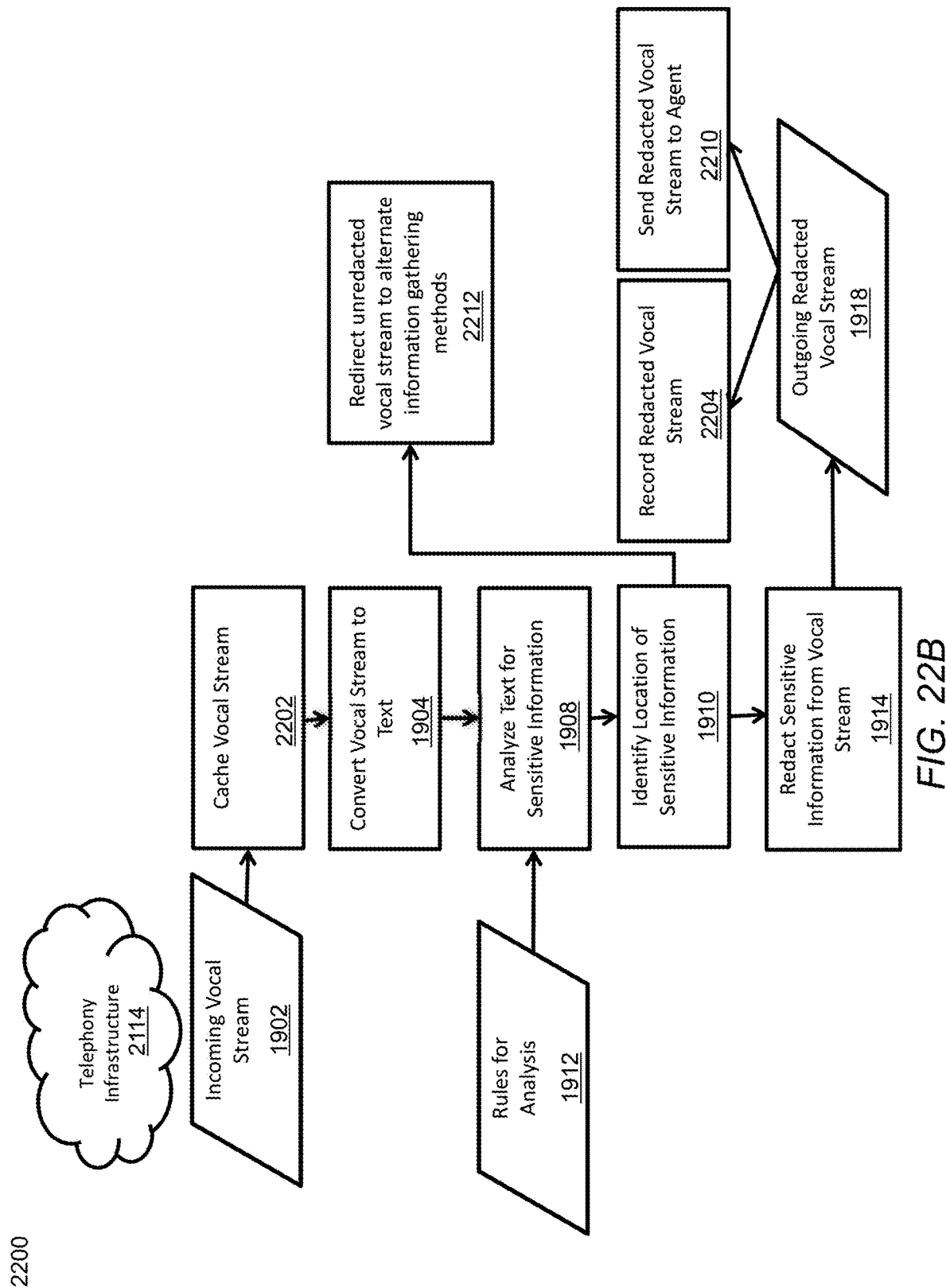
FIG. 22B depicts a high level flow diagram of redaction.

In embodiments, sensitive information such as PCI information, card holder data, and the like may be removed from the audio stream in the cache prior to being recorded for call archiving, or being sent to an agent. In embodiments, when upcoming PCI data is identified, such as contextually identified, the caller or user may be routed to an alternate method of providing payment information. Referring to FIG. 22B, a high level flow diagram 2290 is shown illustrating a process flow comprising: caching an incoming vocal stream 2202; redacting sensitive information from the vocal stream; recording the redacted vocal stream 2204; sending a redacted vocal stream to an agent 2210; and redirecting the unredacted vocal stream to alternate information gathering methods 2212.

In embodiments, a data server may deploy the speech analytics technologies described above to identify PCI sensitive authentication and cardholder data. Incoming vocal streams may be stored in a temporary buffer on the data server and sensitive information redacted prior to transferring the redacted vocal stream to permanent storage, a call agent, and the like.

In embodiments, redaction may be multi-level where the redaction may be done multiple times and in a plurality of locations such as at the source, in the cloud, during transmission, at the receiving location, on archived data and the like. In an illustrative and non-limiting example, a vocal stream may initially be redacted at its source, such as at the phone of a caller. A secondary analysis and redaction may occur as the incoming vocal stream is processed in a call center. In embodiments, additional analysis and redaction may occur on the data stored in a call recording archive.

Thus, the redaction capability operates on advanced speech analytics technology, delivering accurate and reliable results. The redaction capability enables the maintenance of PCI compliant call recording and certification and the reduction of privacy risk by removing sensitive data from call recordings. The redaction capability enables redaction of targeted content recorded from call connection through the IVR, hold, transfer, conversation and post-close survey. The redaction capability can be used to certify redaction from call recording archives. The redaction capability does not depend on a change in payment processing, human intervention, or integration with CRM systems.

All of the systems and methods described herein may be useful in facilitating realtime calls. In collections, the systems and methods may support inbound and outbound sales support. In knowledge/technical support, a help desk agent may be able to pull up data/products associated with an articulated issue automatically based on recognitions and categories. Industries with compliance-related issues, customer service, technical support, and the like may find the systems and methods useful. In agent performance monitoring, the systems and methods may be used for cross-sell/up-sell trend analysis, competitive intelligence, call center automated data integration, compliance, and the like. With compliance, the CPFB requires tone monitoring and the CFTC requires that audio be discoverable, both of which are possible with the systems and methods described herein.

In embodiments, these devices and methods may be integrated into larger customer systems such as those used by banks, credit unions, credit card companies, traders, brokerage firms, large retailers, collection agencies, and the like. In embodiments, these devices and methods may be housed and implemented entirely at a client site.

Various auxiliary products, such as screen capture, audio capture, and simultaneous screen capture with call recording may be possible with the systems and methods.

In embodiments, the systems and methods described herein may be deployed as a mobile application or as a device-specific application.

In an embodiment, an application may allow the caller/consumer to obtain a transcript of the call once they have hung up.

In embodiments, any of the methods, steps or processes described herein may occur automatically, under computer control, or in a time span shorter than a browser, webpage, or application refresh or webpage load. This time span may be less than about 10 sec, less than about 5 sec, less than about 1 second, or substantially instantaneously.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be or include a frequency division multiple access (FDMA) network or a code division multiple access (CDMA) network. The cellular network may include mobile devices, cell sites, base stations, repeaters, antennas, towers, and the like. The cell network may be one or more of GSM, GPRS, 3G, EVDO, mesh, or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method, executed by a computer-based communications analytics facility, comprising:
    performing an analysis of acoustic characteristics and language characteristics of a plurality of communications between customers and agents;
    assigning respective metadata values to communications of the plurality of communications based on the analysis of the acoustic characteristics and the language characteristics, wherein each metadata value relates to a type of metadata comprising at least one of: a category of a communication, an overall call performance, a score, a successful sale, a successful upselling, a script, a word, a phrase, a tone, a satisfaction, a dissatisfaction, a duration of the communication, a duration of silence, an agitation level, a compliment, an agent, an agent group, or an agent ownership;
    identifying at least a first set of communications and a second set of communications of the plurality of communications using AB testing based on a difference in metadata values between the first set and the second set for a first type of metadata;
    determining at least one similarity between the communications in the first set based on metadata values of a second type of metadata;
    determining at least one similarity between the communications in the second set based on metadata values of the second type of metadata or a third type of metadata;
    comparing the at least one similarity from the first set to the at least one similarity of the second set to identify differences in metadata values or types of metadata; and
    determining, based on the differences, a suggested action for an agent for a future communication with respect to at least one of a desired script, a target phrase, or a desired acoustic characteristic.

2. The method of claim 1, wherein the first type of metadata relates to an agent score.

3. The method of claim 1, wherein the first type of metadata relates to an agent success with respect to sales.

4. The method of claim 3, wherein the second type of metadata relates to words of the communications.

5. The method of claim 1, wherein the first set of communications is associated with use of a first script by one or more agents and the second set of communications is associated with use of a second script by the one or more agents.

6. The method of claim 5, wherein the second type of metadata relates to an agent score of the one or more agents using the first script.

7. The method of claim 5, wherein the second type of metadata relates to a successful sale of the one or more agents.

8. The method of claim 5, wherein the third type of metadata is used to determine the at least one similarity between the communications in the second set, and wherein the third type of metadata relates to an agent score of the one or more agents using the second script.

9. The method of claim 1, wherein multiple factors are used to determine multiple similarities between the communications in the first set.

10. The method of claim 1, wherein multiple factors are used to determine multiple similarities between the communications in the second set.

11. The method of claim 1, wherein the plurality of communications is filtered according to a time frame.

12. The method of claim 1, wherein the first set of communications is based on a first group of agents and the second set of communications is based on a second group of agents.

* * * * *